United States Patent
Erb et al.

(10) Patent No.: US 11,750,148 B2
(45) Date of Patent: Sep. 5, 2023

(54) SYSTEMS AND METHODS FOR SOLAR POWER PLANT ASSEMBLY

(71) Applicant: Planted Solar, Inc., Los Altos, CA (US)

(72) Inventors: Richard Erb, Los Altos, CA (US); Gilad Almogy, Los Altos, CA (US); Nathan Beckett, Los Altos, CA (US)

(73) Assignee: Planted Solar, Inc., Los Altos, CA (US)

( * ) Notice: Subject to any disclaimer, the term of this patent is extended or adjusted under 35 U.S.C. 154(b) by 0 days.

(21) Appl. No.: 17/821,087

(22) Filed: Aug. 19, 2022

(65) Prior Publication Data

US 2022/0393640 A1 Dec. 8, 2022

Related U.S. Application Data

(63) Continuation of application No. PCT/US2022/018368, filed on Mar. 1, 2022.

(60) Provisional application No. 63/308,045, filed on Feb. 8, 2022, provisional application No. 63/155,193, filed on Mar. 1, 2021.

(51) Int. Cl.
| | | |
|---|---|---|
| H02S 30/10 | (2014.01) | |
| H02S 20/10 | (2014.01) | |
| H02S 20/32 | (2014.01) | |
| G05D 1/00 | (2006.01) | |
| B25J 9/16 | (2006.01) | |
| B60P 1/00 | (2006.01) | |
| E04H 12/34 | (2006.01) | |
| G01L 5/00 | (2006.01) | |

(52) U.S. Cl.
CPC ............. *H02S 30/10* (2014.12); *B25J 9/1687* (2013.01); *B60P 1/00* (2013.01); *E04H 12/347* (2013.01); *G01L 5/0033* (2013.01); *G05D 1/0088* (2013.01); *H02S 20/10* (2014.12); *G05D 2201/0202* (2013.01); *H02S 20/32* (2014.12)

(58) Field of Classification Search
CPC .................................. H02S 30/10; H02S 20/32
See application file for complete search history.

(56) References Cited

U.S. PATENT DOCUMENTS

| | | |
|---|---|---|
| 8,186,120 B2 | 5/2012 | Beck |
| 8,646,227 B2 | 2/2014 | Zahuranec |
| 9,020,636 B2 | 4/2015 | Tadayon |
| 9,074,797 B2 | 7/2015 | Miller et al. |
| D738,820 S | 9/2015 | Beck et al. |
| 9,457,463 B2 | 10/2016 | Tadayon |

(Continued)

FOREIGN PATENT DOCUMENTS

| | | |
|---|---|---|
| DE | 202013105120 U1 | 11/2013 |
| DE | 102013006530 A1 | 10/2014 |

(Continued)

OTHER PUBLICATIONS

International search report with written opinion dated Aug. 2, 2022 for PCT/US2022/018368.

*Primary Examiner* — Jayne L Mershon
(74) *Attorney, Agent, or Firm* — Wilson Sonsini Goodrich & Rosati

(57) ABSTRACT

In an aspect, the present disclosure describes a method comprising using at least one robot to fully autonomously position and assemble at least one solar module and its supporting structure at a sensed geolocation without aid from a user.

36 Claims, 90 Drawing Sheets

(56) References Cited

U.S. PATENT DOCUMENTS

| | | |
|---|---|---|
| 10,020,411 B2 | 7/2018 | Beck et al. |
| 10,232,505 B2 | 3/2019 | Tadayon |
| 10,289,757 B2 | 5/2019 | McClure et al. |
| 10,439,550 B1 | 10/2019 | Goodman |
| 10,926,401 B2 | 2/2021 | Tadayon |
| 11,245,353 B2 | 2/2022 | Di et al. |
| 2013/0019925 A1 | 1/2013 | Britcher et al. |
| 2015/0331972 A1* | 11/2015 | McClure ............... G06F 17/11 703/2 |
| 2016/0118927 A1 | 4/2016 | Zuritis |
| 2017/0229029 A1 | 8/2017 | Klinger et al. |
| 2017/0327091 A1* | 11/2017 | Capizzo ............... B60L 53/80 |
| 2019/0134822 A1 | 5/2019 | Clemenzi et al. |
| 2019/0184544 A1 | 6/2019 | Tadayon |
| 2020/0304062 A1 | 9/2020 | Shugar |
| 2021/0170571 A1 | 6/2021 | Tadayon |
| 2021/0205997 A1 | 7/2021 | Zhou et al. |
| 2021/0206003 A1* | 7/2021 | Zhou ................... G05D 1/0231 |
| 2021/0211096 A1* | 7/2021 | Clemenzi ............... H02S 20/10 |
| 2023/0091917 A1 | 3/2023 | Erb et al. |

FOREIGN PATENT DOCUMENTS

| | | |
|---|---|---|
| DE | 102019102177 A1 | 7/2020 |
| DE | 102011102624 B4 | 10/2020 |
| EP | 2681772 B1 | 9/2016 |
| EP | 2771913 B1 | 12/2017 |
| EP | 3021056 B1 | 4/2020 |
| EP | 3810997 A1 | 4/2021 |
| WO | WO-2019242925 A1 | 12/2019 |
| WO | WO-2021188874 A1 | 9/2021 |
| WO | WO-2021188875 A1 | 9/2021 |
| WO | WO-2022187264 A1 | 9/2022 |

\* cited by examiner

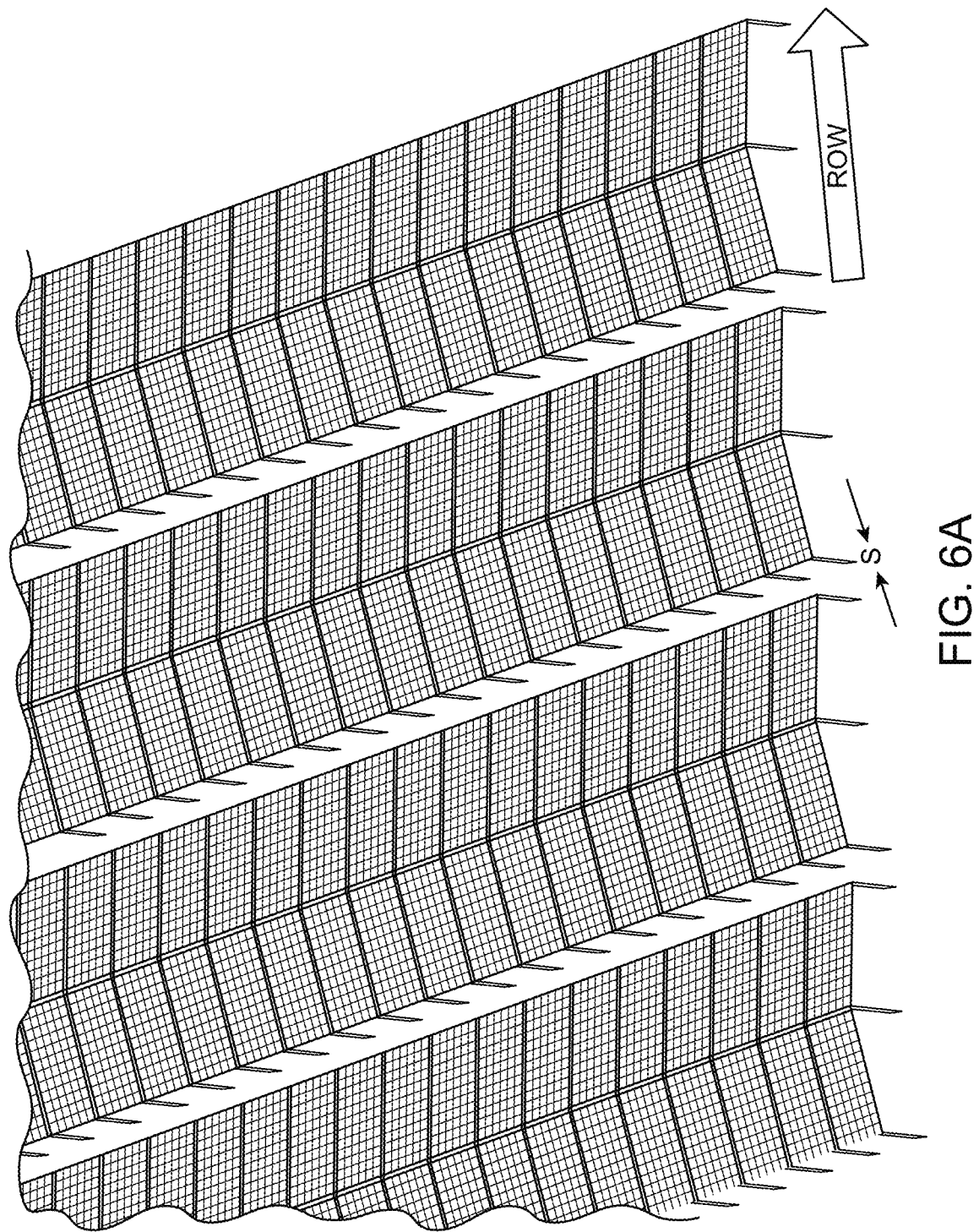

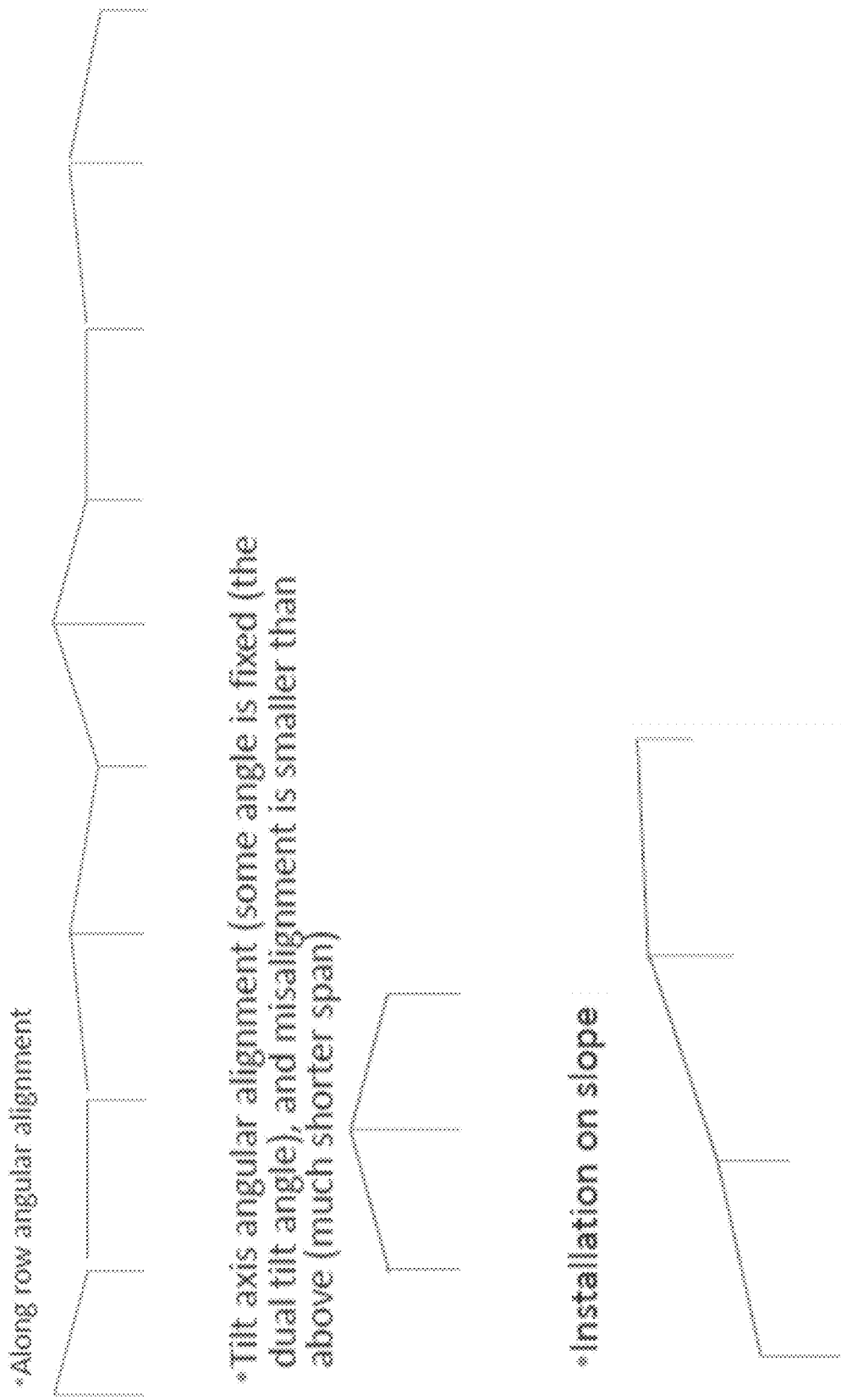

Clinching Joint

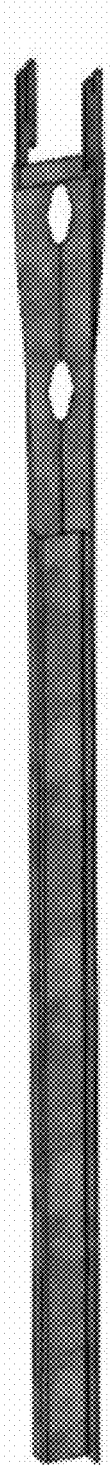
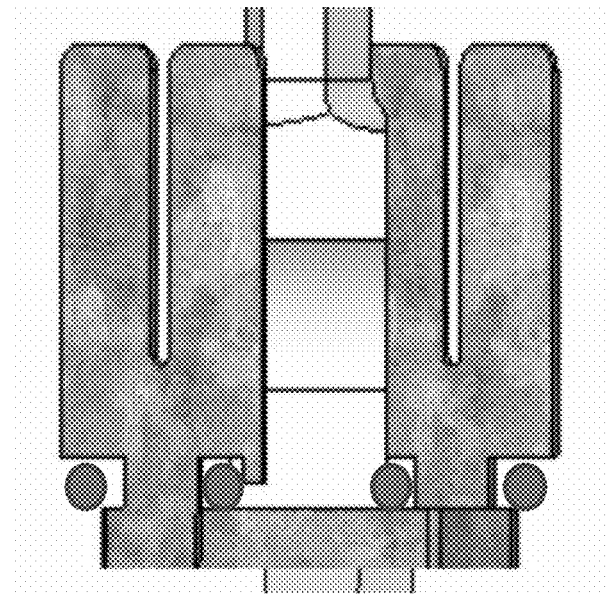
FIG. 50B
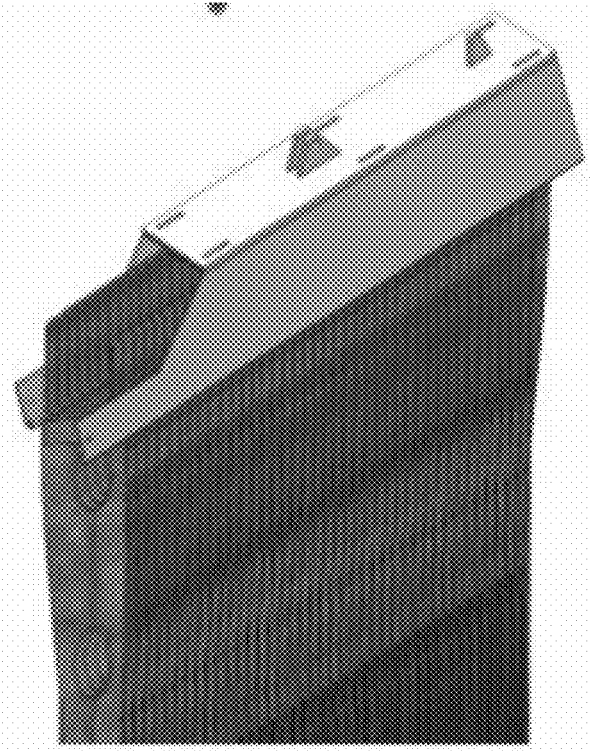
FIG. 50A
FIG. 50C

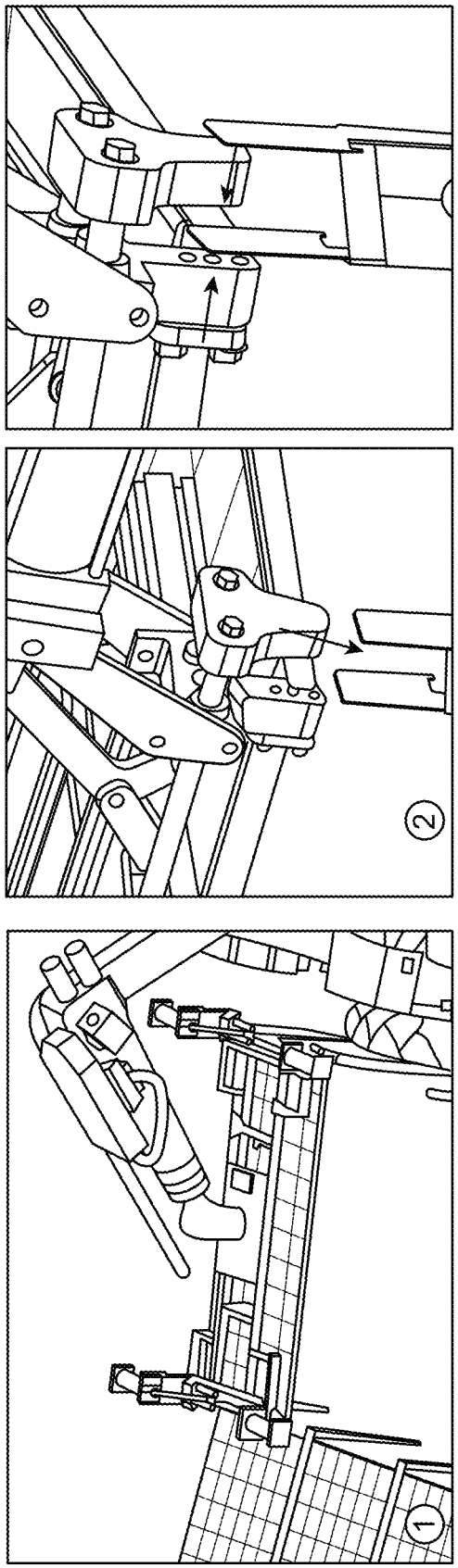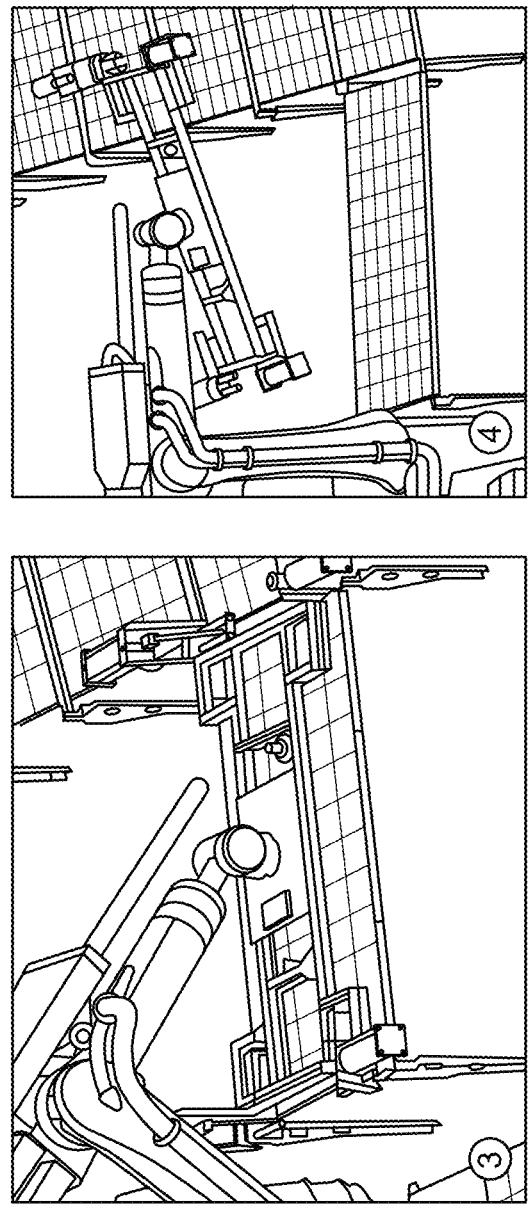
FIG. 52

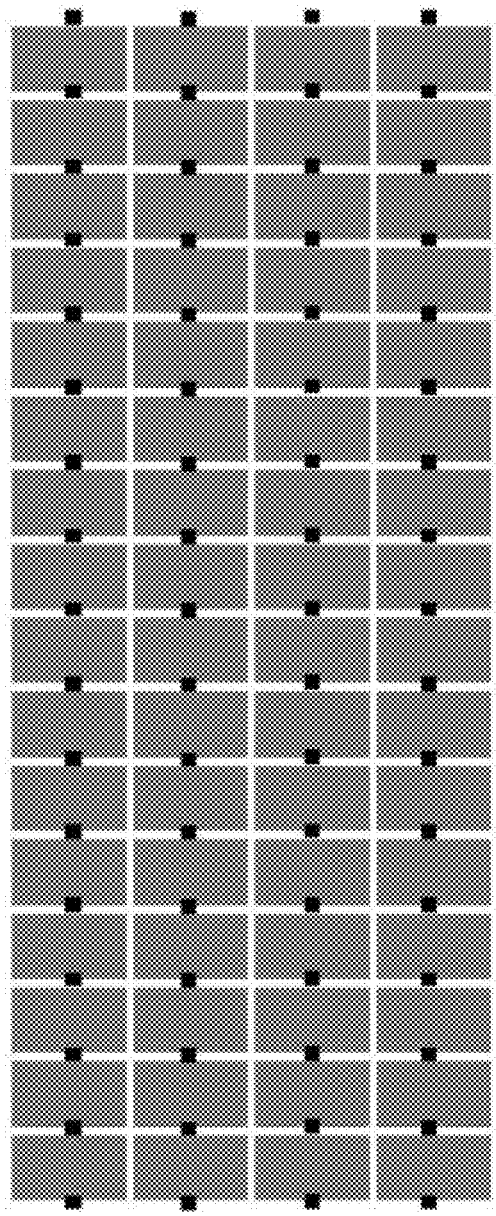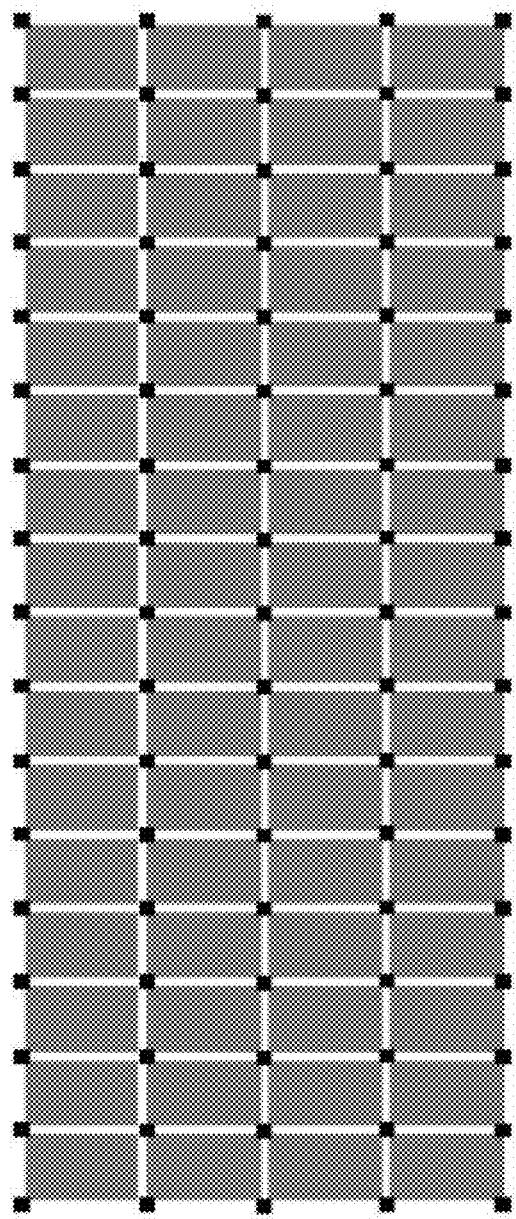
Mid posts only (LEFT) ; Corner post (RIGHT)
FIG. 60

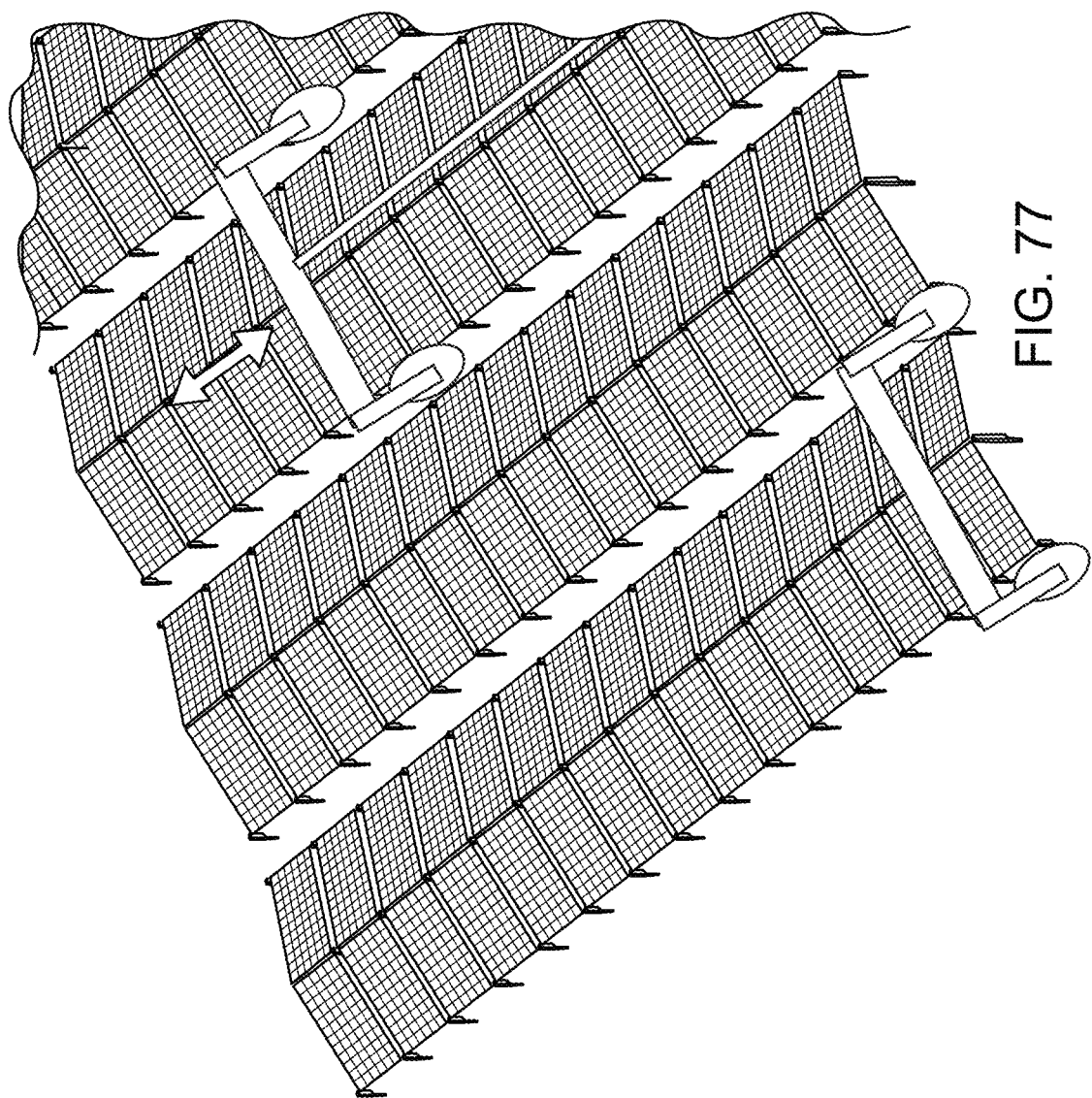

SYSTEMS AND METHODS FOR SOLAR POWER PLANT ASSEMBLY

CROSS-REFERENCE

This application is a continuation of International Patent Application No. PCT/US22/18368, filed on Mar. 1, 2022, claims the benefit of U.S. Provisional Application No. 63/155,193, filed Mar. 1, 2021, and U.S. Provisional Application No. 63/308,045, filed Feb. 8, 2022, each of which is incorporated herein by reference in its entirety for all purposes.

BACKGROUND

With the recognition of the harmful effects of global warming, the generation of usable power from solar energy is gaining increased acceptance. Large areas of vacant land can offer an attractive location for the deployment of solar panels. However, such open area solar installations may be accompanied by significant effort in securing the solar panels to the ground in such a way that the solar panels are resistant to external loading forces such as wind. The creation of separate beam and post structures to accomplish this goal can also add significant costs to the installation of solar panels.

SUMMARY

The present disclosure provides systems and methods for autonomous installation of an array of solar modules on various terrains. Some aspects of the present disclosure describe methods and systems for planning and executing an installation of an array of solar modules over a given terrain. In some cases, terrain data from various sources (e.g., GPS, geological survey data, cameras, etc.) may be utilized in a computer algorithm to prepare a blueprint or instructions for deploying solar modules on a given terrain. In some cases, one or more autonomous machines may be used and coordinated to execute various tasks to install arrays of solar modules over a given landscape. Some aspects of the present disclosure provide systems and methods that can be suitable for installing an array of solar modules on terrains of various topologies and compositional properties or characteristics in an efficient manner.

Some aspects of the present disclosure describe various shapes and forms of structural supports, solar modules, and coupling mechanisms that may be formed to connect various components in a solar array. In some cases, the structural supports and the solar modules may be coupled using mechanisms that can be formed quickly while providing stable links. Some aspects of the present disclosure provide devices and methods for creating and deploying such coupling mechanisms so that an array of solar modules may be installed efficiently and rapidly without the need for additional tools or fasteners.

In one aspect, the present disclosure describes a method comprising using at least one robot to fully autonomously position and assemble at least one solar module and its supporting structure at a sensed geolocation without aid from a user. In some embodiments, the method further comprises using the at least one robot to fully autonomously position and assemble the at least one solar module and its supporting structure in two or more different directions. In some embodiments, the method further comprises using the at least one robot to fully autonomously position and assemble a plurality of solar modules and associated supporting structures to construct a solar module array. In some embodiments, the plurality of solar modules and the associated supporting structures comprise the at least one solar module and its supporting structure.

In some embodiments, the solar module array is constructed on a substantially flat terrain. In some embodiments, the solar module array is constructed on a substantially non-flat terrain.

In some embodiments, the solar module array is a complete wired array. In some embodiments, the solar module is a dual-tilt array. In some embodiments, the solar module array can be a single tilt array capable of or configurable for 0 degrees to 90 degrees of tilt.

In some aspects, the present disclosure describes a method comprising providing one or more mobile platforms that are configured to carry a plurality of posts and a plurality of solar modules. In some embodiments, the one or more mobile platforms are equipped with one or more sensors comprising a geolocation sensor. In some embodiments, the method further comprises using at least in part the one or more sensors to autonomously move the one or more mobile platforms. In some embodiments, the method further comprises using at least in part the one or more sensors to autonomously position and assemble the plurality of posts and the plurality of solar modules over a terrain to construct an array of solar modules. In some embodiments, the one or more sensors further comprise an image sensor.

In some embodiments, the one or more mobile platforms comprises a first platform for positioning and installing the plurality of posts onto the terrain. In some embodiments, the one or more mobile platforms comprises a second platform for positioning and assembling the plurality of solar modules onto the plurality of posts. In some embodiments, the first platform is separate from the second platform. In some embodiments, the first platform and the second platform are integrated into a single platform.

In some embodiments, the plurality of posts are positioned and installed by the first platform at a predefined configuration onto the terrain. In some embodiments, the plurality of solar modules are pre-stacked on the second platform. In some embodiments, the second platform comprises a mechanism for extracting a select solar module from the stack and assembling the select solar module onto a select set of posts that have been installed on the terrain.

In some embodiments, the method further comprises using a testing tool located on the one or more mobile platforms to perform pull strength and assembly tests on one or more of the plurality of installed posts.

In some embodiments, the method further comprises using the one or more sensors to locate and move an installer load head on the one or more mobile platforms relative to the array of solar modules as the array is being constructed.

In some embodiments, the method further comprises using a tool (e.g., an integrated forming tool or an integrated clinching tool) on the installer load head to create a plurality of post-clip interfaces between a plurality of clips and the plurality of posts. In some embodiments, the tool may comprise any type of tool that is capable of forming, shaping, or otherwise manipulating a material (e.g., to create one or more post-clip interfaces). In some embodiments, the plurality of clips are pre-attached on the plurality of solar modules. In some embodiments, the method further comprises forming a plurality of clip-module interfaces, wherein the plurality of clip-module interfaces comprises a plurality of clinched joints.

In some embodiments, the one or more mobile platforms comprise one or more electric vehicles. In some embodiments, the method further comprises providing one or more electric charging stations distributed across the terrain for enabling charging of the one or more electric vehicles. In some embodiments, the one or more electric charging stations are mobile or stationary.

In some aspects, the present disclosure describes a method comprising providing a plurality of posts and a plurality of solar modules. In some embodiments, the plurality of solar modules comprise a plurality of clips pre-attached thereon.

In some embodiments, the method further comprises forming a plurality of post-clip interfaces between a plurality of clips and the plurality of posts to construct an array of solar modules over a terrain without requiring one or more premade holes/features for one or more fasteners. In some embodiments, the plurality of post-clip interfaces have tolerances that enable the array to contour to the terrain, thereby eliminating a need for grading of the terrain. In some embodiments, the plurality of post-clip interfaces comprise a plurality of clinched joints. In some embodiments, the plurality of clinched joints are formed by a dimpling process. In some embodiments, each of the plurality of posts comprises one or more tabs. In some embodiments, the dimpling process comprises joining the one or more tabs to a corresponding clip to form the plurality of clinched joints. In some embodiments, the plurality of post-clip interfaces are formed at one or more corners of the plurality of solar modules. In some embodiments, the plurality of post-clip interfaces are formed at all corners of the plurality of solar modules. In some embodiments, the plurality of post-clip interfaces are formed at opposite corners of the plurality of solar modules. In some embodiments, the plurality of post-clip interfaces are formed at one or more lateral sides of the plurality of solar modules. In some embodiments, the plurality of post-clip interfaces are formed at all lateral sides of the plurality of solar modules. In some embodiments, the plurality of post-clip interfaces are formed at opposite lateral sides of the plurality of solar modules. In some embodiments, the plurality of post-clip interfaces are formed by using a clinching tool that is located on a post installer load head. In some embodiments, the post installer load head is located on one or more mobile platforms that are configured to carry the plurality of posts and the plurality of solar modules.

In some embodiments, the method further comprises using the one or more mobile platforms to autonomously position and assemble the plurality of posts and the plurality of solar modules over the terrain to construct the array of solar modules.

In some embodiments, the method further comprises assessing a structural integrity of the post-clip interfaces using at least one of a measured force or a deflection during and/or after installation of the solar modules onto the posts.

In some embodiments, the method further comprises obtaining images of the plurality of post-clip interfaces during or after the interfaces have been formed.

In some embodiments, the method further comprises determining a structural integrity of each of the plurality of post-clip interfaces based at least on one or more of the images.

In some embodiments, the plurality of post-clip interfaces are formed without requiring the one or more fasteners.

In some embodiments, the plurality of post-clip interfaces are formed by locating the one or more fasteners in position relative to each clip and a corresponding tab on each post, and piercing the one or more fasteners through the tab to fasten the tab onto the clip, or piercing the one or more fasteners through the clip to fasten the clip onto the tab.

In some embodiments, the method further comprises using a movable tool to form a plurality of holes in-situ on at least the clips on the solar modules and/or tabs on the posts. In some embodiments, the method further comprises using the movable tool or another tool to install the one or more fasteners through the plurality of holes formed in-situ on the clips and/or tabs. In some embodiments, the method further comprises adding the one or more fasteners to the post-clip interfaces after or during the dimpling process.

In some aspects, the present disclosure describes a method comprising using an algorithm to identify a location suitable for autonomous positioning and assembly of at least one solar module. In some embodiments, the method does not require aid or involvement from a user in the autonomous positioning and assembly of the at least one solar module.

In some embodiments, the algorithm is a machine learning (ML) algorithm. In some embodiments, the algorithm identifies the location based at least on an analysis of terrain data. In some embodiments, the terrain data is obtained using at least one of aerial imaging or Global navigation satellite systems (GNSS).

In some embodiments, the method further comprises creating a set of executable instructions in a digital medium for an autonomous system to autonomously position and assemble the at least one solar module to construct a solar module array.

In some embodiments, the autonomous system comprises a plurality of field machines that are in operative communication via a network. In some embodiments, the plurality of field machines comprise robots.

In some aspects, the present disclosure describes an apparatus that is configured to carry a plurality of posts over a terrain. In some embodiments, the apparatus may be further configured to autonomously position a select post from the plurality of posts at a predetermined location on the terrain. In some embodiments, the apparatus may be further configured to autonomously install the select post at the predetermined location, wherein the select post and the plurality of posts are useable to support a plurality of solar modules.

In some embodiments, the apparatus may be further configured to perform a force test after the select post has been installed at the predetermined location. In some embodiments, the force test comprises applying a pull force on the select post in at least one of a lateral direction or a vertical direction.

In some embodiments, the select post is installed at the predetermined location by using a load driving mechanism to drive the select post into the ground at the predetermined location. In some embodiments, the load driving mechanism comprises or is coupled to a hammer. In some embodiments, the load driving mechanism is mounted to and movable along a plurality of rails in a vertical direction. In some embodiments, the load driving mechanism is configured to slide along the plurality of rails via bearings. In some embodiments, the load driving mechanism comprises a retention mechanism that prevents the select post from displacing or decoupling from the load driving mechanism as the select post is being installed into the ground. In some embodiments, the retention mechanism comprises one or more shear features. In some embodiments, the load driving mechanism comprises a driving bit having one or more shear features. In some embodiments, the one or more shear features are configured to dually function as retention features. In some embodiments, the load driving mechanism is configured having a driving force length that is less than a full longitudinal length of the select post.

In some aspects, the present disclosure describes an apparatus that is configured to carry a plurality of solar modules over a terrain. In some embodiments, the apparatus may be further configured to autonomously position a select solar module from the plurality of solar modules over a set of posts installed on the terrain. In some embodiments, the apparatus may be further configured to autonomously assemble the select solar module to the set of posts without requiring or using fasteners.

In some embodiments, the apparatus can be further configured to autonomously assemble the select solar module to the set of posts by forming a plurality of post-clip interfaces. In some embodiments, the plurality of post-clip interfaces comprise a plurality of clinched joints. In some embodiments, the select solar module is pre-attached with a clip at one or more corners or sides of the select solar module, and each post in the set of posts comprises a plurality of tabs. In some embodiments, the apparatus is configured to autonomously position the select solar module over the set of posts by aligning the clip to a corresponding tab at each post. In some embodiments, the apparatus is configured to autonomously assemble the select solar module to the set of posts by clinching the corresponding tab to the clip at each post.

In another aspect, the present disclosure provides a ground mount system. The ground mount system may comprise a plurality of solar modules that each comprise a photovoltaic material and a frame. A plurality of clips can be connected to each of the corners of the frame. Each corner may be supported by a post implanted to a relatively shallow depth in the ground. An upper post portion may comprise a face joined to a tab of the clip. A lower post portion may comprise a point embedded in the ground. Increasing the frequency of vertical load-bearing post elements to occur at every intersection of the solar modules can avoid the need for deeply excavated pillars supporting massive horizontal weight transfer components, thereby minimizing the cost of materials and simplifying site preparation. In some embodiments, each of the plurality of solar modules is supported above the ground exclusively by the clip and the post without requiring an additional superstructure. In some embodiments, the lower portion further comprises a sawtooth pattern. In some embodiments, the lower portion further comprises a thread. In some embodiments, the lower portion may not or need not have any additional features other than its bends. In some embodiments, the lower portion may comprise one or more cut-outs to make the post lighter and reduce the amount of material needed to produce a rigid and stable post. In some embodiments, the clip includes a center tab configured to project into a corresponding opening in the frame. In some embodiments, the apparatus further comprises a plurality of rows, wherein solar modules of alternating rows are oriented at tilt angles of the opposite degree to form a peaked structure. In some embodiments, the face is joined to the tab by clinching.

In another aspect, a portable apparatus responsible for orchestrating component assembly and installation into the ground, is also disclosed. Depending upon the particular embodiment, the portable apparatus may be disposed in a truck (e.g., upon a platform of a truck bed), within a trailer, or may take the form of a specially-built vehicle designed for this specific purpose.

In some aspects, the present disclosure describes a method comprising, at a first location of an installation site, inserting a portion (e.g., a tapered point) of a lower end of a first post into the ground. In some embodiments, the portion of the lower end of the first post may not or need not be tapered. In some embodiments, the method further comprises attaching a first clip to a frame of a first solar module. In some embodiments, the method further comprises joining the first clip to an upper end of the first post. In some embodiments, the method further comprises moving in a linear direction to a second location of the installation site. In some embodiments, the method further comprises at the second location of the installation site, inserting a portion of a lower end of a second post into the ground. In some embodiments, the method further comprises attaching a second clip to a frame of a second solar module. In some embodiments, the method further comprises joining the second clip to an upper end of the second post. In some embodiments, the method further comprises moving in the linear direction to a third location of the installation site. In some embodiments, the portion is pushed into the ground. In some embodiments, the tapered point is pushed into the ground by a hydraulic actuator. In some embodiments, the portion is screwed into the ground. In some embodiments, the first clip is attached to the frame by lowering the first solar module. In some non-limiting embodiments, the solar modules may be raised or lower using a conveyor (e.g., a vertical conveyor). In some embodiments, the first post is joined to the first clip by a tool (e.g., a forming tool or a clinching tool). In some embodiments, the second post is joined to the second clip by the tool. In some embodiments, the method further comprises storing the first solar module, the second solar module, the first clip, and/or the second clip in a mobile installation apparatus. In some embodiments, the tool is secured to the mobile installation apparatus.

In some aspects, the present disclosure describes an apparatus comprising a platform on a vehicle. In some embodiments, the apparatus further comprises an actuator fixed to the platform and configured to insert a post into the ground at a first location of an installation site. In some embodiments, the apparatus further comprises a vertical conveyor fixed to the platform and configured to dispense to a load head, a solar module having a frame. In some embodiments, the apparatus further comprises the load head on the platform and configured to position a clip attached to the frame, proximate to the post. In some embodiments, the apparatus further comprises a tool fixed to the platform and configured to join the clip to the post. In some embodiments, the vehicle comprises a truck, a trailer, or a specially-built device. In some embodiments, the platform comprises a two-way table. In some embodiments, the apparatus further comprises a controller including at least one of a camera and a Global Positioning System (GPS) configured to determine a position of the two-way table. In some embodiments, the tool comprises a clinching tool. In some embodiments, the actuator comprises a hydraulic actuator configured to push a portion (e.g., a tapered point) of the post into the ground. In some embodiments, the vertical conveyor is configured to lower the solar module onto the clip in order to attach the clip to the frame. In another non-limiting embodiments, the present disclosure provides a system comprising one or more mobile platforms. A plurality of modules may be stacked on a mobile platform (e.g., a module installer), and one or more modules may be handled or moved by a piece of automation associated with the module installer (e.g., a robotic arm, a member, or any mechanical or structural component). The one or more modules may be moved using geolocation data and/or machine or sensor vision to a location in which one or more posts have been placed (e.g., by a mobile post installer). The one or more modules may then be installed on the one or more posts.

In another aspect, the present disclosure provides a support structure comprising a sheet metal that is shaped or bent to enable high density packing of the support structure. In some embodiments, the sheet metal comprises one or more curved or angled portions or sections. In some embodiments, the support structure further comprises one or more tabs providing a surface for connecting the sheet metal or a portion thereof to a solar module or a bracket affixable to the solar module. In some embodiments, the sheet metal is shaped or bent in a Z shape or a C shape. In some embodiments, the one or more tabs are integrated with or coupled to the sheet metal. In some embodiments, the sheet metal comprises the one or more tabs. In some embodiments, the one or more tabs correspond to a portion or a section of the sheet metal. In some embodiments, the sheet metal comprises one or more holes to allow for an interface for a tool. In some embodiments, the one or more holes are cut out of the sheet metal to reduce a weight of the support structure. In some embodiments, the sheet metal comprises the one or more tabs. In some embodiments, the one or more tabs are configured to flare out from a lower portion of the sheet metal. In some embodiments, at least a portion of the sheet metal is tapered to increase tip stress while the support structure is driven into the ground. In some embodiments, the sheet metal comprises one or more features that are engageable by a driving unit to drive the support structure into the ground. In some embodiments, the one or more features comprise a hole. In some embodiments, the one or more features comprise a protrusion. In some embodiments, the one or more features are positioned at a predetermined location between a first end and a second end of the sheet metal. In some embodiments, the one or more features permit the driving unit to drive the support structure into the ground by exerting a force at or near the predetermined location. In some embodiments, the support structure is stackable or arrangeable in one or more stacks or bundles. In some embodiments, the one or more tabs comprise a cutout feature for hanging the support structure from a hanger or a rack.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 6A is a perspective of a solar module array resulting from a ground mount system according to an embodiment.

FIG. 10 shows main tolerances of concern for a ground mount installation.

FIGS. 50A-50C show coupling mechanisms between posts and a rack, in accordance with some embodiments. In some cases, a post may comprise a Z shaped section or a Z shape. In some cases, a post may comprise a shape that is substantially stackable. In some cases, a post may comprise one or more oblique set of tabs at the top. In some cases, a tab may comprise a cutout feature. In some cases, a cutout feature may be configured to allow a post to be hung from a hanger or a rack. In some cases, one or more posts may be bundled and shipped in a container or be disposed on a machine.

FIG. 52 illustrates a method for autonomously positioning and assembling solar modules, in accordance with some embodiments. In some case, a module installer may drive to a location. In some cases, a module installer may pick up a module. In some cases, a module installer may position the module over 1, 2, 3, 4, or more posts. In some cases, a clinch tool may be used to form a connection between the module and the one or more posts. In some cases, the clinch tool may fit between ears of a post and a clip. In some cases, the clinch tool may close to form a joint. In some cases, the module installer may release the clinch tool. In some cases, an end effector may be used to lift off a module. In some cases, a module installer may drive to the next set of one or more posts to install a next module.

FIG. 60 illustrates solar module array configurations, in accordance with some embodiments. In some cases, a solar module array may comprise 4 posts for each corner of a module. In some cases, a solar module array may comprise 2 posts along a middle axis of a module.

FIG. 76 and FIG. 77 illustrate a gantry on wheels that can drive on the ground in the gaps between the array in certain configurations.

DETAILED DESCRIPTION

Figure 1:
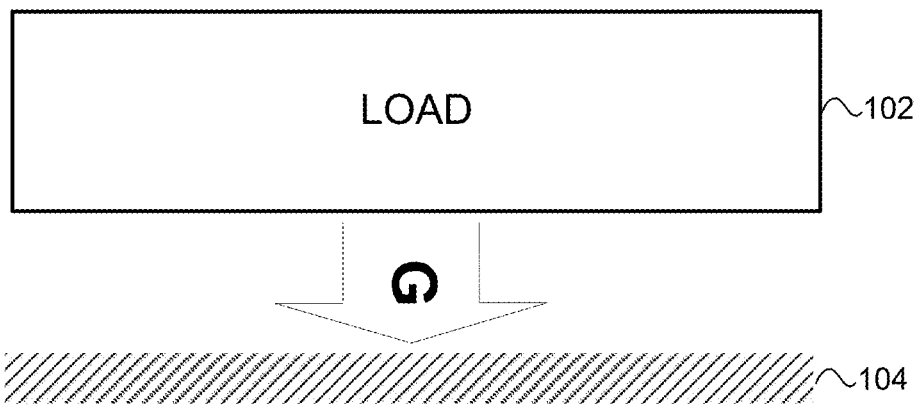
FIG. 1 is a simplified force diagram of a system for ground mount of solar panels.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

In an aspect, the present disclosure provides systems and methods for handling and deploying energy modules. The energy modules may comprise a solar module or a plurality of solar modules. The solar modules may comprise a deployable device that is configured to generate energy using one or more resources. In some cases, the one or more resources may comprise solar energy, heat energy, radiation energy, or any other type of energy.

In one aspect, the present disclosure provides a method for handling or deploying a solar module. The method may comprise using at least one robot to fully autonomously position and assemble (i) at least one solar module and (ii) its supporting structure at a sensed geolocation, without aid from a user. In some cases, a plurality of robots may be used to autonomously position and deploy, install, or assemble a plurality of solar modules and/or one or more supporting structures for the plurality of solar modules.

In some cases, a robot may refer to any machine capable of performing one or more tasks. In some cases, the robot may perform the one or more tasks autonomously (e.g., without human intervention or without external intervention from another entity) or semi-autonomously (e.g., with minimal external supervision, instruction, or intervention).

In some cases, a task may comprise transporting various components to be used for deploying an energy module as disclosed herein, for example, an energy module or a post. In some cases, a task may comprise installing various components for building an energy module disclosed herein, for example, installing a post on the ground or connecting an energy module to a given post. In some cases, a task may comprise handling and deploying an energy module.

In some cases, the robot may comprise one or more movable members. In some cases, the movable members may comprise an arm or an end effector. The movable members may be configured to handle, move, or deploy the energy modules.

In some cases, the robot may comprise one or more energy storage devices (e.g., a battery). In some cases, the one or more energy storage devices may be chargeable by a renewable energy system. In some embodiments, one or more electric charging stations may be provided and distributed across a terrain for enabling charging of one or more robots. The one or more robots may comprise, for example, a mobile platform, a vehicle, or any other machine as described elsewhere herein. In some embodiments, the one or more electric charging stations can be mobile. In such cases, the electric charging stations may be configured to travel to a robot or vehicle that needs to be charged. In other embodiments, the one or more electric charging stations can be stationary. In such cases, one or more robots or vehicles may be configured to travel to the one or more electric charging stations for charging.

In some cases, the robot may comprise a vehicle. In some cases, the vehicle may comprise one or more wheels, one or more legs, or any other member configured to transport the robot on flat or non-flat terrain.

In some cases, the robot may comprise one or more vision sensors. In some cases, the robot may perform a task based at least in part on information provided through the one or more vision sensors.

In some cases, the robot may comprise one or more computers, processors, or logic circuits in operable communication with one or more computers, processors, or logic circuits of another robot, or one or more servers (e.g., a cloud server).

Figure 4A:
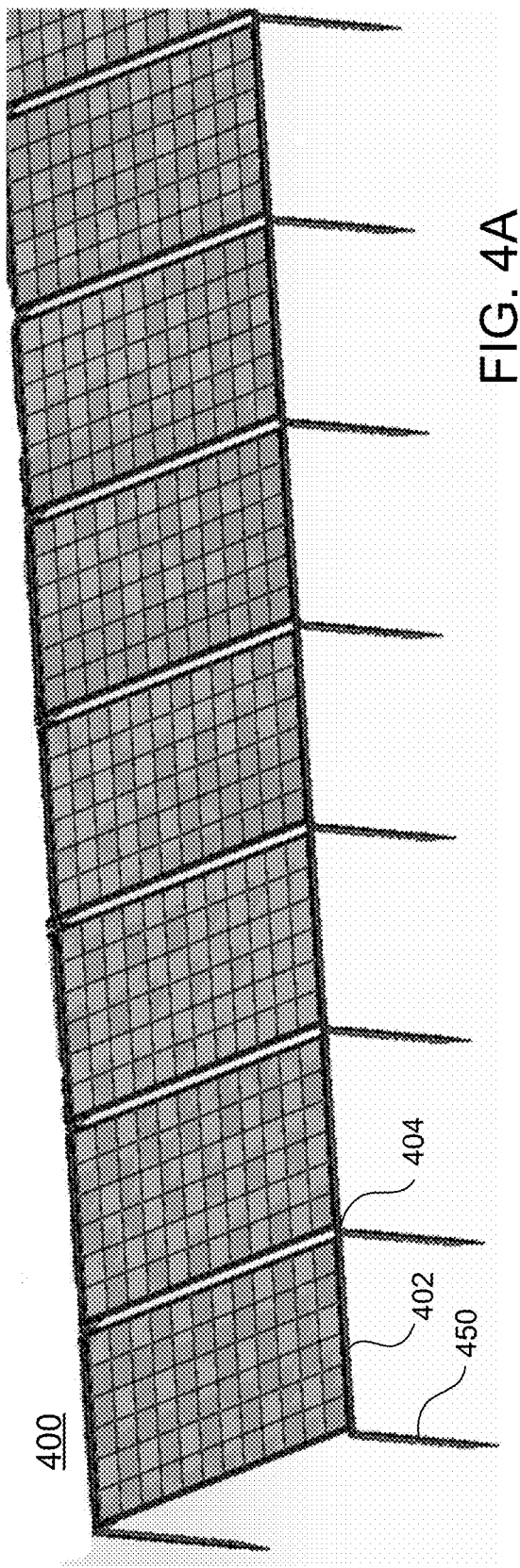
FIG. 4A shows a perspective view of a ground mount system according to an embodiment.

In some cases, a plurality of robots may be used to autonomously position and deploy a plurality of posts configured to support the plurality of solar modules. The solar modules may be affixed to one or more posts. FIG. 4C shows an enlarged view of a post 450 according to an embodiment. In some cases, the post may comprise a flat top interface 452 to offer a clinching surface for the clip. In some cases, the post may be fabricated from sheet metal (e.g., provided in a coil). In some cases, a lower portion of the post may include a sawtooth pattern 454 that is cut to impart resistance from being pulled out from the ground. In some cases, an exemplary post may be ~3 ft long, with one 1 ft exposed out of ground, and 2 ft projecting into the ground. In some non-limiting embodiments, the post may have a length ranging from about 1 ft to about 10 ft.

In some embodiments, the post may comprise a pointed end 456 for efficient driving into the ground—e.g., by (hydraulic) pushing. In some cases, the degree of tapering of this end can be determined to accommodate the shape of a corresponding tip of a next post in the coil, thereby conserving sheet metal material and reducing cost.

In some cases, the presently disclosed embodiments may allow for vertical adjustment of the dimension of the post protruding above ground. In some cases, the vertical adjustment may be accomplished by pushing deeper or by adding an upper attachment to increase post height.

In some cases, a robot may install a first post at a first location and a second post at a second location. In some cases, the first location and the second location may be sufficiently close such that an energy module may be installed to be supported by both the first post and the second post. In some cases, two separate energy modules may be installed to be supported by each of the first post and the second post, respectively. In some cases, the first post may be installed first, and the second post may be installed second. In some cases, the first post and the second post may be installed substantially at about the same time. In some cases, a first robot may install a first post at a first location and a second robot may install a second post at a second location. Various number of posts may be installed by a given robot. One or more posts may be installed at various locations by a given robot.

In some cases, the plurality of robots may be configured to operate as a fleet or a swarm. The plurality of robots may communicate with one or more servers configured to control an operation or a movement of the plurality of robots within an area or location comprising the sensed geolocation. The server may provide different commands to different robots, or command different robots to collaboratively perform one or more tasks. It shall be understood that the coordination of one or more robots may be implemented in various configurations to achieve a similar effect, for example, by using various number of robots, various types of robots, various number of posts, and various rulesets or algorithms for coordinating the robots.

In some cases, the plurality of robots may be configured to operate in a coordinated manner such that a time taken to perform the one or more tasks is optimized. For instance, a first set of robot(s) may coordinate to install one or more posts at a first location and then immediately at a second location. A second set of robot(s) may coordinate with the first set of robot(s) to install a solar module at the first location immediately as the one or more posts are installed at the first location. In some cases, the first location may be a region near the robot. In some cases, the first location may be a region near where the solar module is stored. In some cases, the second location may be near the first location. In some cases, the second location may be a geo-sensed location (e.g., a location that is determined or identified using one or more positions sensors and/or geographical or topological data). In some cases, the second location may be an approximate location, and the approximate location may be adjusted in real-time to be a more precise location.

In some cases, the method may comprise using the at least one robot to fully autonomously position and assemble the at least one solar module and its supporting structure in two or more different directions. The two or more different directions may comprise a first direction and a second direction. The first direction and the second direction may be parallel to each other. Alternatively, the first direction and the second direction may be disposed at an angle relative to each other. The angle may range from 0 degrees to 180 degrees.

In some cases, the at least one robot may use a movable member to handle the solar module or any components or supporting structures thereof. In some cases, the at least one robot may move the solar module or any components or supporting structures thereof by translating along one, two, or three Euclidean dimensions. In some cases, the at least one robot may move the solar module or any components or supporting structures thereof by rotating the solar module around one, two, or three axes of the solar module. In some cases, the at least one robot may translate and rotate the solar module simultaneously. In some cases, the at least one robot may translate the solar module and then rotate the solar module subsequently, or vice versa. In some cases, for a solar module that is substantially rectangular in shape, an axis of a solar module may be defined as the normal direction from the plane of the solar module having the largest area, the plane of the solar module having the second largest area, or the plane of the solar module having the third largest plane. The at least one robot may move the solar module in various ways, including changing a position and/or an orientation of the solar module or the components of the solar module.

In some cases, the solar module, supporting structures, and any components thereof may be repositioned and/or re-oriented to be more precise and/or ensure proper installation during deployment. In some cases, a given post may be repositioned and/or re-oriented to ensure a successful insertion of the post into the ground.

FIG. 52 illustrates an exemplary method for autonomously positioning and assembling solar modules, in accordance with some embodiments. In some cases, a module installer (e.g., a robot) may drive to a location. The location may be determined by a user or an operator of the robot, or based on sensor data. In some cases, a module installer may pick up an energy module (e.g., a solar module). In some cases, a module installer may position the module over 1, 2, 3, 4, or more posts. The posts may be installed autonomously by another robot.

In some cases, a clinch tool may be used to form a connection between the modules and the one or more posts, as described in greater detail below. In some cases, the clinch tool may fit between ears of a post and a clip. In some cases, the clinch tool may close to form a joint. In some cases, the module installer may release the clinch tool. In some cases, an end effector may be used to handle the tool and/or install the module. In some cases, a module installer may drive to another set of one or more posts to install another module.

In some embodiments, the method may comprise using the at least one robot to fully autonomously position and assemble a plurality of solar modules and associated supporting structures to construct a solar module array. In some cases, the plurality of solar modules and the associated supporting structures may comprise at least one solar module and a supporting structure for the at least one solar module.

In some cases, an array of modules, solar modules, energy modules, and the like may refer to an arrangement of a plurality of solar modules across an area or region. In some cases, the arrangement may be a lateral arrangement. In some cases, the arrangement may comprise a plurality of rows and/or columns. In some cases, the arrangement may comprise a circular pattern and/or a ring configuration. In some cases, the arrangement may comprise a hexagonal (e.g., honeycomb) pattern. In some cases, the arrangement may comprise a random configuration. In some cases, the arrangement may be based at least in part on the terrain or topology of the area or region in which the array is or will be deployed.

In some cases, the solar module arrays and/or various supporting structures (e.g., posts) can be constructed, deployed, or installed on a substantially flat terrain. In some cases, the solar module arrays can be constructed on a substantially non-flat terrain. The terrain on which the solar module arrays and/or the various supporting structures (e.g., posts) are constructed, deployed, or installed can comprise, for example, sand soil, rocks, water, ice, vegetation, grass, or any other manmade or natural surface. In some cases, the terrain may comprise a canyon, a desert, a forest, a glacier, a hill, a marsh, a mountain, a valley, an oasis, an ocean or other body of water, open terrain, a river terrain, a swamp terrain, or a tundra terrain.

In some cases, the terrain may comprise one or more flat portions and/or one or more inclined portions. In some embodiments, the inclined portions may have a slope ranging from about 1 degree to about 30 degrees or more.

Figure 72:
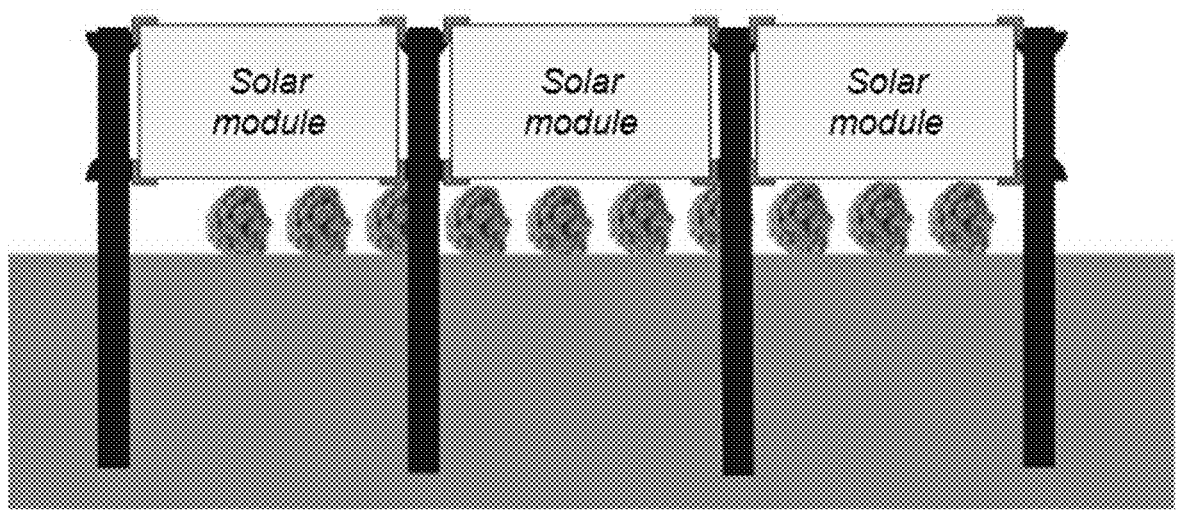
FIG. 72 and FIG. 73 illustrate an exemplary configuration in which a plurality of modules are positioned at a 90 degree orientation relative to the ground.
Figure 73:
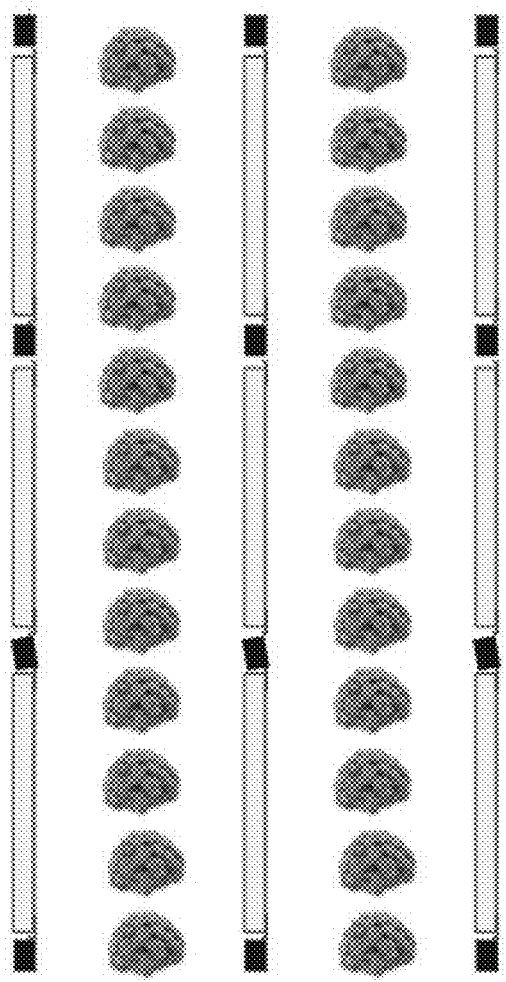

FIG. 60 illustrates various solar module array configurations, in accordance with some embodiments. In some cases, the solar module array may comprise 4 posts for each corner of a module. In some cases, the solar module array may comprise 2 posts along a middle axis of a module. In some cases, the solar module array may be a complete wired array. In some cases, the solar module array may be a dual-tilt array. In some cases, the solar module array may be a fixed tilt array. In some cases, one or more modules of the array may comprise a support bracket that is mounted directly to a post without requiring a spanning intermediate structure. In some cases, one or more modules may span two or more posts without the need for an intermediate structure between posts. FIG. 72 and FIG. 73 illustrate an exemplary configuration in which a plurality of modules are positioned at a 90 degree orientation relative to the ground. In some cases, the solar modules may be tilted to a full 90 degrees. In some cases, a plurality of posts may be affixed to one or more sides of the solar modules. In some cases, the arrangement and/or the configuration of the solar modules may permit access to the spaces between various rows in a solar module array. In some cases, the spaces between the various rows in the array may be used for growing crops. The posts, clips, and modules may be placed, installed, or deployed in accordance with any of the embodiments, methods, and/or system configurations shown and described herein.

In some cases, the modules may be configured to independently track the sun. Tracking the sun may comprise moving, repositioning, or reorienting the modules so that a working surface of the modules is able to receive one or more rays of light from the sun.

In some cases, the modules may track the sun based at least in part on a forecast, the location of the modules, or both. In some cases, the modules may track the sun based at least in part on a measured signal, e.g., amount of energy or power generated by the modules.

In some cases, the modules may each comprise an individual drive such that each module may independently track the sun. In some cases, the modules may be connected with a continuous wire or chain. The continuous wire or chain may be driven by a mechanism (e.g., one or more motors) to track the solar modules about one or more pivots on the posts. In some cases, the modules may be driven by a linkage (e.g., a 90 degree linkage) to a required angle, without requiring a tracking unit or a tracking table.

In some cases, one or more mechanisms may be disposed on one end of an array of solar modules. In some cases, one or more mechanisms may be disposed on two opposite ends of an array of solar modules. In some cases, one or more mechanisms may be disposed among the solar modules in the array. Any sufficient number of mechanisms may be disposed among the solar modules, and any sufficient arrangement of mechanisms may be disposed among the solar modules.

Figure 57:
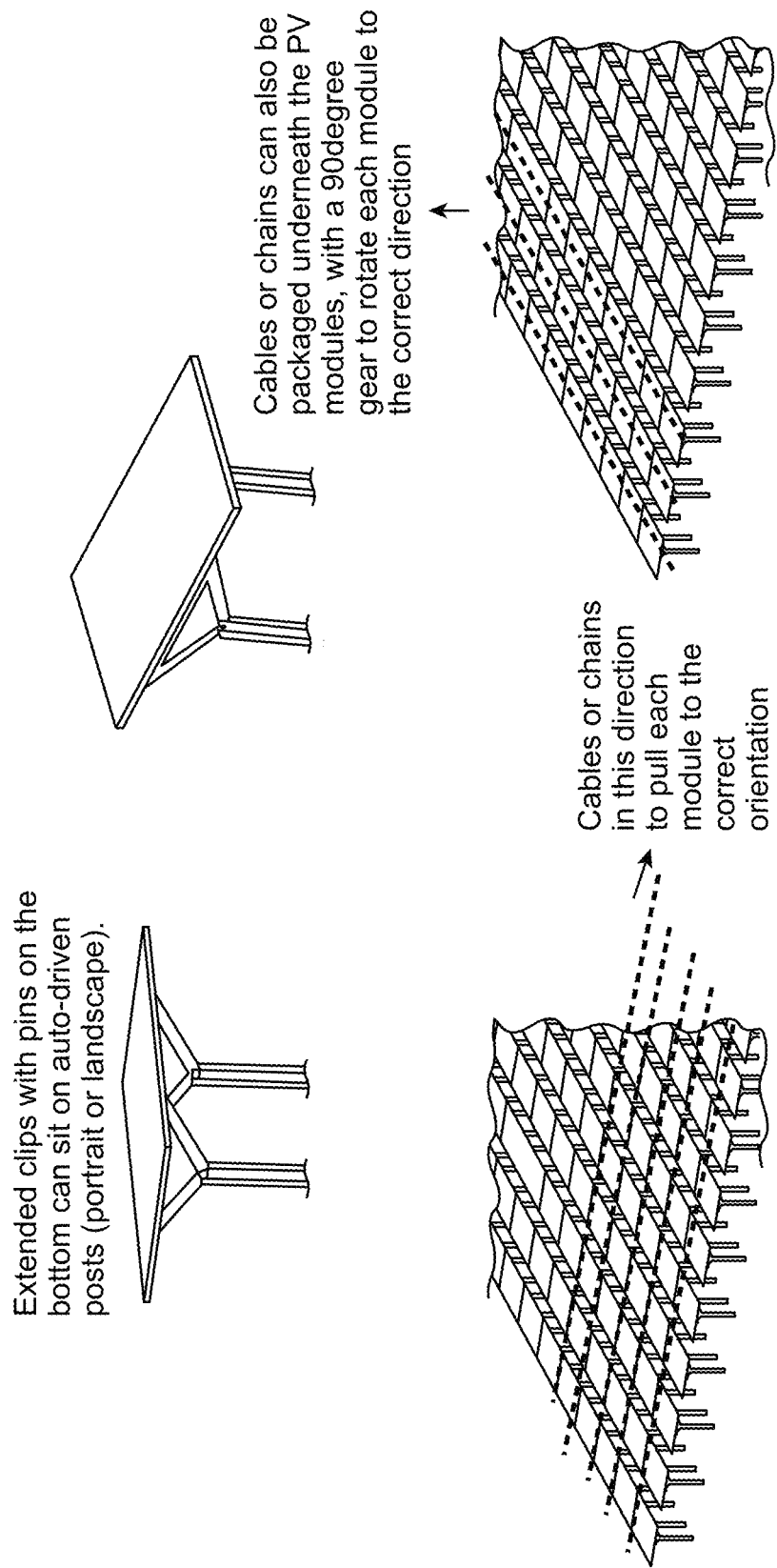
FIG. 57 illustrates a solar tracker, in accordance with some embodiments.

FIG. 57 illustrates a solar tracker, in accordance with some embodiments. The solar tracker may comprise a solar module sun tracking capabilities and/or a mechanism for moving one or more portions or components of a solar module to track the sun.

In some cases, an array of solar modules may comprise a plurality of solar modules disposed substantially linearly in at least one direction. In some cases, the linearly disposed plurality of solar modules may be coupled with one or more cables or chains along the linear direction. In some cases, the one or more cables or chains may be pulled along the linear direction, such that the plurality of solar modules are reoriented and/or repositioned.

In some cases, the plurality of solar modules may be disposed substantially linearly in at least two directions. In some cases, the plurality of solar modules may be coupled with at least two sets of one or more cables or chains along the at least two directions, respectively. In some cases, a first set of the one or more cables may be pulled along a first linear direction to reorient and/or reposition the plurality of solar modules in a first direction. In some cases, a second set of the one or more cables may be pulled along a second linear direction to reorient and/or reposition the plurality of solar modules in a second direction.

In some cases, the one or more cables or chains may be coupled above or below a given solar module. In some cases, the one or more cables or chains may be coupled to the side of a given solar module.

Figure 58:
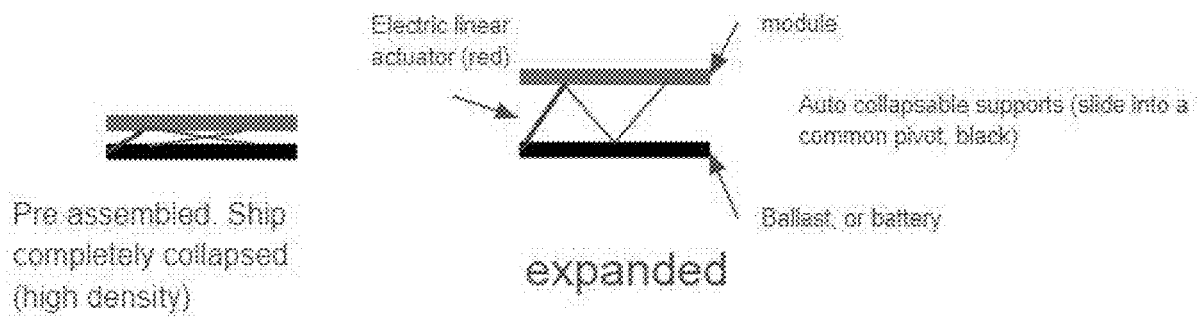
FIG. 58 illustrates a tracking unit, in accordance with some embodiments. In some cases, a tracking unit may be autonomously deployed. In some cases, a tracking unit may be pre-assembled, distributed, and placed on a field. In some cases, a tracking unit may be wired autonomously using geolocation data and/or any machine disclosed herein. In some cases, the installed tracking unit may expand to a single module solar track for tracking the sun in 1, 2, or 3 axes.

FIG. 58 illustrates a tracking unit, in accordance with some embodiments. The tracking unit may comprise a solar module with sun tracking capabilities and/or a mechanism for moving one or more portions or components of a solar module to track the sun.

In some cases, the tracking unit may be autonomously deployed. In some cases, the tracking unit may be pre-assembled, distributed, and placed on a field. In some cases, the tracking unit may be positioned, deployed, or wired autonomously using geolocation data and/or any machine or robot disclosed herein. In some cases, the tracking unit may be expandable to a single module solar track for tracking the sun in one, two, three, or more axes.

The methods disclosed herein may be implemented using a ground mount system for solar panels. The ground mount system may comprise a system, a structure, or a plurality of components configured to support or stabilize an energy module when the energy module is deployed.

FIG. 1 is a simplified force diagram of a system 100 for ground mounting solar panels, in accordance with some embodiments. Here, the active photovoltaic (PV) materials and any associated components (frames, beams, pillars, superstructure, junction boxes, wiring) represent a physical load G 102 that may be safely and reliably supported above the ground 104 against at least the force of gravity, as well as against possible external forces (e.g., wind, seismic).

Figure 2:
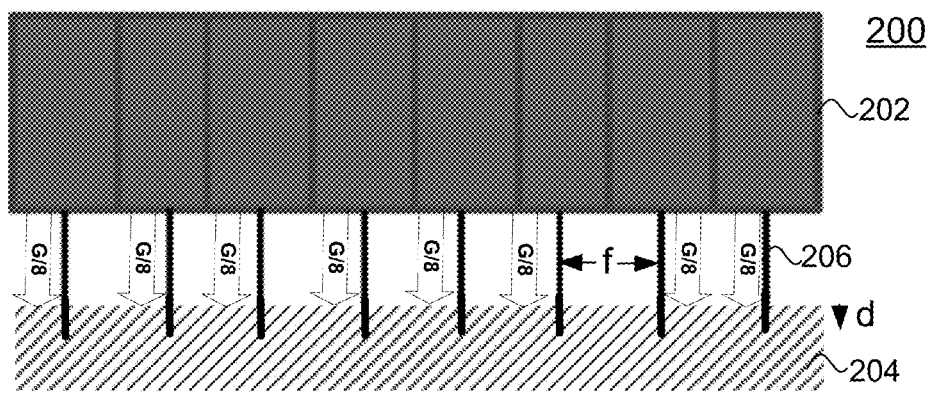
FIG. 2 shows a simplified view of an embodiment of a ground mount system.

FIG. 2 shows a simplified view of an embodiment 200 of a ground mount system for solar modules, in accordance with some embodiments. Here, a plurality of solar modules 202 are reliably supported above the ground 204 by a plurality of posts 206. In some cases, no separate and distinct superstructure may be needed. In some cases, these posts may be relatively small in size, and can be installed with a high frequency f. In some cases, each post may bear a much smaller portion of the overall load. Moreover, for the embodiment of FIG. 2, installation efficiencies may not require large blocks of solar modules distributed over large land areas. As a result, loads may be dictated by expected local peaks that are smaller in size. As a result of the reduced load required to be borne by each post, posts may penetrate the ground to a shallower depth. In some cases, additional supporting material (e.g., concrete) may not be required to secure the post within the ground. In some cases, this installation structure may allow for simpler, less expensive, and less invasive installation techniques, e.g., by (hydraulic) pushing or threading as described herein.

Figure 3:
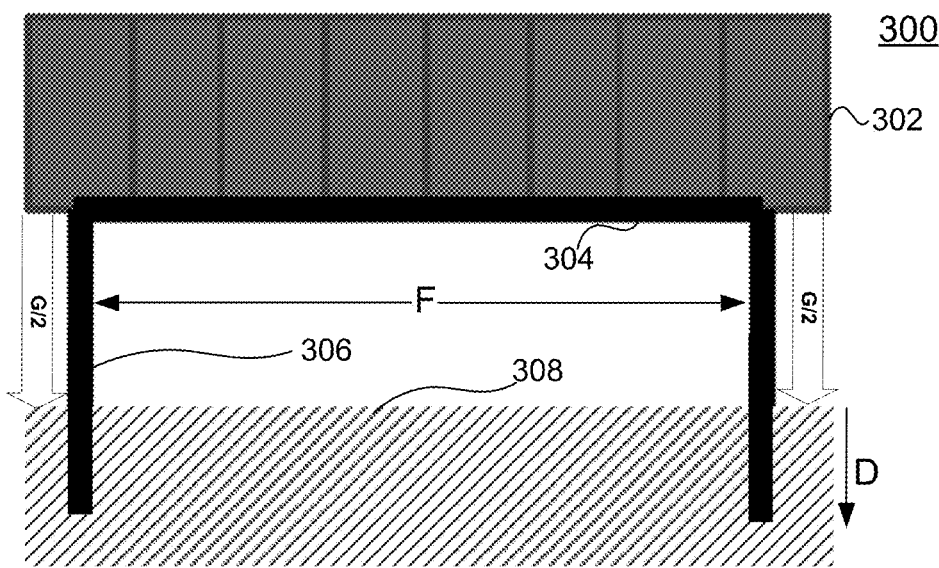
FIG. 3 shows a simplified view of a conventional ground mount installation.

FIG. 3 shows a conventional ground mount structure 300 for supporting solar modules 302, in accordance with some embodiments. This is a connected structure comprising a separate superstructure 304 and relatively massive pillars 306. These pillars occur at a relatively low frequency (F), and each bears a relatively large fraction of the entire load. In some cases, they are sunk to a substantial depth (D) within the earth 308—and may be secured therein with additional materials (not shown) such as concrete.

Instead of relying on separate, distinct, and massive superstructure components for structural stability, some embodiments of the present disclosure may utilize interconnectedness between modules in order to provide stability. FIG. 4A shows a perspective view of a ground mount system 400, in accordance with some embodiments. In some cases, many posts 450 may support a row of solar modules 402. In some cases, rectangular solar modules comprising seventy-two cells are shown. Various embodiments may support solar modules of various types. At each corner, the solar modules may be secured by a clip 404 to a respective post.

Figure 4B:
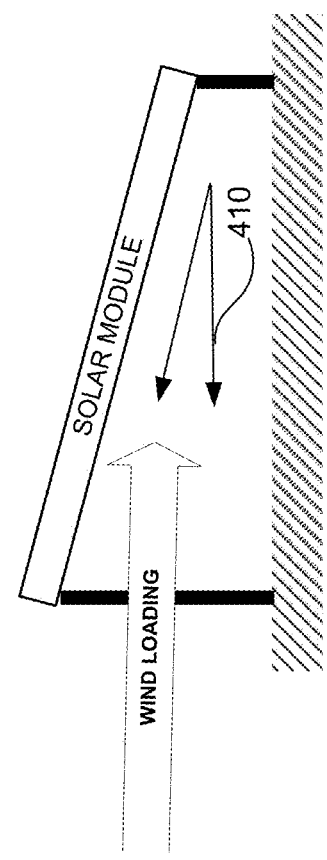
FIG. 4B is an end view of the ground mount system of FIG. 4B, showing loading forces.
Figure 4C:
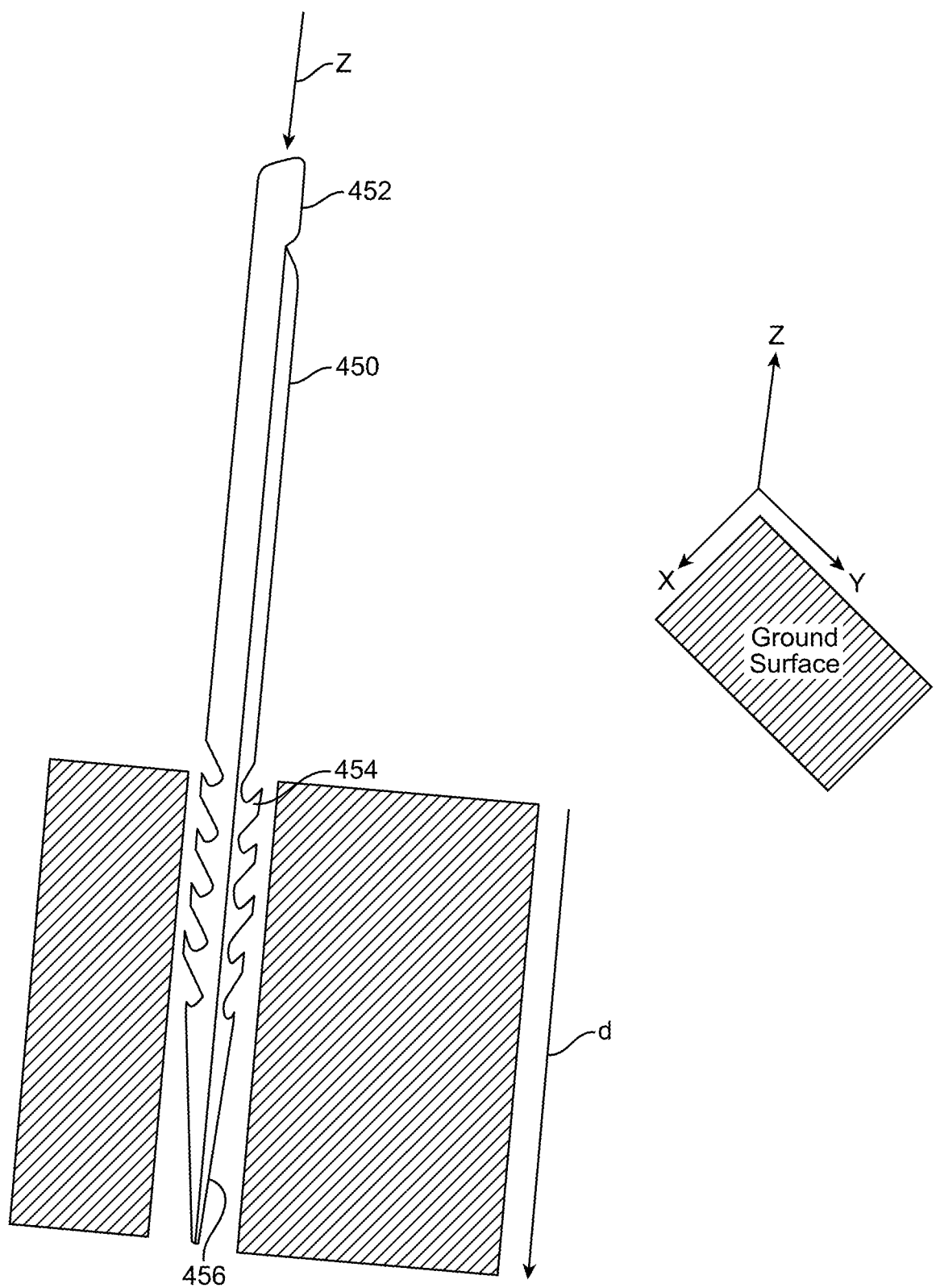
FIG. 4C shows an enlarged view of a post according to an embodiment.

FIG. 4B is an end view of the ground mount system of FIG. 4A, in accordance with some embodiments. FIG. 4B shows the tilt angle 410 provided by the ground mount, which orients the solar module to catch the sun's rays. FIG. 4B shows that wind can infiltrate the open side of the row, creating wind loading forces, in accordance with some embodiments.

Figure 5A:
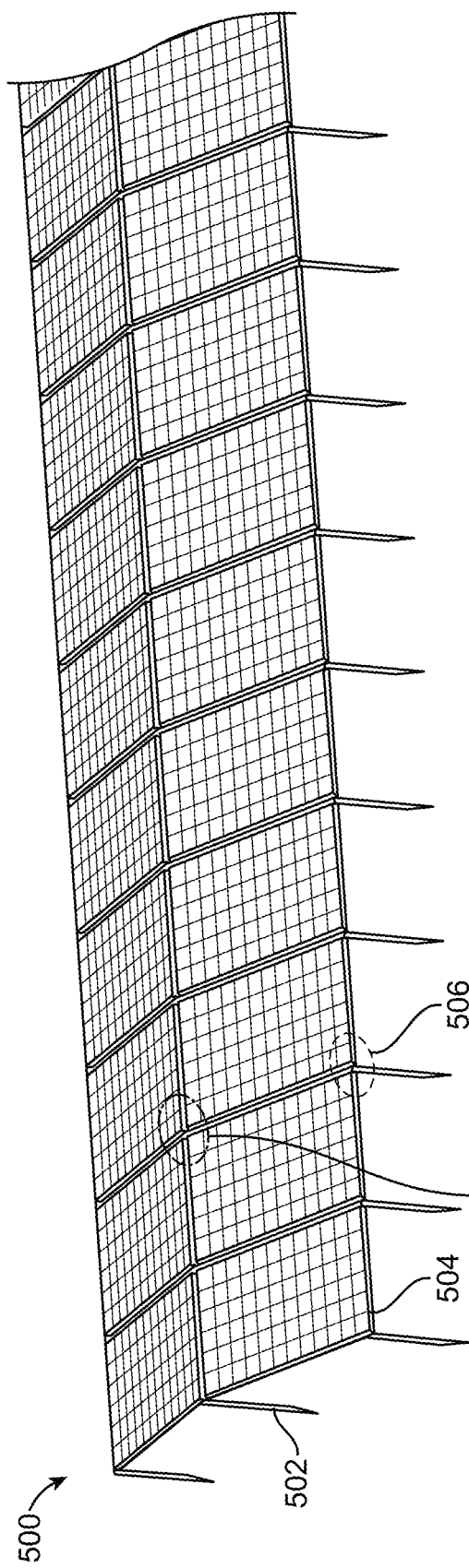
FIG. 5A shows a perspective view of a ground mount system according to an alternative embodiment.
Figure 7A:
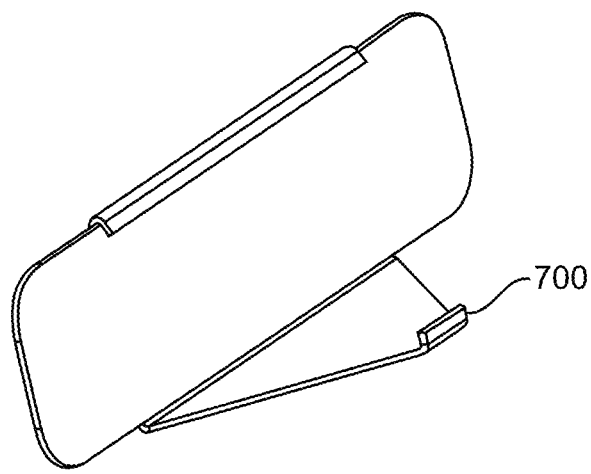
FIG. 7A shows a perspective view of an end clip according to an embodiment.
Figure 7B:
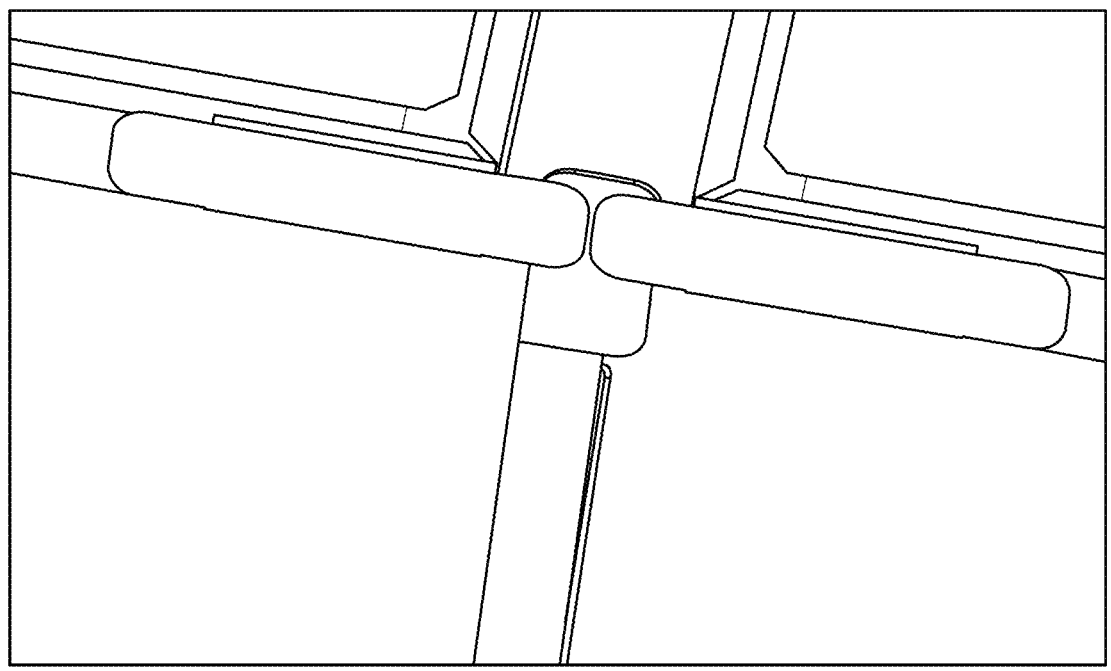
FIG. 7B shows a perspective view of an end clip with two modules attached.
Figure 8A:
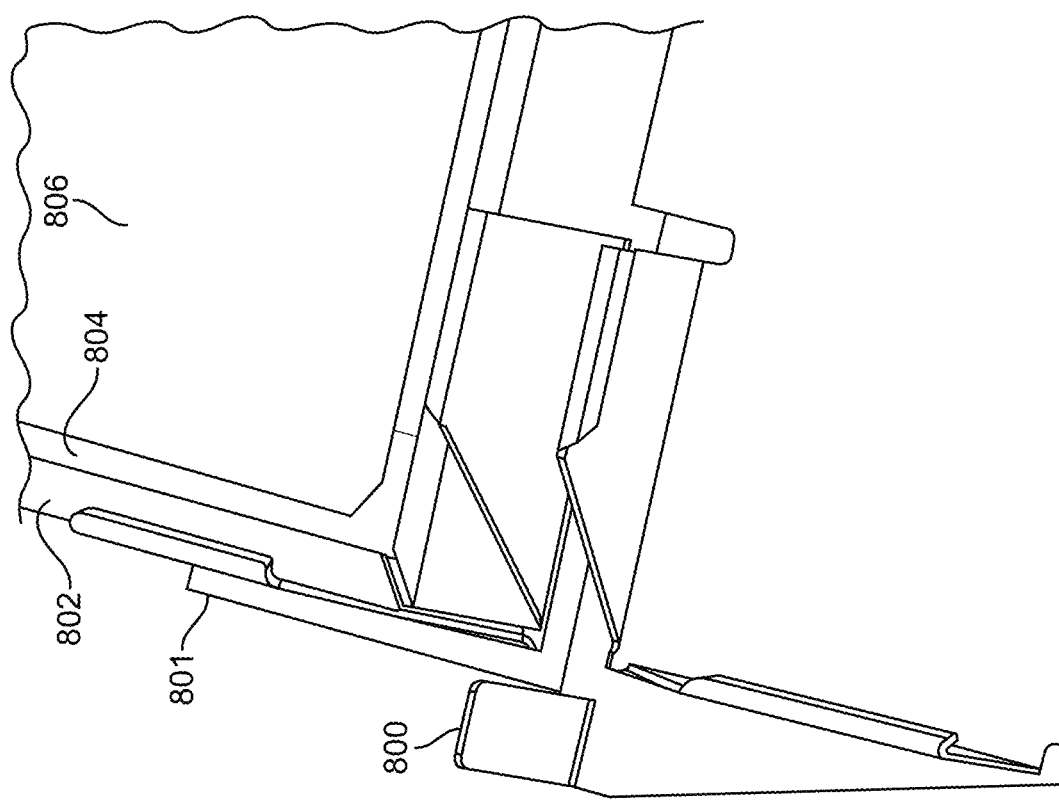
FIG. 8A shows a perspective view of a corner clip according to an embodiment.
Figure 8B:
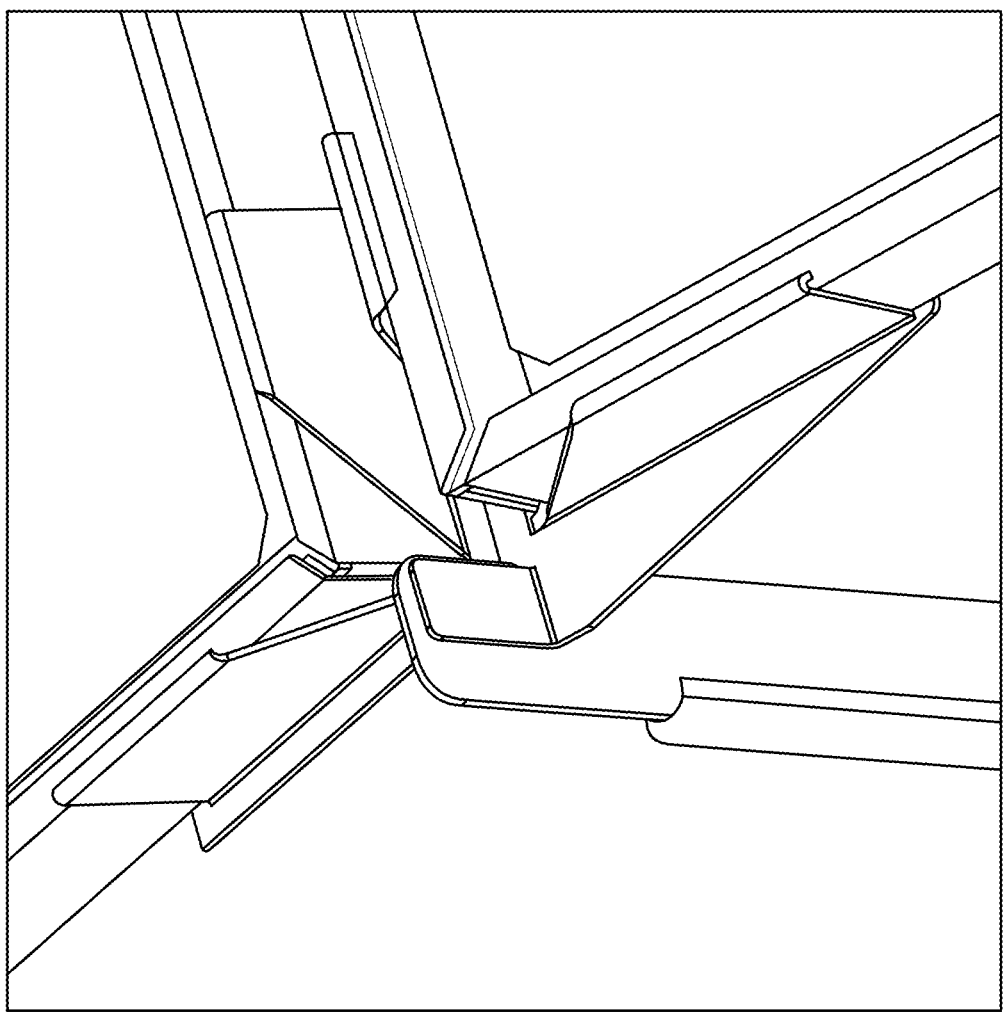
FIG. 8B shows a perspective view of the corner clip embodiment connected to two modules and a post.
Figure 8C:
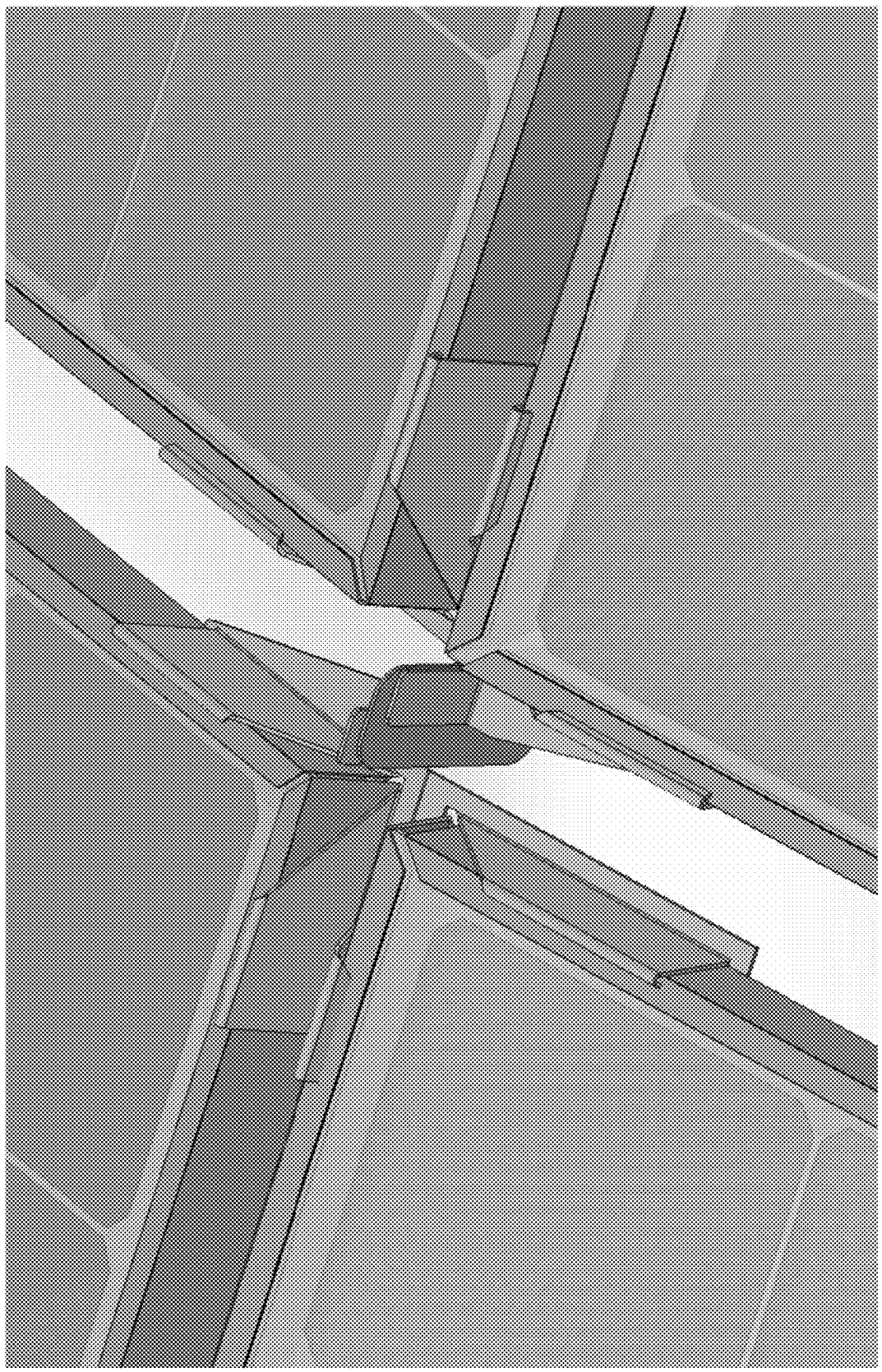
FIG. 8C shows a perspective view of a pair of corner clips and attached modules, connected to a post.
Figure 74:
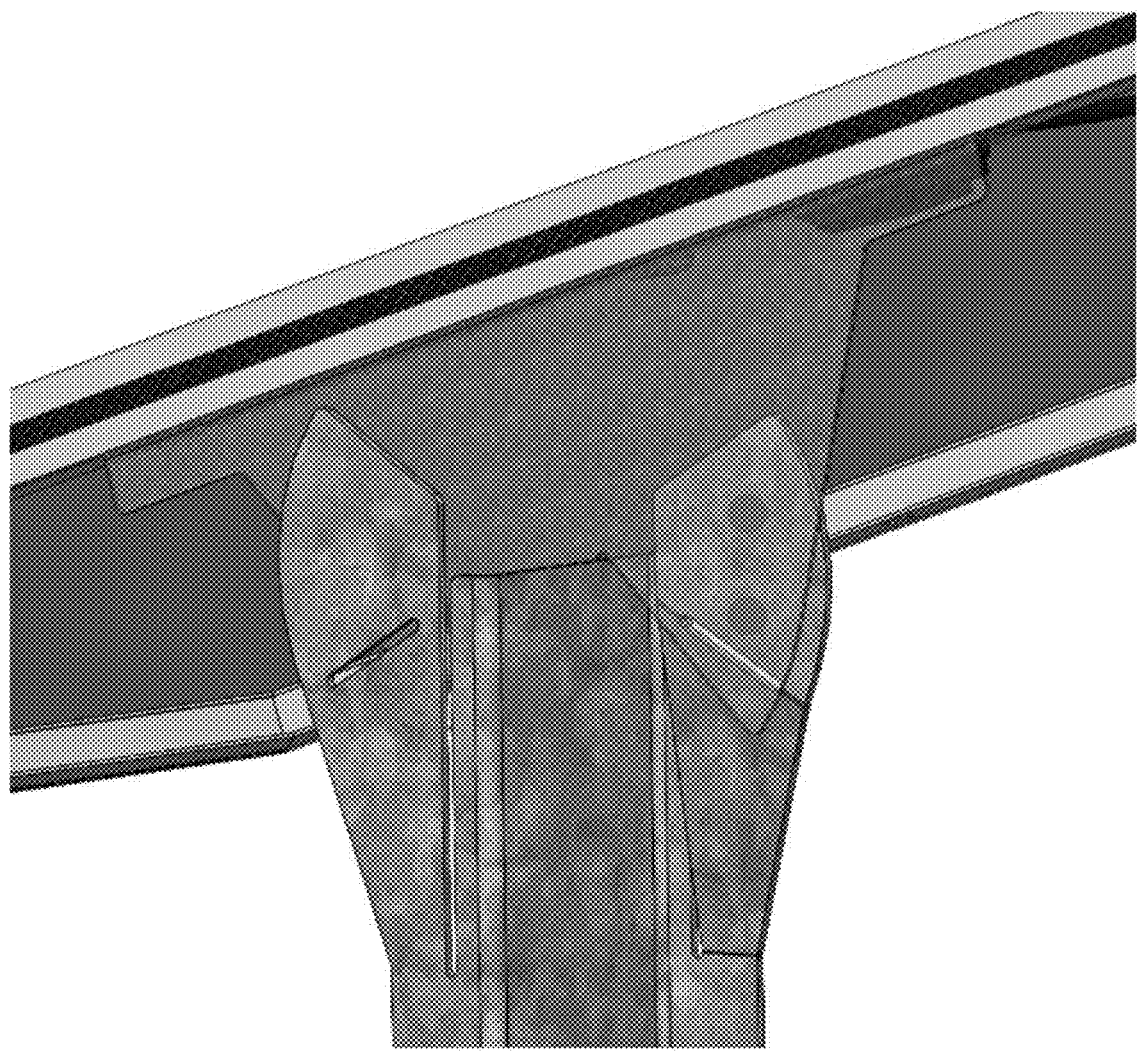
FIG. 74 illustrates an example of a middle clip, in accordance with some embodiments.

While the ground mount embodiments of FIGS. 4A and 4B show a single row of modules supported at a same tilt angle, alternative embodiments may feature rows with different tilt angle orientations. For instance, FIG. 5A shows a perspective view of a ground mount system 500, in accordance with some embodiments. In some cases, adjacent rows sharing common posts 502, may alternate in tilt angles to create a peaked structure. In some cases, solar modules 504 may be secured to posts by clips having different shapes. One type of clip may be an end clip 506 that is present on a side of a row having no adjacent row on one side. FIGS. 7A and 7B depict examples of end clips, in accordance with some embodiments. FIG. 7A shows a perspective view of an end clip according to an embodiment. As shown, the end clip is symmetric on both ends of module. The end clip captures bottom side of frame and top side of frame. FIG. 7B shows a perspective view of an end clip with two modules attached, in accordance with some embodiments. The center protrusion 700 may prevent the module sliding from laterally. According to an embodiment, the end clip may be fabricated from 1 mm sheet metal. Another type of clip may be a middle clip 508 that is present between adjacent rows. FIG. 74 illustrates an example of a middle clip. The middle clip may be used for solar modules that interface with a post in a middle region of the lateral sides of the module. In some cases, the clip may have an angular opening to accommodate multiple tilt angles, and to facilitate autonomous positioning or alignment of the clip and/or the module. In some cases, the post may have a flat face and a cutout such that the post flange can be bent in and clinched (dimpled) to the module clip in the locations corresponding to the green dots. The module clip may be mounted with a rivet or a bolt, or clinched to the module frame at its standard mounting points on the bottom flange. Another type of clip may be a corner clip. FIGS. 8A-8C depict examples of corner clips. FIG. 8A shows a perspective view of a corner clip 801 connected to a frame 802 of a solar module 804 that comprises photovoltaic material 806 (e.g., a plurality of solar cells). The clip may comprise a center tab 800. FIG. 8B shows a perspective view of the corner clip connected to two modules and a post, in accordance with some embodiments. The center tab 800 that mates (e.g., by clinching) with the face of the post tab, may be long enough to handle tolerances and imparts flexibility to accommodate tolerances in at least the row direction. FIG. 8C shows a perspective view of a pair of corner clips and attached modules, connected to a post, in accordance with some embodiments. In some cases, the clips may exhibit a single, mirrored design such that the tabs land on opposite sides of the post. The corner clips shown and described herein may not or need not require the use of a fastener to clip on to a module.

Figure 5B:
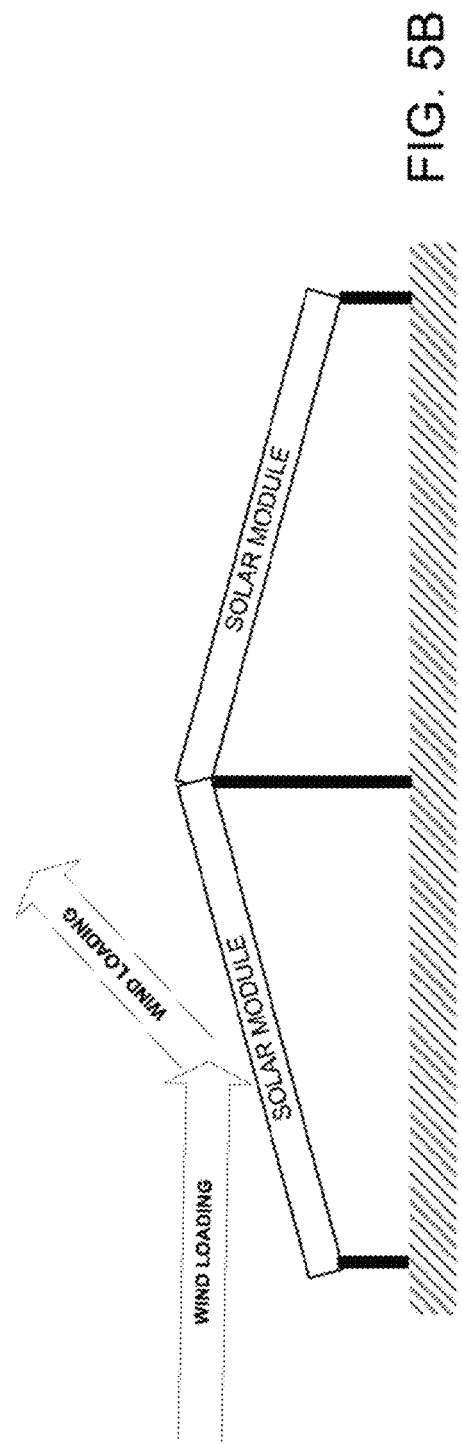
FIG. 5B shows is a simplified end view of the embodiment of FIG. 5A showing loading forces.

FIG. 5B shows is a simplified end view of the embodiment of FIG. 5A showing loading forces. In some cases, the inability of wind to flow underneath the raised side of the module rows, can substantially reduce wind loading forces to which the ground mount system is expected to be exposed.

FIG. 6A is a perspective of a solar module array resulting from a ground mount system according to an embodiment. In some cases, the array may comprise a plurality of short (two module) rows, separated by a small spacing S. In some cases, many rows may be spaced closely together, conserving land area and increasing installation efficiency.

Figure 6B:
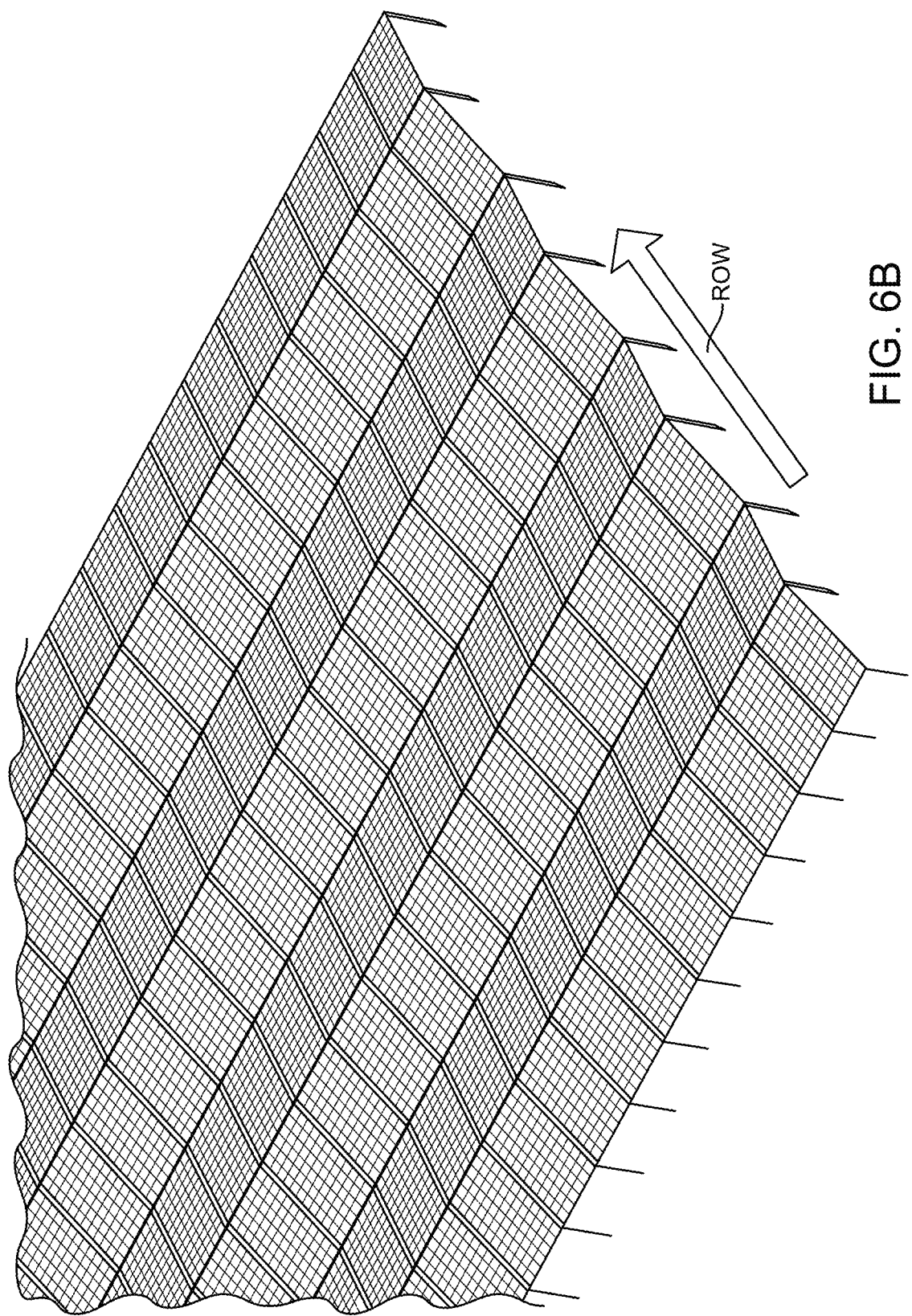
FIG. 6B is a perspective view of another solar module array resulting from a ground mount system according to an embodiment.

FIG. 6B is a perspective view of another solar module array resulting from a ground mount system according to an embodiment. In some cases, the array may comprise longer rows of modules. In some cases, the corners of each row may be adjacent to the corners of the next row, and supported by the same post.

Figure 6C:
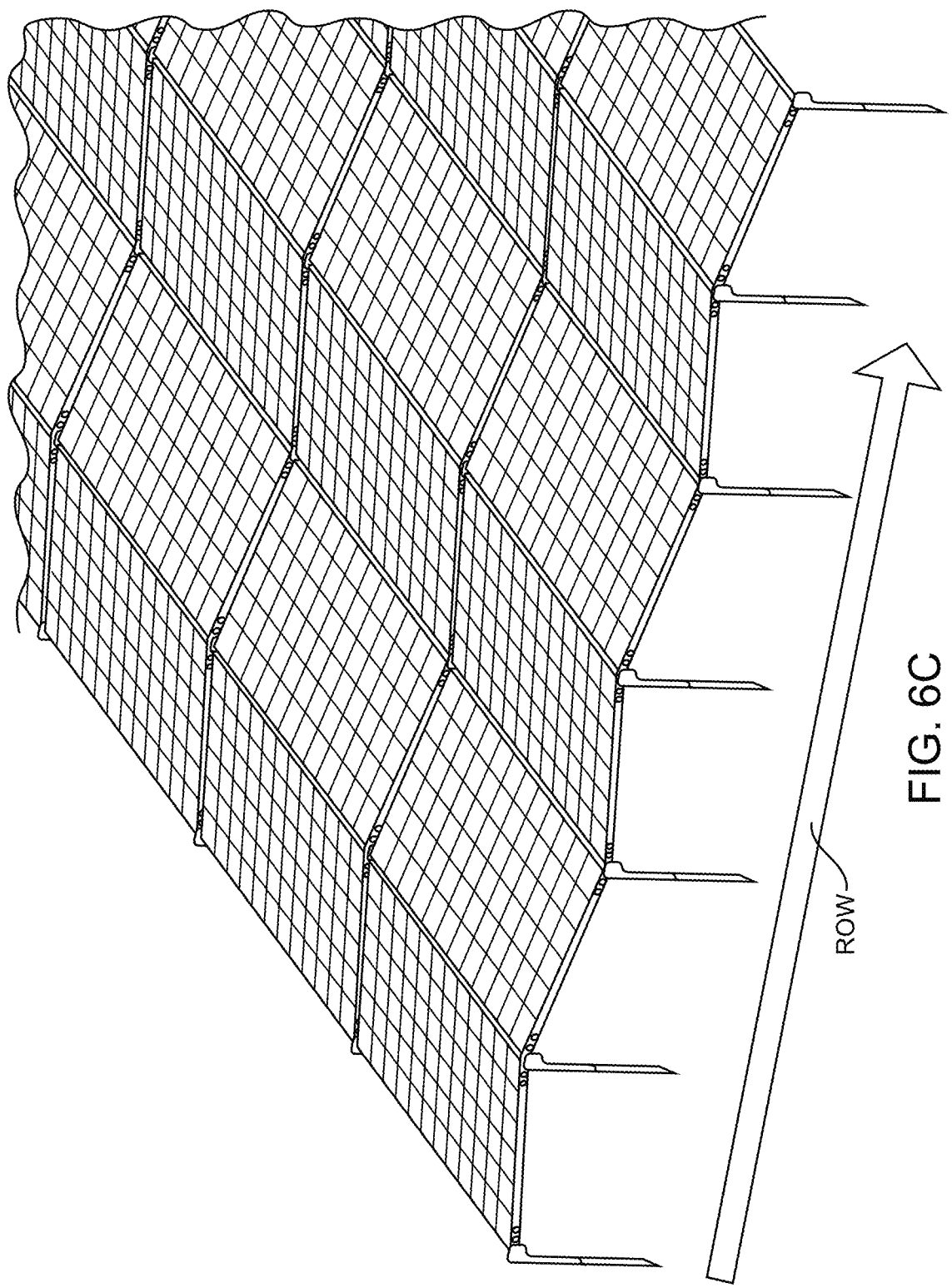
FIG. 6C shows a perspective view of an alternative embodiment with portrait-oriented solar modules with short ends aligned in the row direction.

While FIGS. 6A and 6B show solar arrays having rows of landscape-oriented solar modules with long ends aligned in the row direction, this is not required. FIG. 6C shows a perspective view of an alternative embodiment with portrait-oriented solar modules having their short ends aligned in the row direction.

Figure 9:
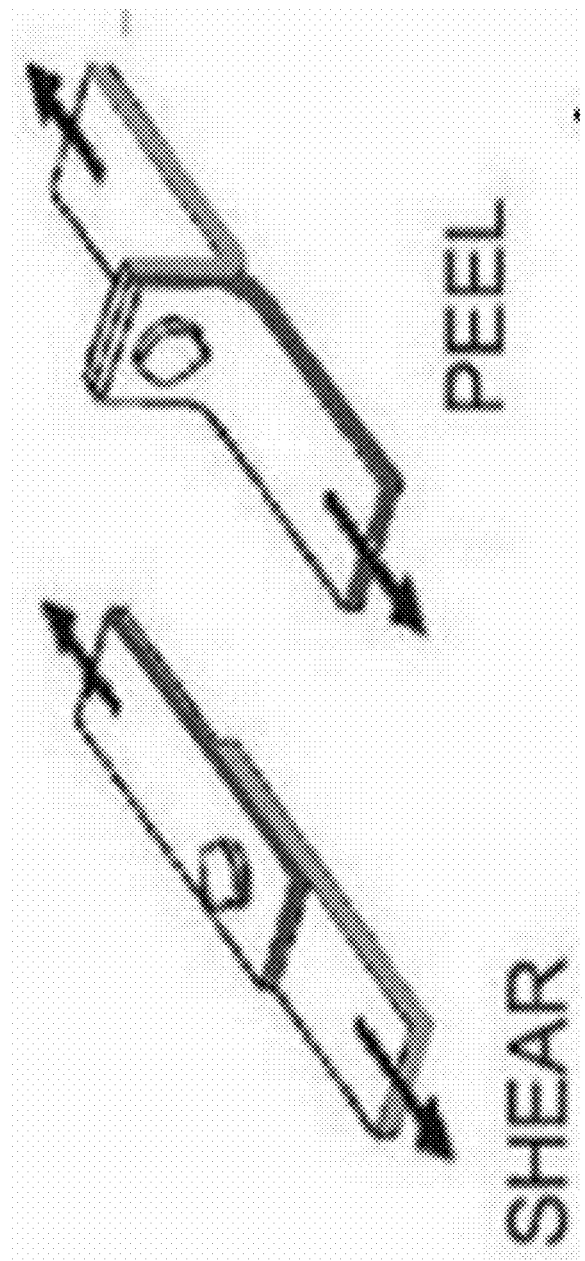
FIG. 9 illustrates forces to which a ground mount system may be subjected.

FIG. 9 illustrates peel and shear forces to which the ground mount system may be subjected. Particular embodiments may provide at least about 400 lbs shear strength, and/or at least about 200 lbs of peel strength.

FIG. 10 shows main tolerances of concern for a solar array installation, in accordance with some embodiments. In some cases, spacing between posts and/or angles of solar modules may be adjusted along a row, such that the solar array can be positioned or aligned in a desired orientation. FIG. 10 also shows a tilt axis angular alignment, in accordance with some embodiments. In some cases, the angular orientation of the solar modules may be fixed or movable. In some cases, the solar modules may have a dual tilt angle. FIG. 10 further shows ground mount installation on a slope, in accordance with some embodiments. In some cases, a tracker may adjust an angle of a solar module from at least about 1° to about 10° or more in addition to the angle of the slope.

Figure 10A:
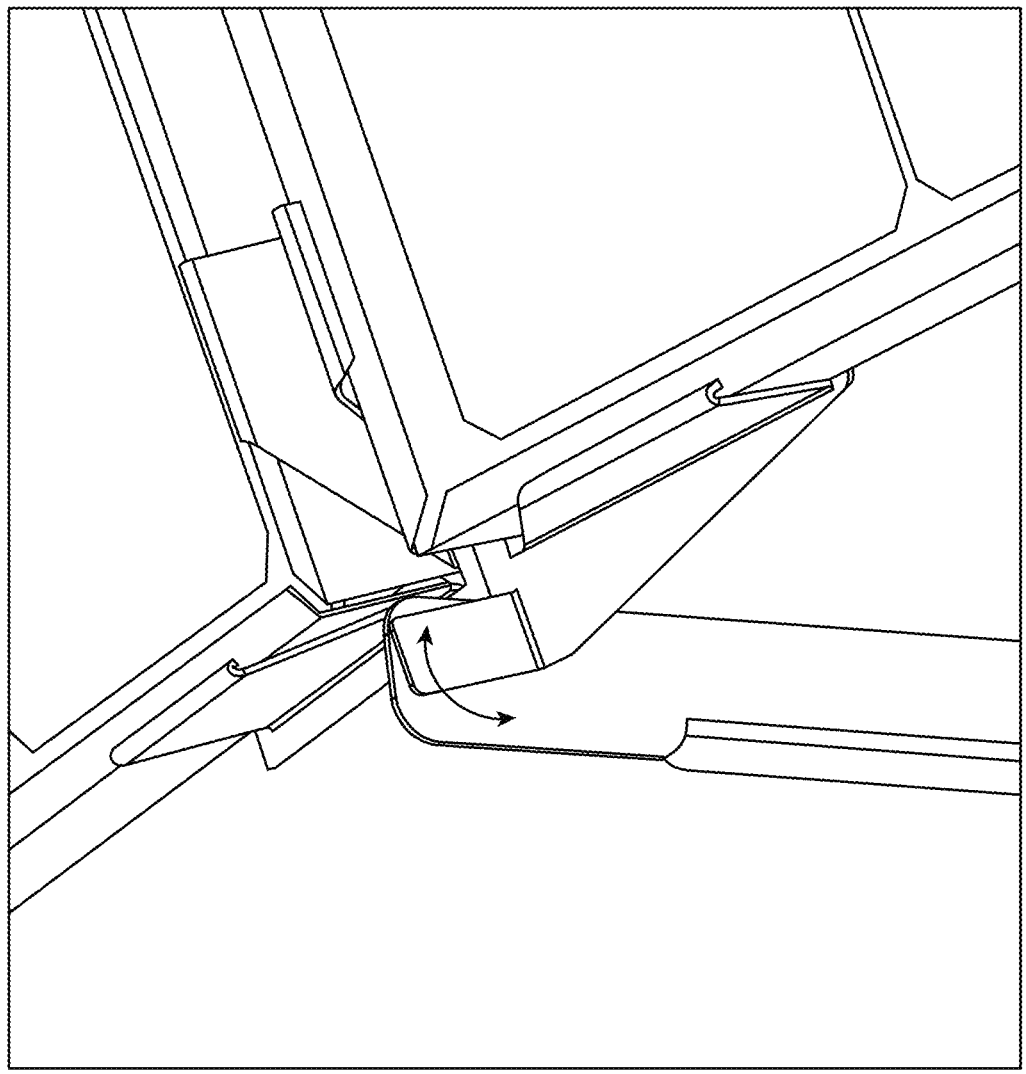
FIG. 10A shows a perspective view of two clips clinched in place onto a post.
Figure 10B:
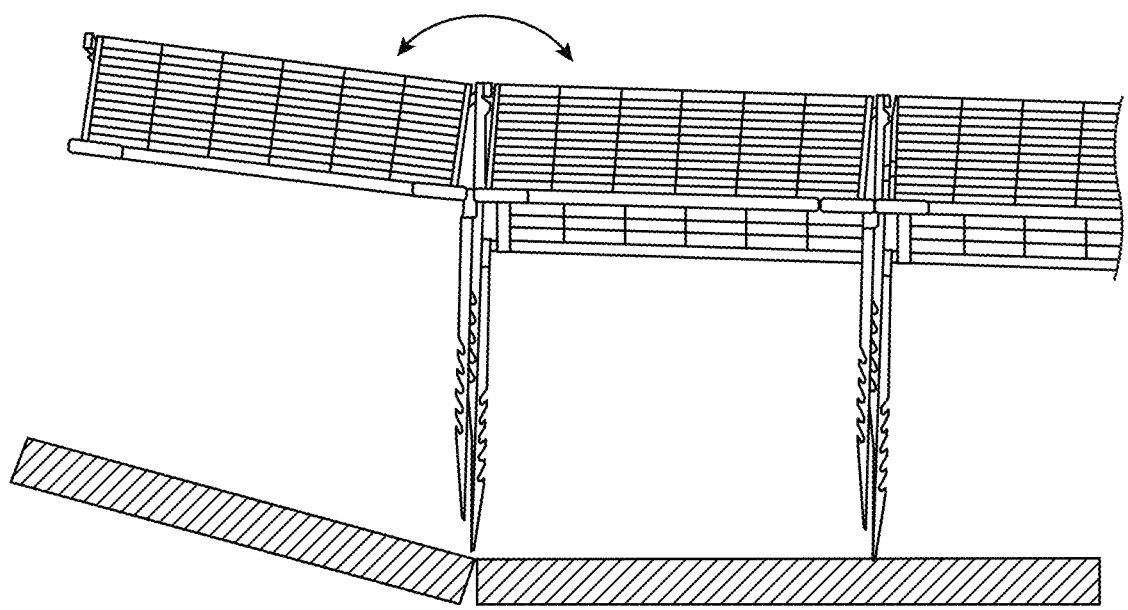
FIG. 10B is a side perspective view showing the impact of terrain upon installation.
Figure 10C:
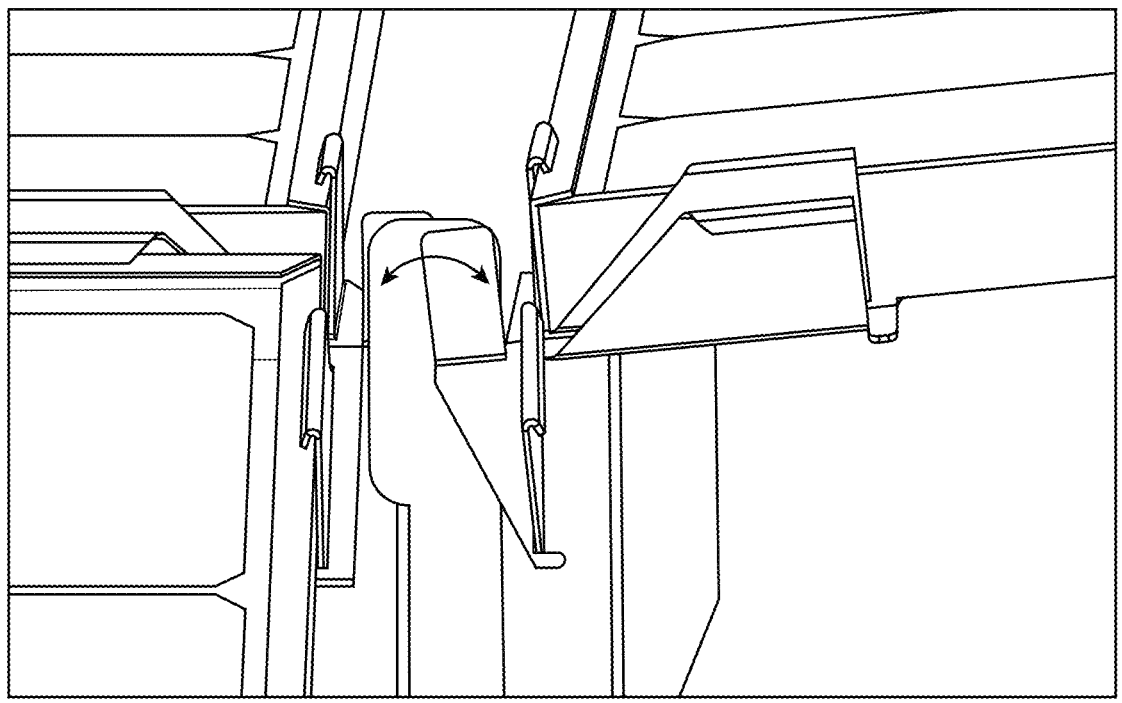
FIG. 10C is an enlarged view showing the ability of a ground mount system according to embodiments, to handle relatively high tolerances.

FIG. 10B shows a side perspective view indicating the impact of uneven terrain upon installation, in accordance with some embodiments. FIG. 10C is an enlarged view showing the ability of the components of some embodiments disclosed herein, which may rotate relative to each other in order to accommodate tolerances.

While some embodiments have shown a post with the ground end having a sawtooth pattern, this is not required. Alternative embodiments may utilize posts in the form of ground screws. In some embodiments, the post may comprise two sections, with a screw portion going in first, and a top portion (allowing vertical adjustment) attached to the screw portion.

Figure 10D:
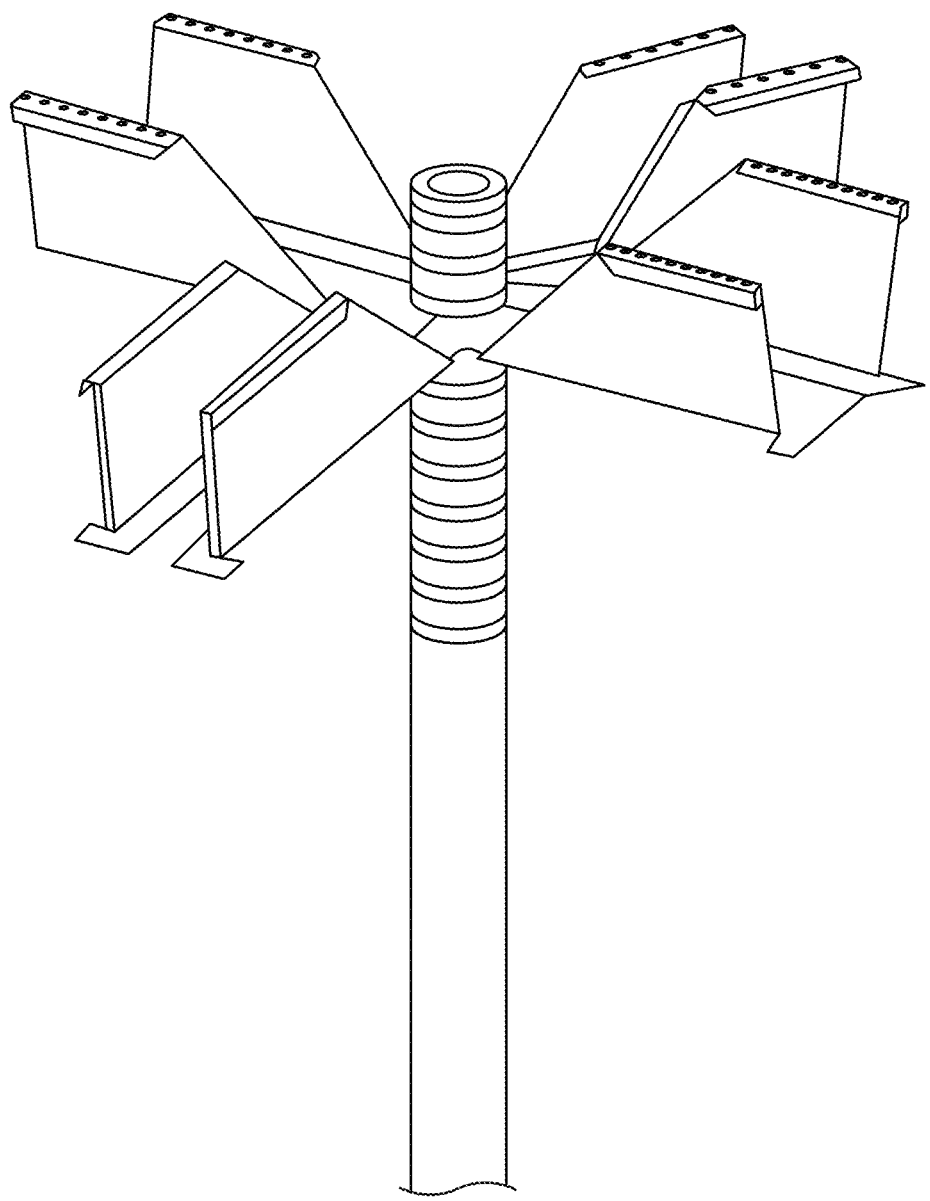
FIG. 10D shows a perspective view of an alternative post embodiment.

FIG. 10D shows a perspective view of an alternative embodiment featuring a ground screw. In some cases, a four way clip can be retained by standard retaining rings that snap into grooves on the post. In some cases, the vertical tolerances can be accommodated by having multiple grooves. In some cases, angular tolerances can be accommodated by oversizing the hole. In some cases, a component can withstand at least about 10 lbs, 20 lbs, 30 lbs, 40 lbs, 50 lbs, 100 lbs, 200 lbs, 300 lbs, 400 lbs, 500 lbs, or more of uplift at a corner area.

FIG. 10A shows a perspective view where a clip that has been clinched in place onto a post tab (e.g., using a tool of an installation machine), has rotated substantially to accommodate tolerances. In some cases, clinching may be performed in situ (e.g., when the module makes contact with the post tab), which may lock in the position of the solar module while accommodating for some additional flexibility. According to some embodiments, a clinching tool may perform at least 2 punches (e.g., 800 lbs shear/400 lbs peel) for the full joint.

Figure 14:
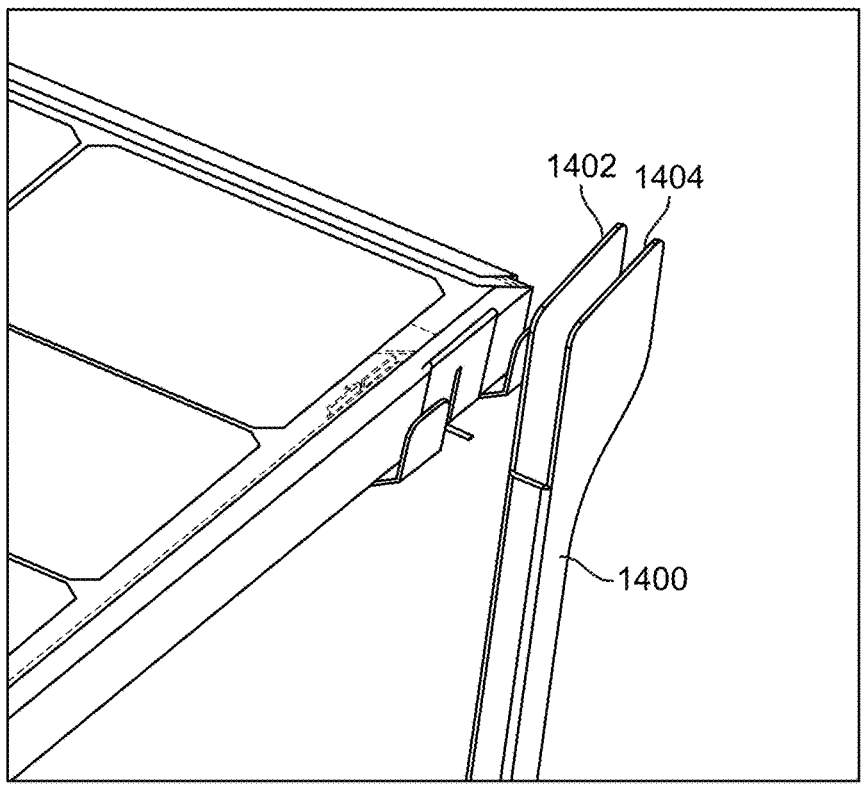
FIG. 14 is a simplified perspective view showing the clip/module assembly, adjacent to an alternative embodiment of a post.
Figure 15:
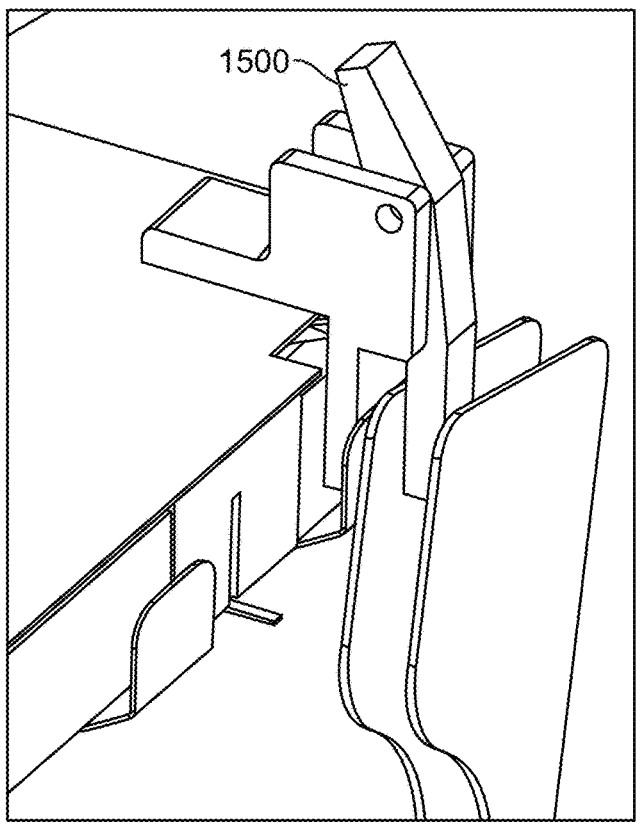
FIG. 15 is a simplified view showing a clinching tool that can be used to clinch together the clip to a face of the post.
Figure 15A:
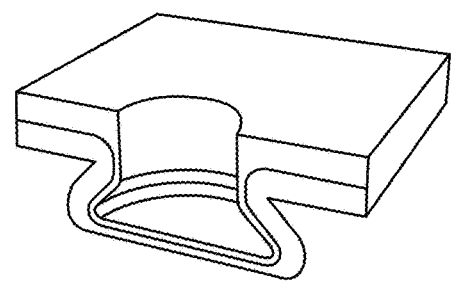
FIG. 15A shows a simplified view of a resulting clinching joint.
Figure 15C:
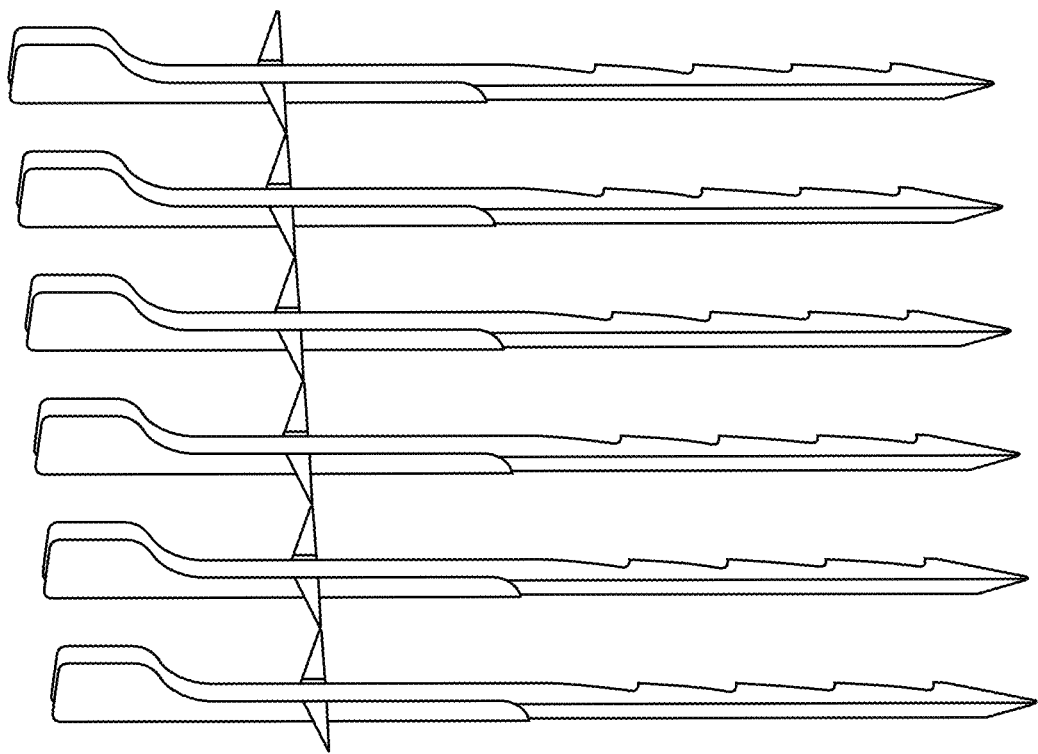
FIG. 15C shows fabricated posts maintained in a bandoliered structure after progressive stamping.
Figure 15B:
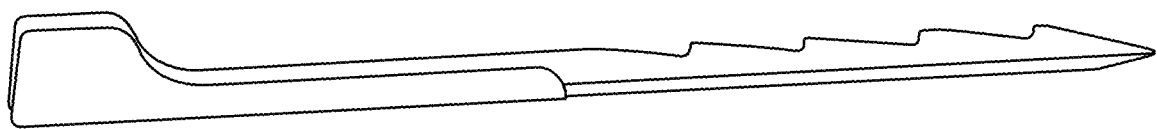
FIG. 15B shows a view of a post according to an alternative embodiment.

FIG. 14 is a simplified perspective view showing an embodiment of a clip/module assembly, adjacent to an alternative embodiment of a post. The post 1400 may comprise two opposing large tabs 1402 and 1404 at the top, which provide large faces for the clips to be clinched against. FIG. 15 is a simplified view showing a clinching tool 1500 that can be used to clinch together the clip to a face of the post, in accordance with some embodiments. FIG. 15A shows a simplified view of a resulting clinching joint, in accordance with some embodiments. FIG. 15B shows a view of a post according to an alternative embodiment. With two large tabs at the top, faces of large areas may be provided to clinch with the clips. FIG. 15C shows fabricated posts maintained in a bandoliered structure after progressive stamping, in accordance with some embodiments.

The clips and clinching operations disclosed herein may permit the forming of a joint from two or more plates that overlap at least partially. The plates may not or need not be parallel to each other, and in fact can be angled relative to each other (e.g., depending on the terrain or the spatial configuration of other components associated with the solar modules or the supporting structures for such modules). The plates may be provided in different positions or orientations relative to each other, and can be deformed uniquely to accommodate a wide range of angular or positional variations for the plates, the posts, the surrounding terrain, or the positioning of any solar modules relative to the plates or the posts. The presently disclosed systems and methods may permit wide tolerances in the way that a joint is shaped or formed, to simplify the installation process and provide additional flexibility in how various components or systems are assembled relative to each other, without comprising structural integrity. The wide tolerances may also permit the installation of posts and solar modules without the need to precisely fine tune the positions, the orientations, and/or the relative alignment of the posts or solar modules, especially when said posts or solar modules are installed on uneven terrain with changing contours.

Figure 16:
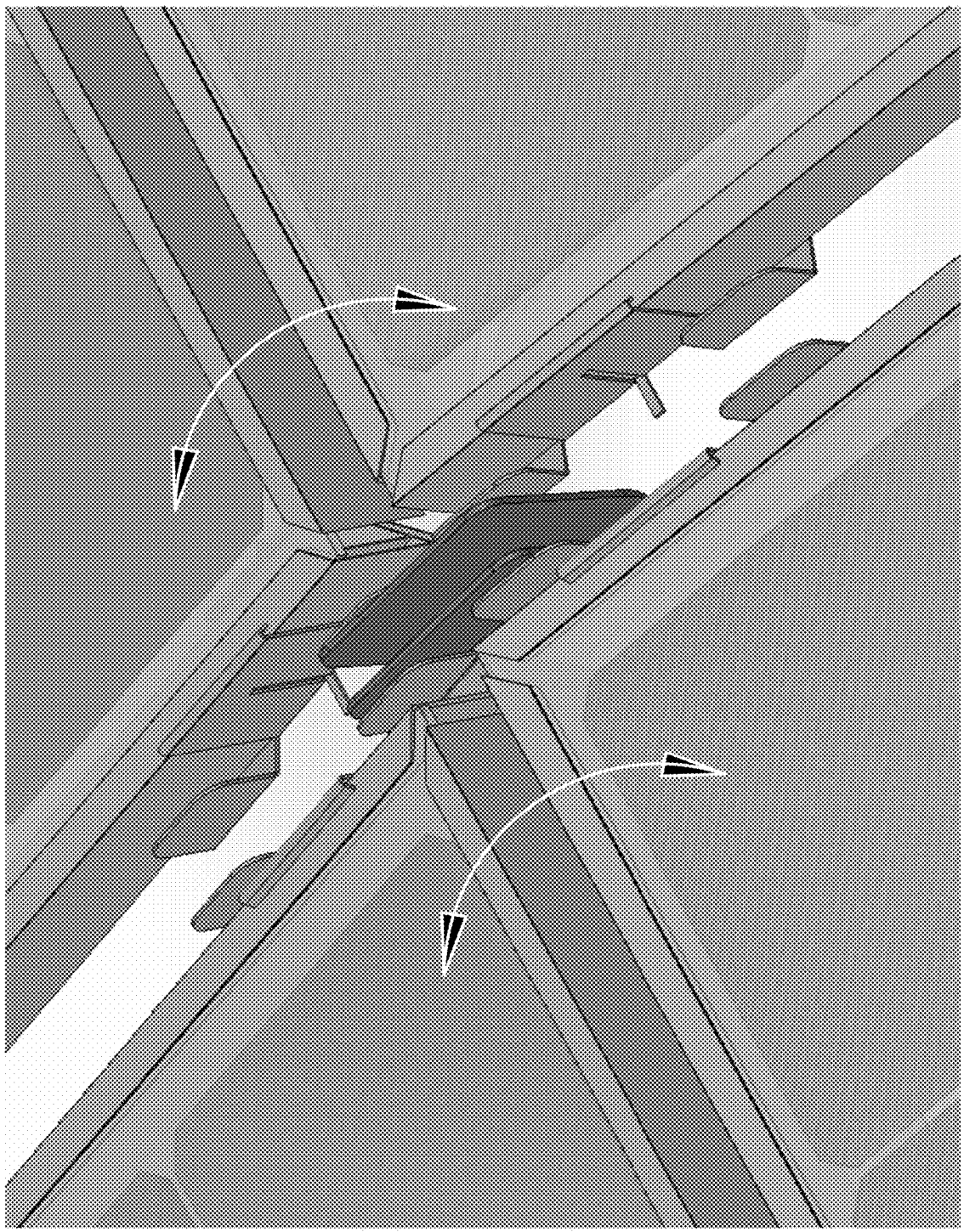
FIG. 16 is a simplified view showing a corner of four modules that join to one post.

FIG. 16 is a simplified view showing a corner of four modules that join to one post, in accordance with some embodiments. This view illustrates the reversibility of the clips, and also demonstrates the angular tolerance of the clips relative to the post to accommodate tilt angle.

Figure 17:
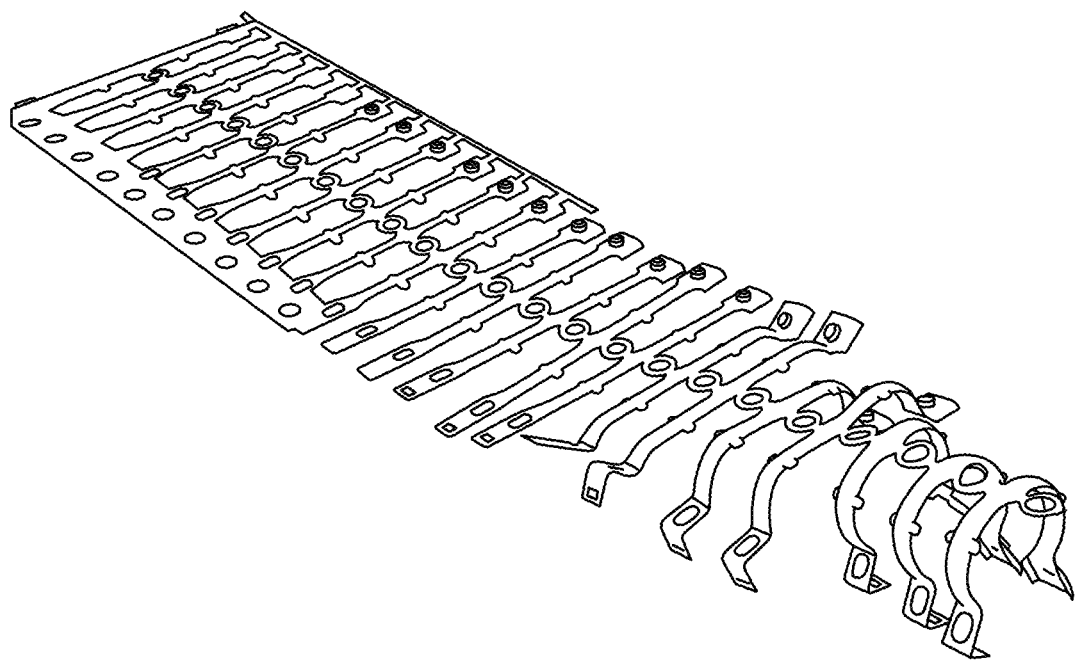
FIG. 17 shows a progressive stamping manufacturing process that can be used to fabricate the clip.
Figure 18:
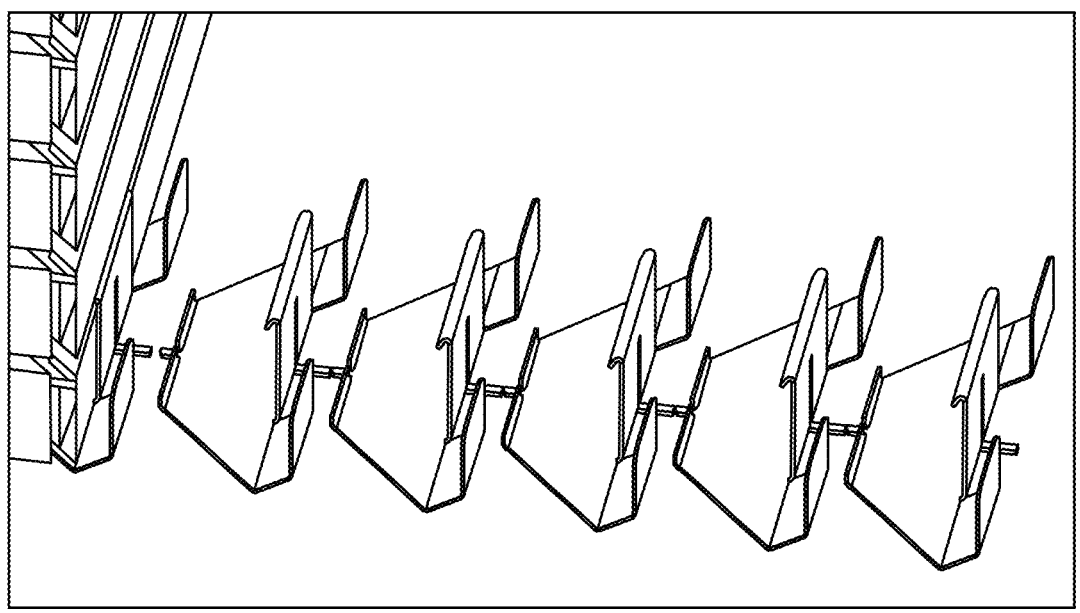
FIG. 18 shows how the clip can maintain its connected orientation in an integrated bandolier configuration after formation.

FIG. 17 shows a progressive stamping manufacturing process that can be used to fabricate the clip, in accordance with some embodiments. FIG. 18 shows how the clip can maintain its connected orientation in an integrated bandolier configuration after it is formed, in accordance with some embodiments.

Figure 19:
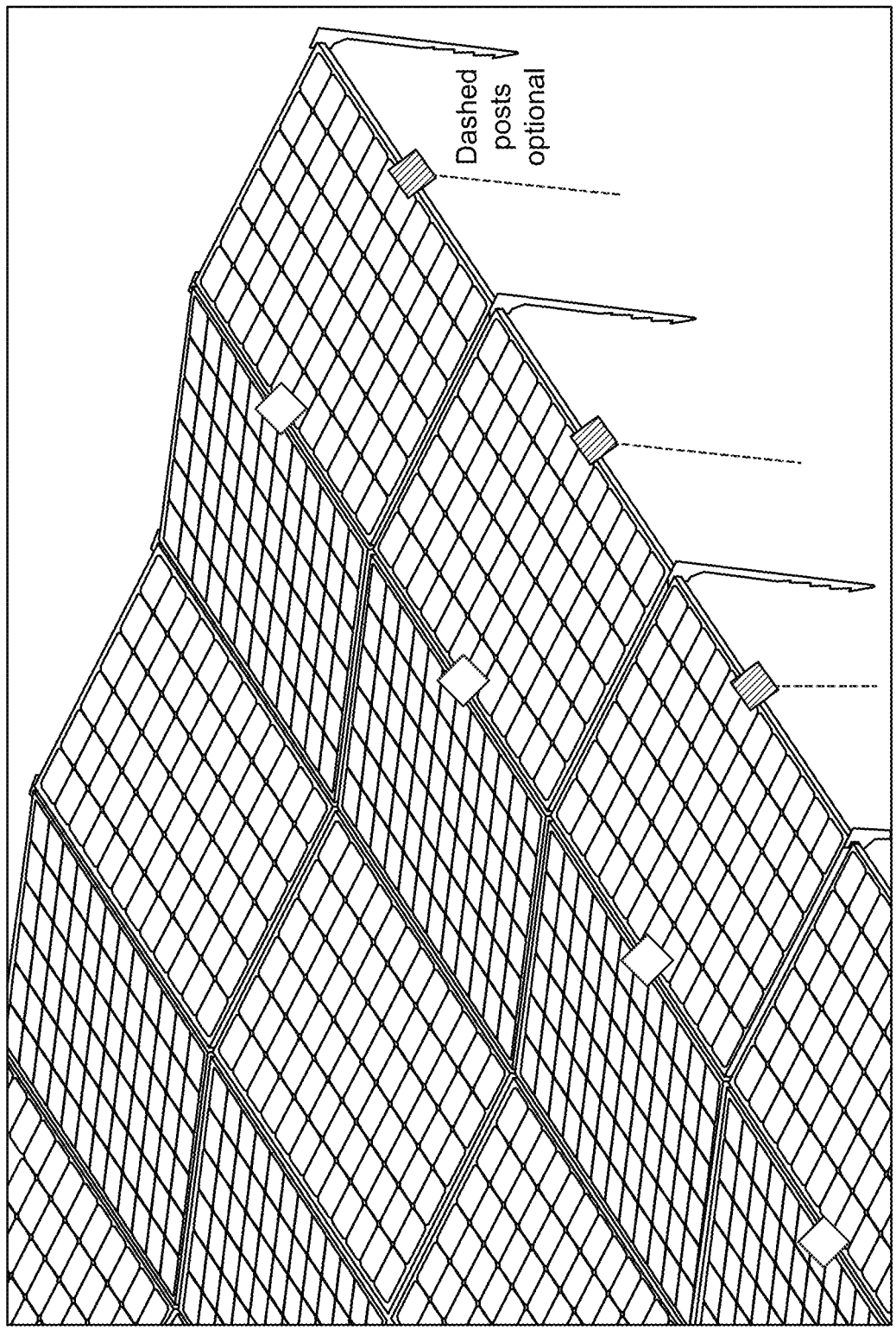
FIG. 19 shows another embodiment of a ground mounting system.

FIG. 19 shows another alternative embodiment of a ground mounting system for solar modules. In some cases, in the event of heavy loading additional clip(s) can be installed on the ridge of two modules (open square) and/or the lower confluence point of point of modules (solid square). These additional clips may connect two neighboring modules. Such additional-clip configurations may (but are not required to) also include a post (dashed) that can be pushed into the ground.

According to some embodiments, the clip may be preinstalled on a post in the factory. The retaining rings described herein may be installed in the factory ahead of time. This may leave enough vertical tolerance for penetration variability of the post. In some embodiments, this can permit around 1 inch of vertical play, thereby facilitating installation and adding flexibility under applied loads.

Figure 11:
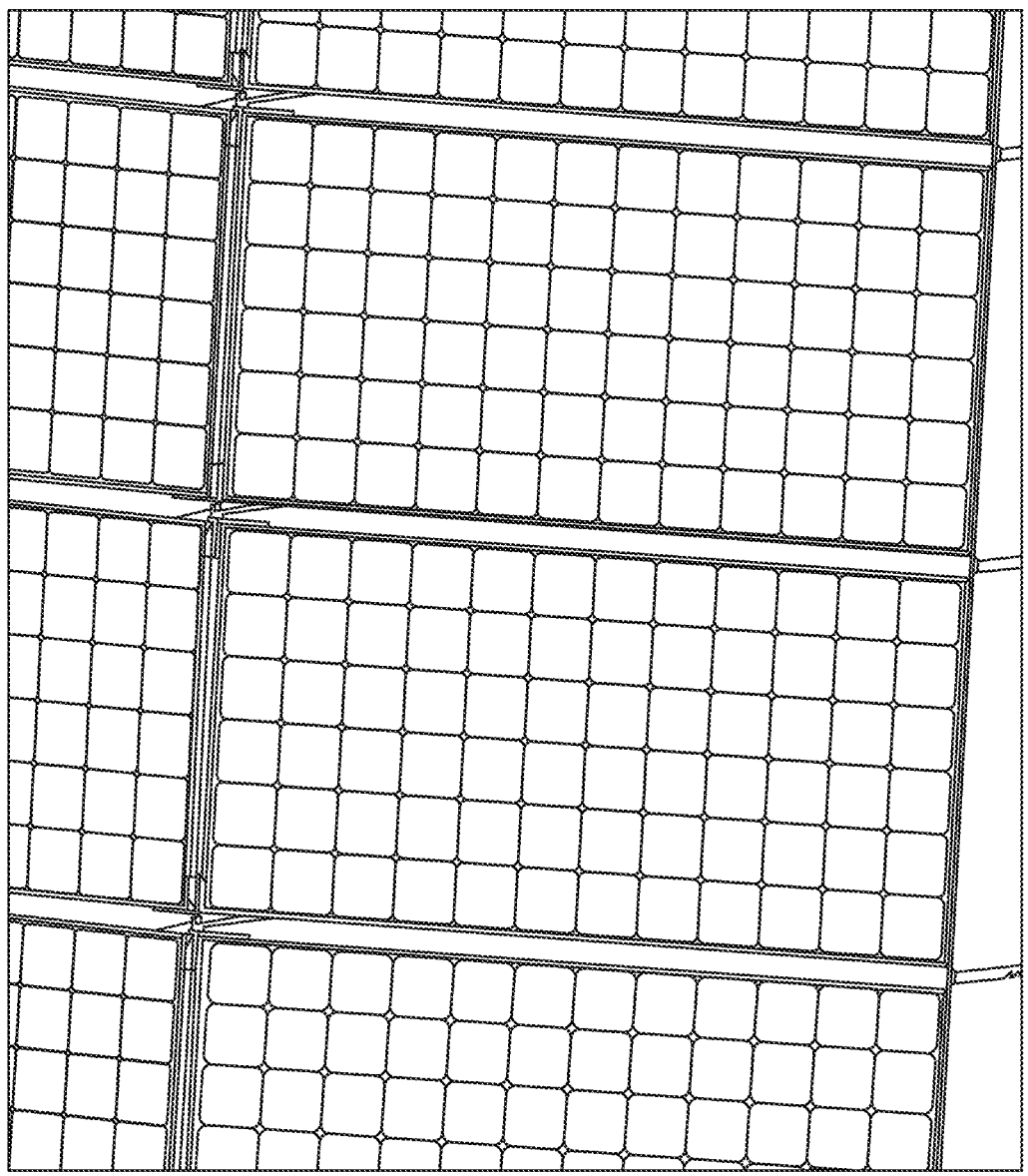
FIG. 11 shows an enlarged perspective view of the spacing between modules.

FIG. 11 shows an enlarged perspective view of the gaps between adjacent modules, in accordance with some embodiments. In some cases, the gaps may be sized according to tolerance availability and to allow tool access. Particular embodiments may feature gaps of around 2" on one side of the module, with gaps on the orthogonal side of the module being smaller.

Figure 13:
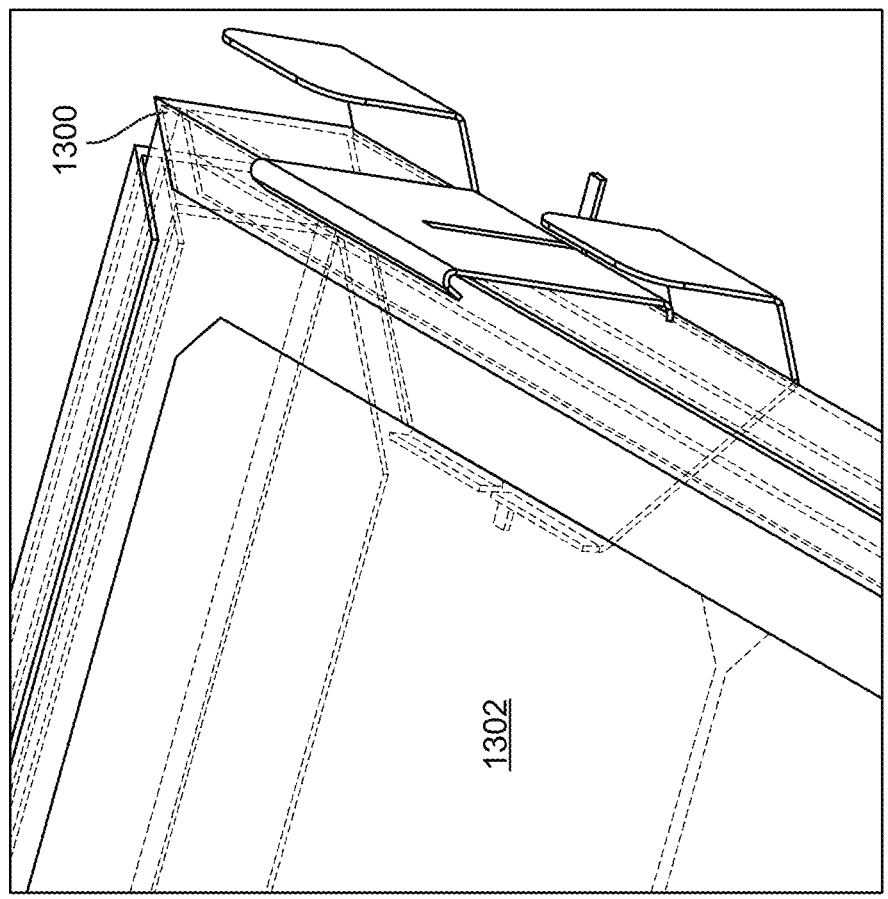
FIG. 13 is a simplified view showing a clip attached to the side of a module.
Figure 12:
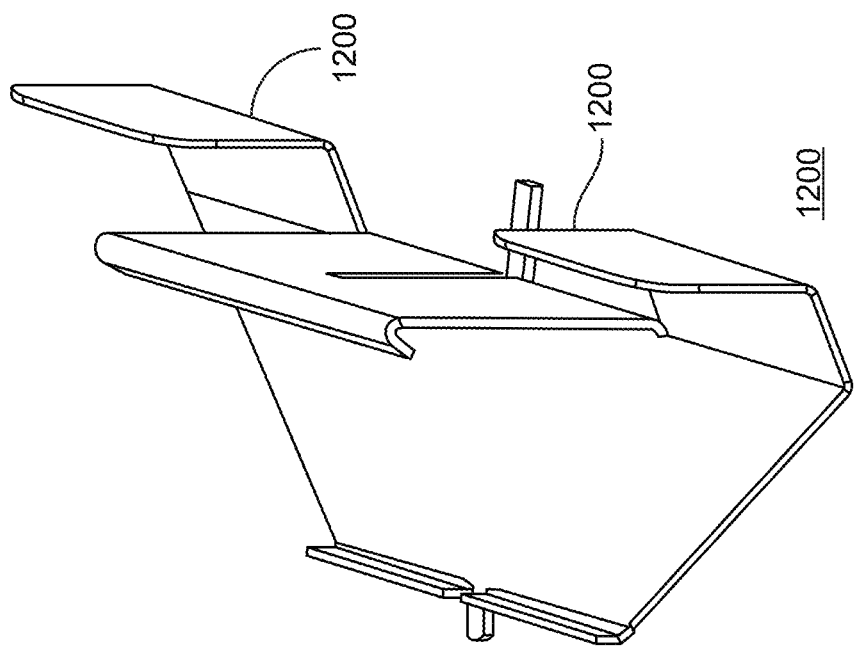
FIG. 12 shows a simplified view of an alternative clip structure.

While the preceding figures have illustrated one particular embodiment of a ground mount system for solar panels, other embodiments are possible. For example, FIG. 12 shows a simplified view of an alternative clip structure 1200, in accordance with some embodiments. Here, the clip may comprise flexible tabs 1202, and may be reversible. FIG. 13 is a simplified view showing the clip embodiment of FIG. 12, attached to the side of a frame 1300 of a solar module 1302. In some cases, the clip may be configured to engage on both the top and bottom of the module via multiple tabs.

Figure 42:
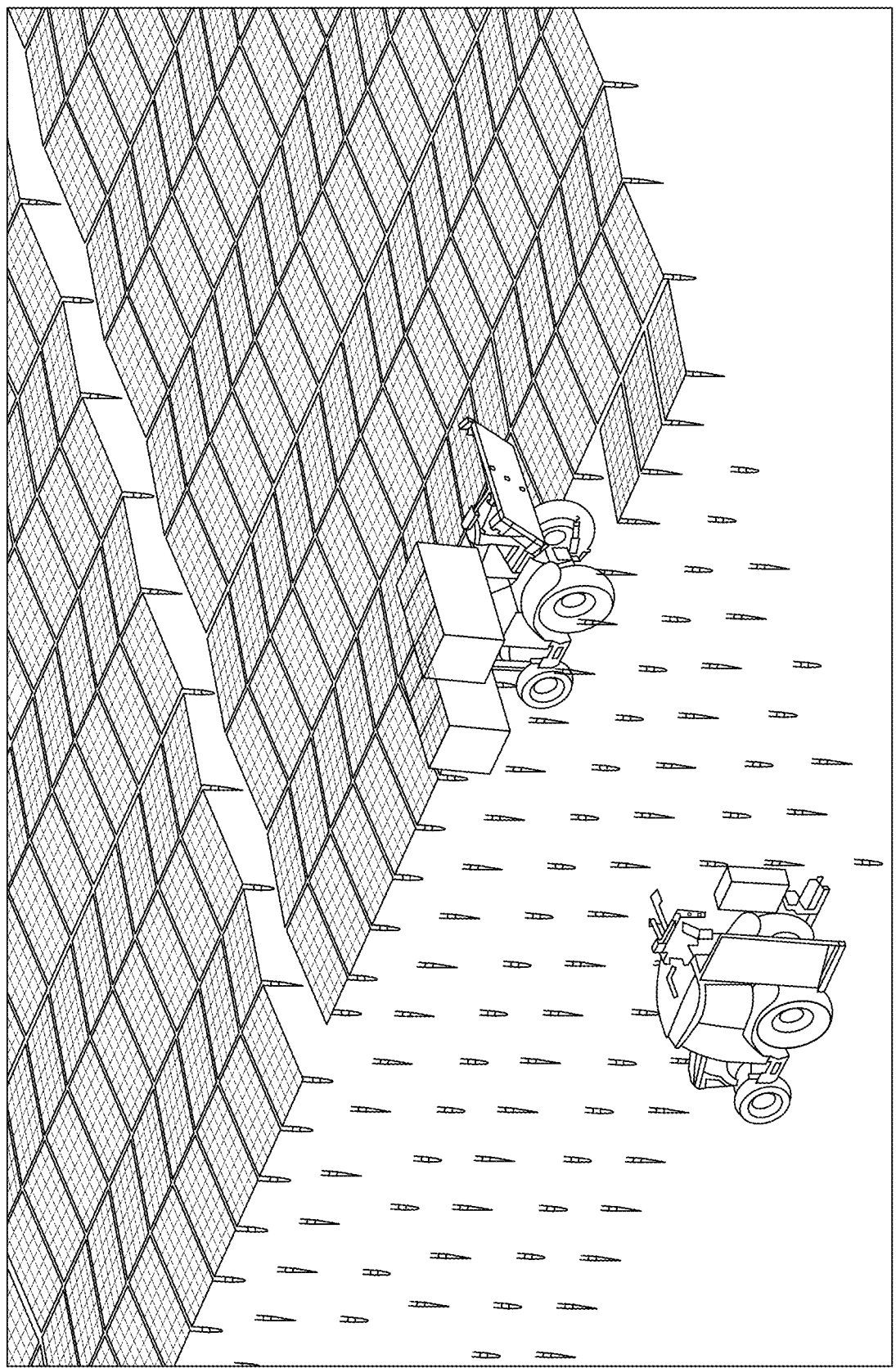
FIG. 42 shows an overhead view of an autonomous system for positioning and assembling solar modules, in accordance with some embodiments. In some cases, modules may be unboxed, inspected, and/or processed with or without attachments before transporting around a site. In some cases, post installers may drive posts and continuously reload from factor bundled packs. In some cases, module installers may pull a solar module from a stack and attach them to posts. In some cases, posts may be installed by a custom machine on the back of a tractor or any other type of vehicle (e.g., any type of autonomous or semi-autonomous towing vehicle). In some cases, a module may be installed on a previously installed post by a machine on the back of a different tractor.

FIG. 42 shows an overhead view of an autonomous system for positioning and assembling solar modules, in accordance with some embodiments. In some cases, the system may be configured to unbox, inspect, and/or process the solar modules with or without attachments before transporting around a site.

In some cases, the system may comprise one or more post installers. The post installers may drive posts and continuously reload from factor bundled packs. In some cases, posts may be installed by a custom machine on the back of a vehicle (e.g., a tractor). The vehicle may comprise an autonomous or semi-autonomous vehicle.

In some cases, the system may comprise one or more module installers. The module installers may pull a solar module from a stack and attach them to one or more deployed posts. In some cases, a module may be installed on a previously installed post by a machine on the back of a different vehicle (e.g., a different tractor). The vehicle may comprise an autonomous or semi-autonomous vehicle.

Figure 43:
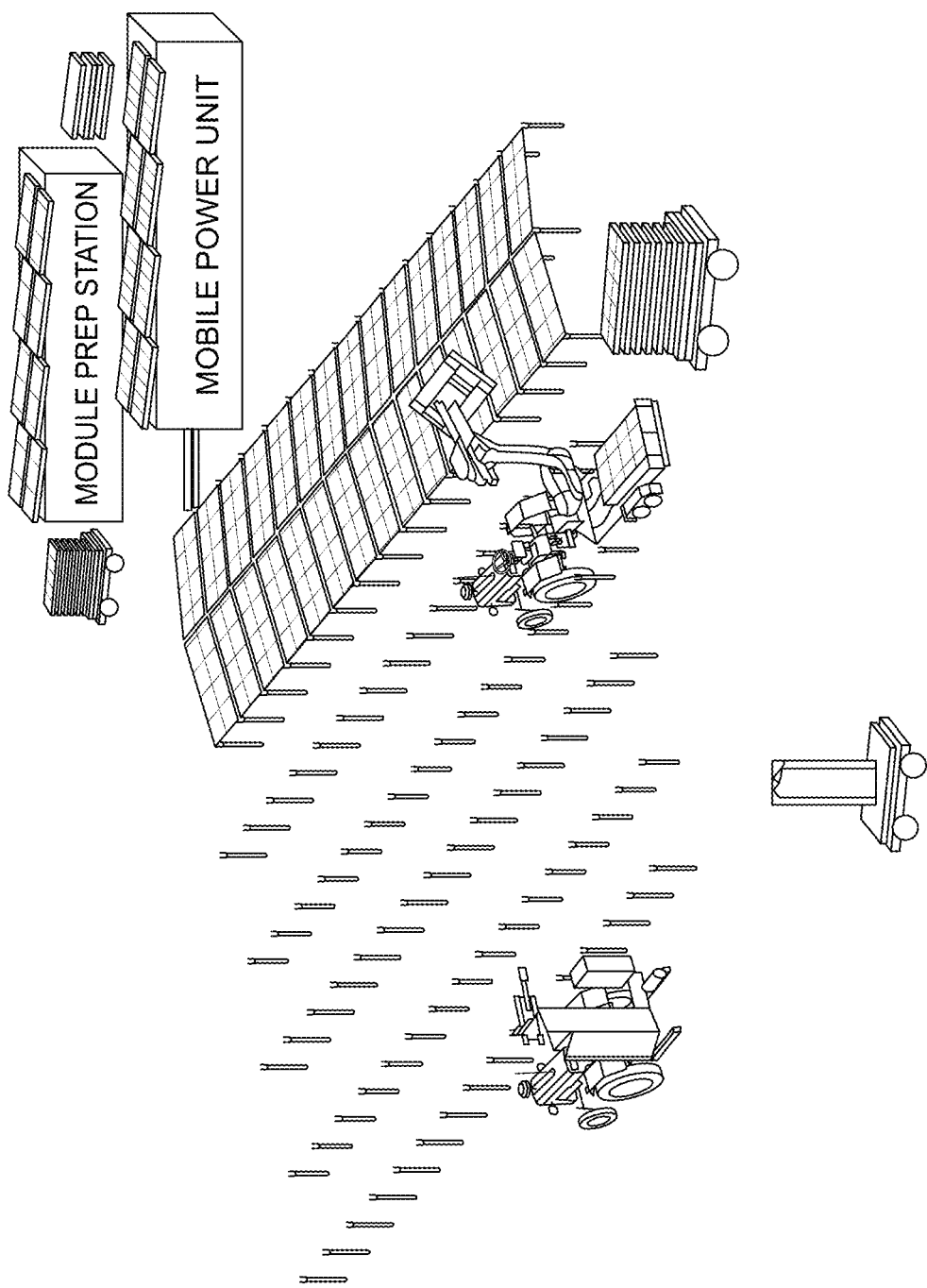
FIG. 43 shows an overhead view of an autonomous system for positioning and assembling solar modules, in accordance with some embodiments. In some cases, tractors may be fully electric. In some cases, a mobile power unit may be disposed at or near a site where tractors may charge. In some cases, the mobile power unit may be comprise solar panels and/or batteries. In some cases, a reloading unit may travel between stations. In some cases, a reloading unit may carry posts, solar modules, or any combination thereof. In some cases, a reloading unit may travel between a prep station and active installer units (e.g., tractors).
Figure 44A:
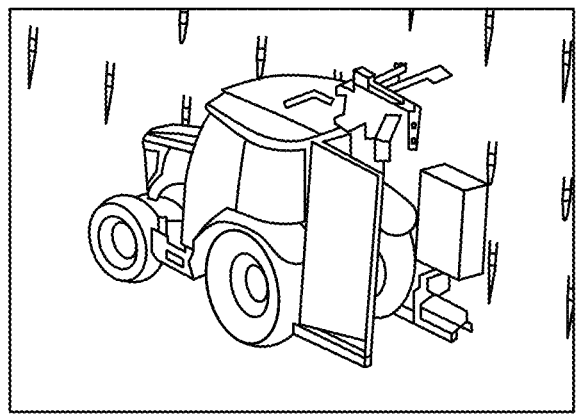
FIGS. 44A-44M show vehicles for positioning and assembling solar modules, in accordance with some embodiments. In some cases, a module installer may be a custom machine built on a tractor. In some cases, a module installer may take in a stack of solar modules. In some cases, the stack of solar modules may be placed on the module installer. In some cases, the stack of solar modules may be picked up by the module installer. In some cases, the module installer may carry the stack of modules. In some case, the module installer may separate one module from the stack of modules. In some cases, the module installer may position the one module over a plurality of installed posts, for example, two, three, or four installed posts. In some cases, the module installer may lower the module into a predetermined position over the plurality of installed posts. In some cases, the module installer may deform a metallic portion of a module to create a rigid connection between the module and the post. In some cases, the module installer may release the module. In some cases, the module installer may test a strength of connections formed between the module and the plurality of posts by lifting, pushing, twisting, or any sufficient force. In some cases, the module installer may drive to a next location to place a module. In some cases, a module installer may comprise 3, 4, 5, or 6 degrees of motion or more. In some cases, a module installer may comprise a robot arm that is configured to receive a module from a flipping machine. In some cases, a robot arm may be used to reach pick up a module from a stack. In some cases, a gantry may be used to tilt back and forth to pick up a module and position the module behind. In some cases, a double rotary motion manipulator comprise 1, 2, or more rotating joints may be used to position a module above one or more posts. In some cases, a trailer may comprise a gantry for picking up and positioning one or more modules above posts.
Figure 44B:
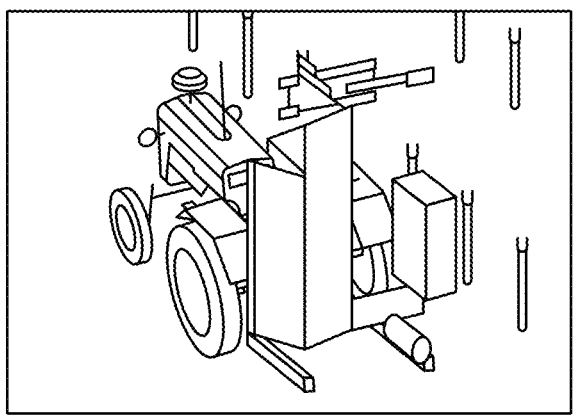
Figure 44C:
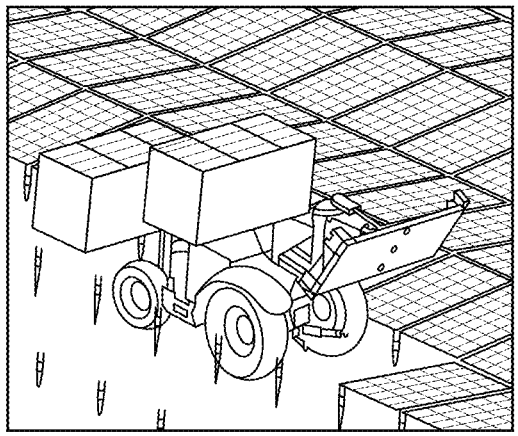
Figure 44D:
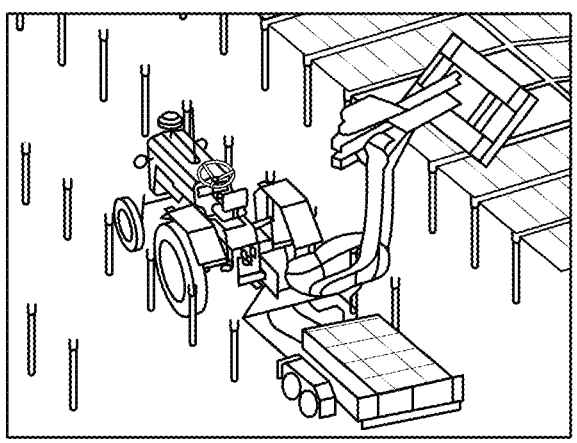
Figure 44E:
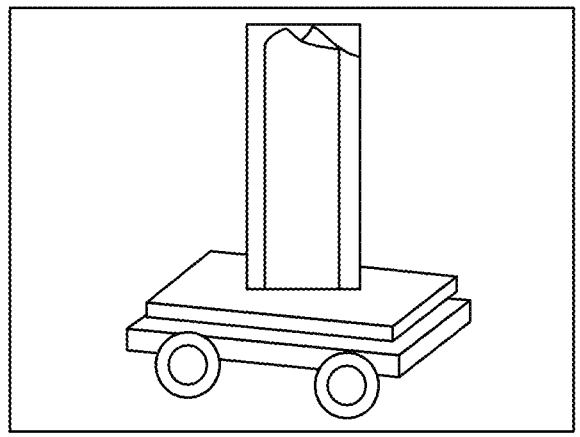
Figure 44F:
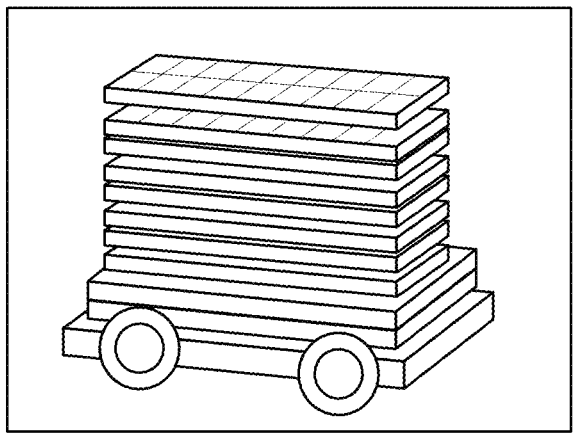
Figure 44G:
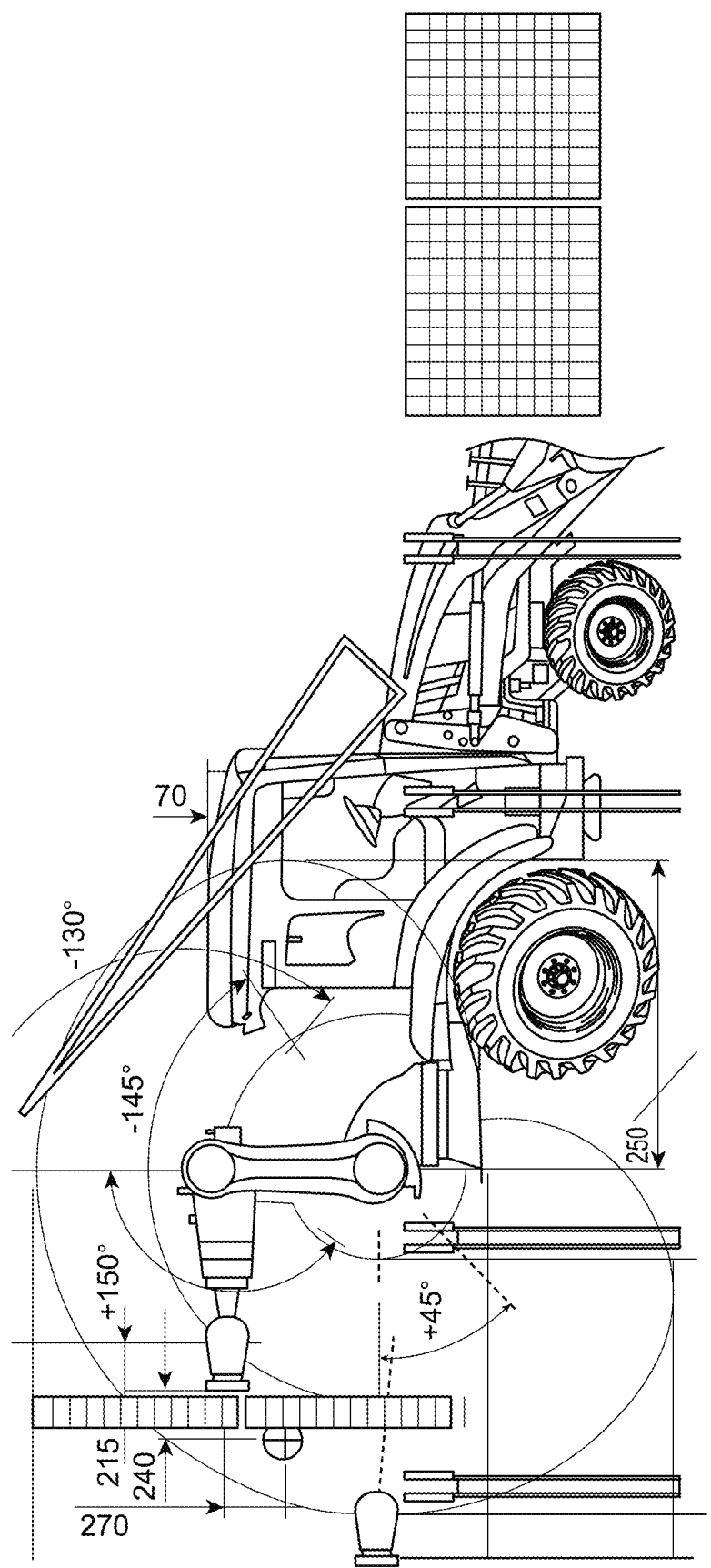
Figure 44H:
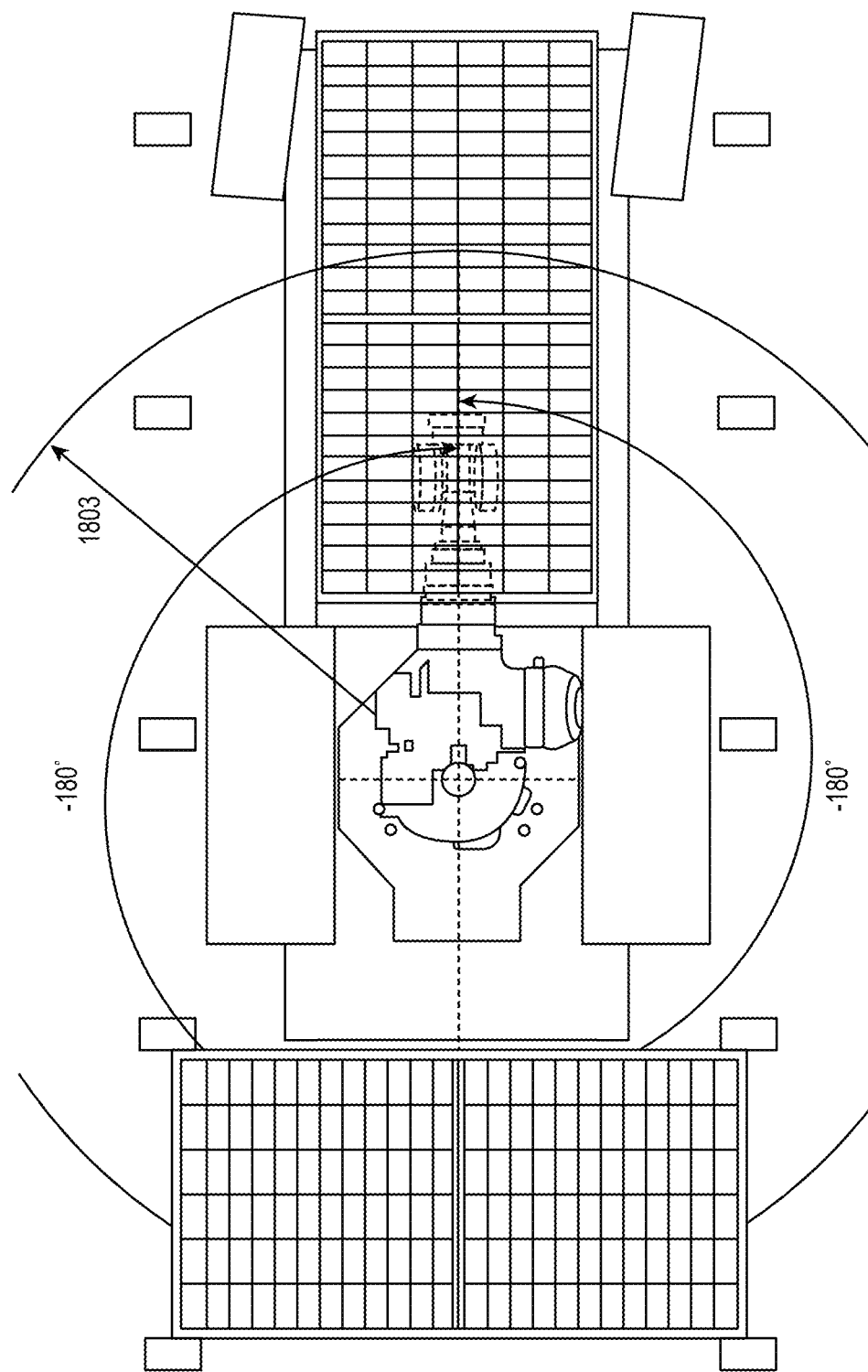
Figure 44I:
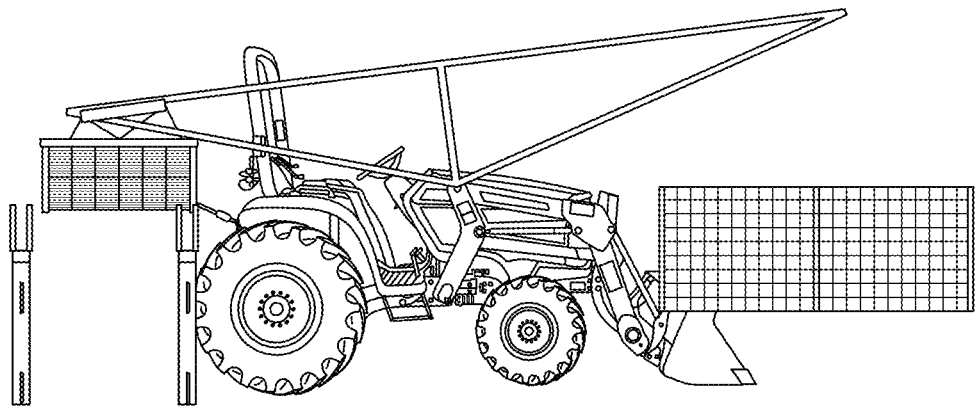
Figure 44J:
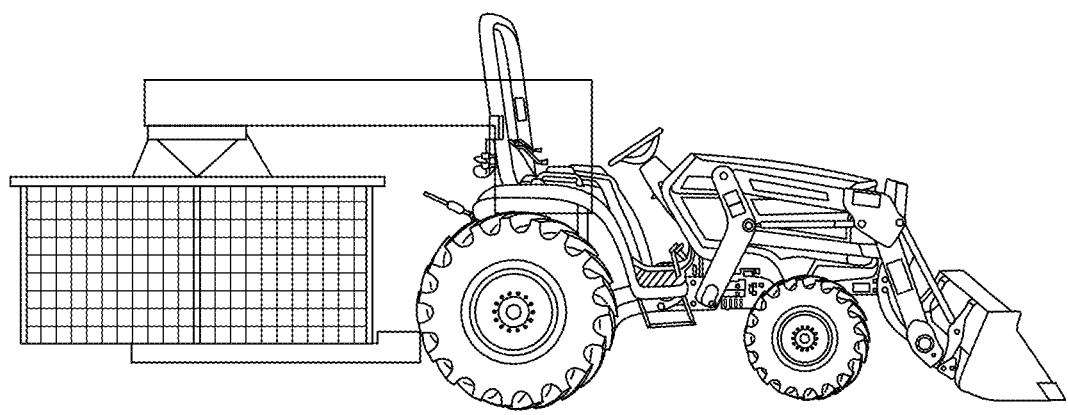
Figure 44K:
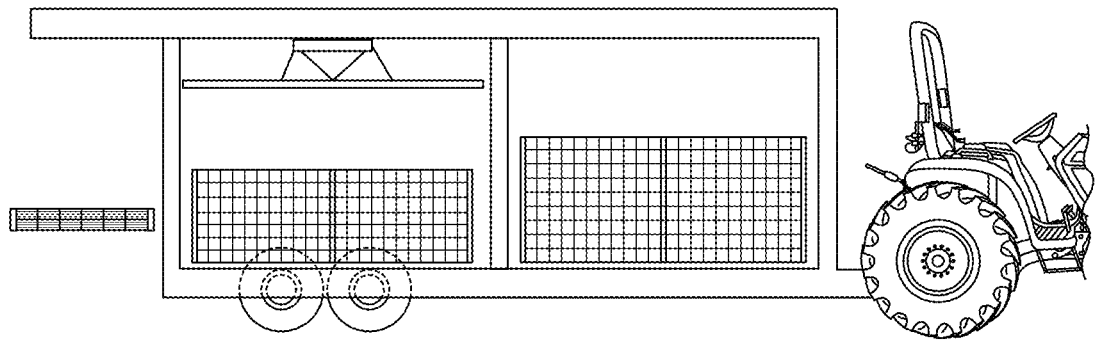
Figure 44L:
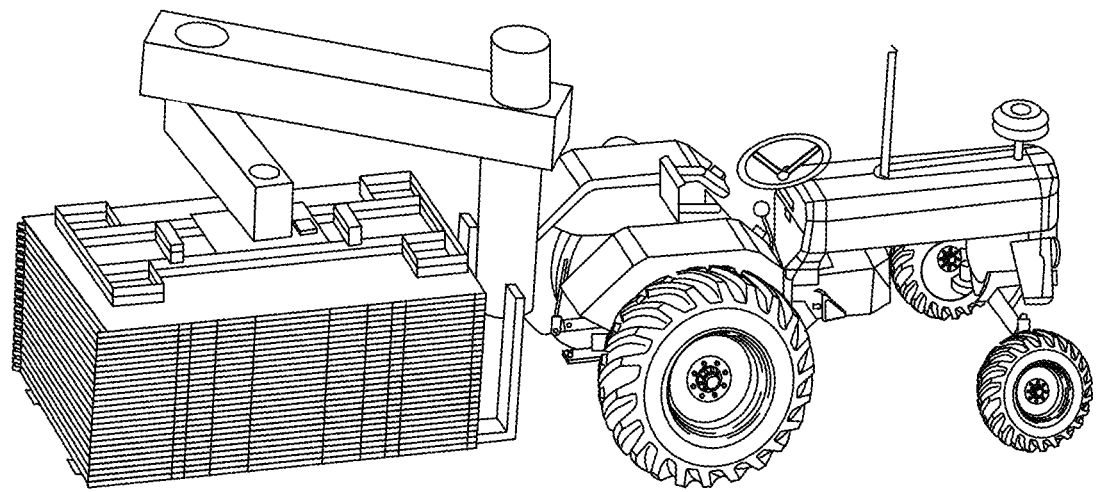
Figure 44M:
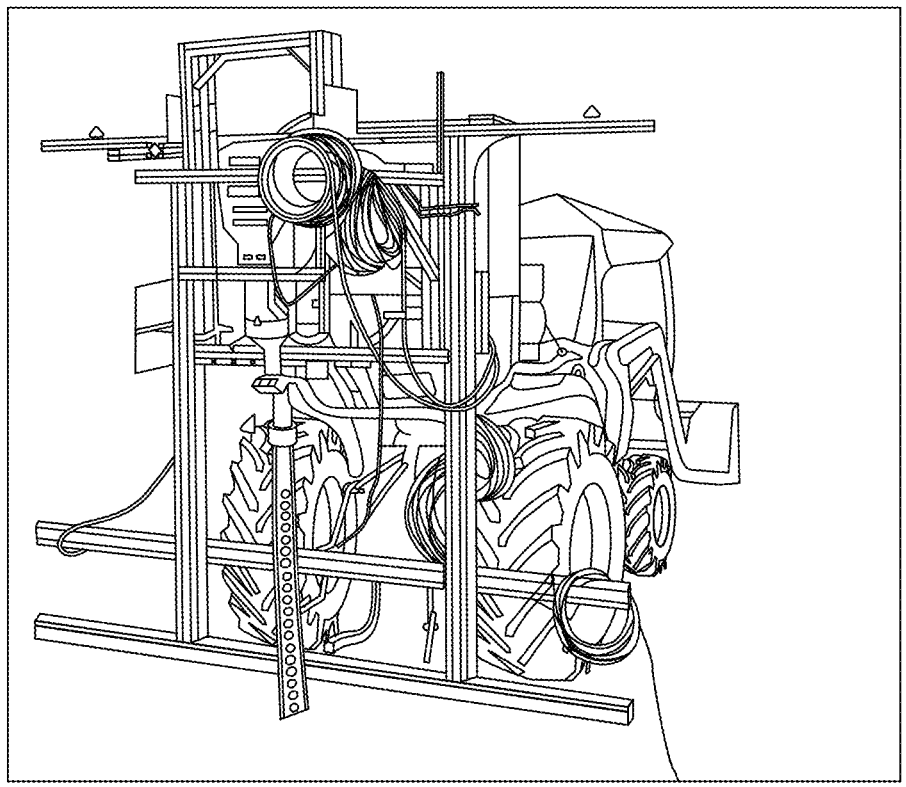
Figure 45A:
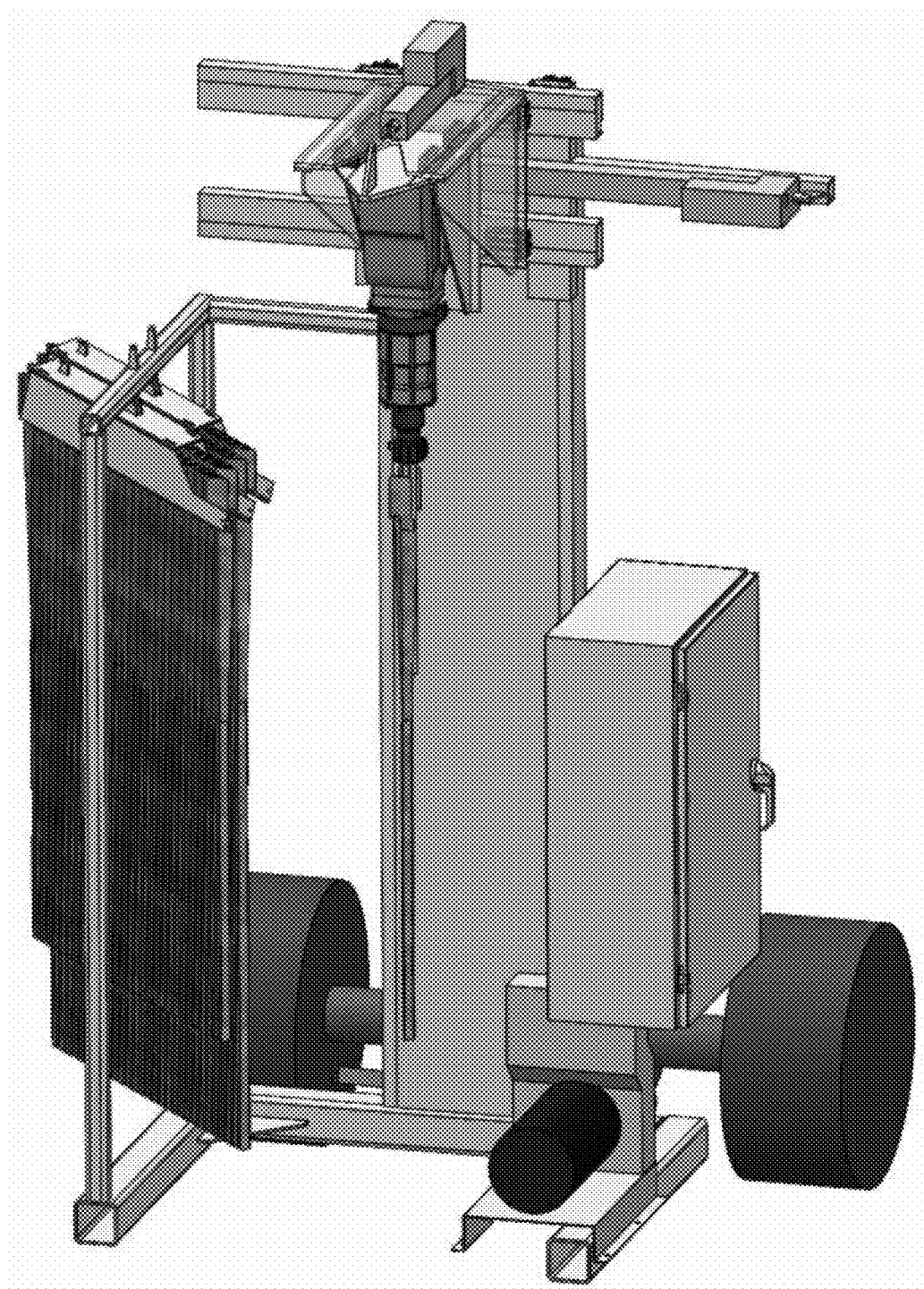
FIGS. 45A-45D show perspective views of a machine for installing posts, in accordance with some embodiments. In some cases, the machine may comprise 3, 4, 5, or 6 degrees of freedom or more. In some cases, the machine may autonomously position a post, install the post in the ground, and/or force-test the post by pulling on it laterally, vertically, or any other direction and record the force-test data. In some cases, the machine may be configured to carry one or more bundles of posts on a rack. In some cases, the machine may be configured to locate one or more posts in a bundle of posts and collect a new post on a driving bit.
Figures 45B, 45C, 45D:
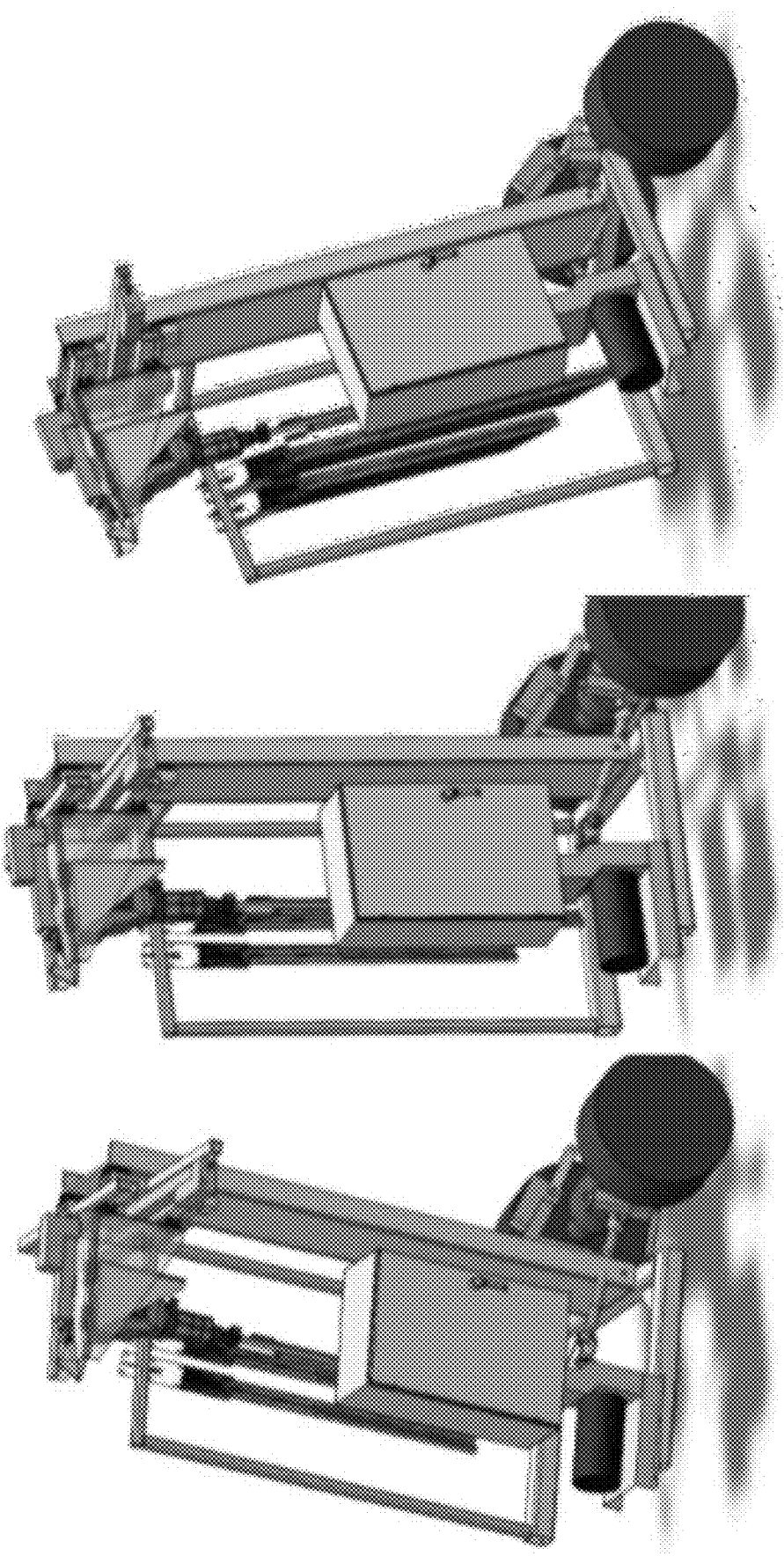

FIG. 43 shows an overhead view of an autonomous system for positioning and assembling solar modules, in accordance with some embodiments. In some cases, the vehicles for deploying posts or solar modules may be fully electric. In some cases, a mobile power unit may be disposed at or near a site where the vehicles may charge. In some cases, the mobile power unit may be comprise one or more solar panels and/or batteries. In some cases, a reloading unit may travel between stations. In some cases, a reloading unit may carry posts, solar modules, or any combination thereof. In some cases, a reloading unit may travel between a prep station and active installer units (e.g., the autonomous vehicles or robots described elsewhere herein).

In another aspect, the present disclosure provides a method comprising providing one or more mobile platforms that are configured to carry a plurality of posts and a plurality of solar modules. The mobile platforms may comprise any of the robots, machines, or autonomous vehicles described herein.

In some embodiments, a plurality of posts may be positioned and installed by a first mobile platform at a predefined configuration onto the terrain. In some embodiments, a plurality of solar modules may be deployed onto a set of posts by a second mobile platform.

In some cases, the one or more mobile platforms can be equipped with one or more sensors. The one or more sensors may comprise, for example, a location sensor (e.g., a geolocation sensor), a vision sensor (e.g., image sensor or a camera), a GNSS unit, a GPS unit, an accelerometer, a motion sensor, a gyroscope, or any combination thereof. In some cases, the one or more sensors may comprise a stereo vision sensor, a depth sensor, a binocular vision sensor, or an infrared sensor. In some cases, the one or more sensors may comprise a radar unit, a LIDAR unit, an altitude sensor, a proximity sensor, an inertial measurement unit, a contact sensor, a pressure sensor, a piezoelectric sensor, or a force sensor.

In some embodiments, the method may further comprise using at least the one or more sensors to (i) autonomously move the one or more mobile platforms and (ii) autonomously position and assemble the plurality of posts and the plurality of solar modules over a terrain to construct an array of solar modules. In some embodiments, the method may further comprise using the one or more sensors to locate and move an installer load head on the one or more mobile platforms relative to the array of solar modules as the array is being constructed. The installer load head may comprise a movable element that can automatically position and/or deploy one or more posts into a target location.

In some embodiments, the one or more mobile platforms may comprise a first platform for positioning and installing the plurality of posts onto the terrain, and a second platform for positioning and assembling the plurality of solar modules onto the plurality of posts. In some embodiments, the first platform can be separate from the second platform. In some embodiments, the first platform and the second platform may be integrated into a single platform. In some embodiments, the one or more mobile platforms may comprise one or more electric vehicles.

In some embodiments, the plurality of solar modules may be pre-stacked on the second platform, and the second platform may comprise a mechanism for extracting a select solar module from the stack and assembling the select solar module onto a select set of posts that have been installed on the terrain.

FIGS. 44A-44M show vehicles for positioning and assembling solar modules, in accordance with some embodiments. In some cases, a module installer may be a custom machine built on a vehicle. In some cases, a module installer may take in a stack of solar modules. In some cases, the stack of solar modules may be placed on the module installer. In some cases, the stack of solar modules may be picked up by the module installer. In some cases, the module installer may carry the stack of modules. In some case, the module installer may separate one module from the stack of modules. In some cases, the module installer may position the one module over a plurality of installed posts, for example, two, three, or four installed posts. In some cases, the module installer may lower the module into a predetermined position over the plurality of installed posts.

In some cases, the module installer may deform a metallic portion of a module to create a rigid connection between the module and the post. In some cases, the module installer may release the module. In some cases, the module installer may test a strength of connections formed between the module and the plurality of posts by lifting, pushing, twisting, or any sufficient force.

In some cases, the module installer may drive to a next location to place a module. In some cases, a module installer may comprise 3, 4, 5, or 6 degrees of motion or more. In some cases, a module installer may comprise a robot arm that is configured to receive a module from a flipping machine. In some cases, a robot arm may be used to reach for and pick up a module from a stack. In some cases, a gantry may be used to tilt back and forth to pick up a module and position the module behind. In some cases, a double rotary motion manipulator comprising one or more rotating joints may be used to position a module above one or more posts. In some cases, a gantry may be used to pick up and position one or more modules onto one or more installed posts.

In some embodiments, an integrated clinching tool may be provided on an installer load head to create a plurality of post-clip interfaces between a plurality of clips and the plurality of posts. In some cases, the plurality of clips may be pre-attached to the plurality of solar modules.

Figure 53:
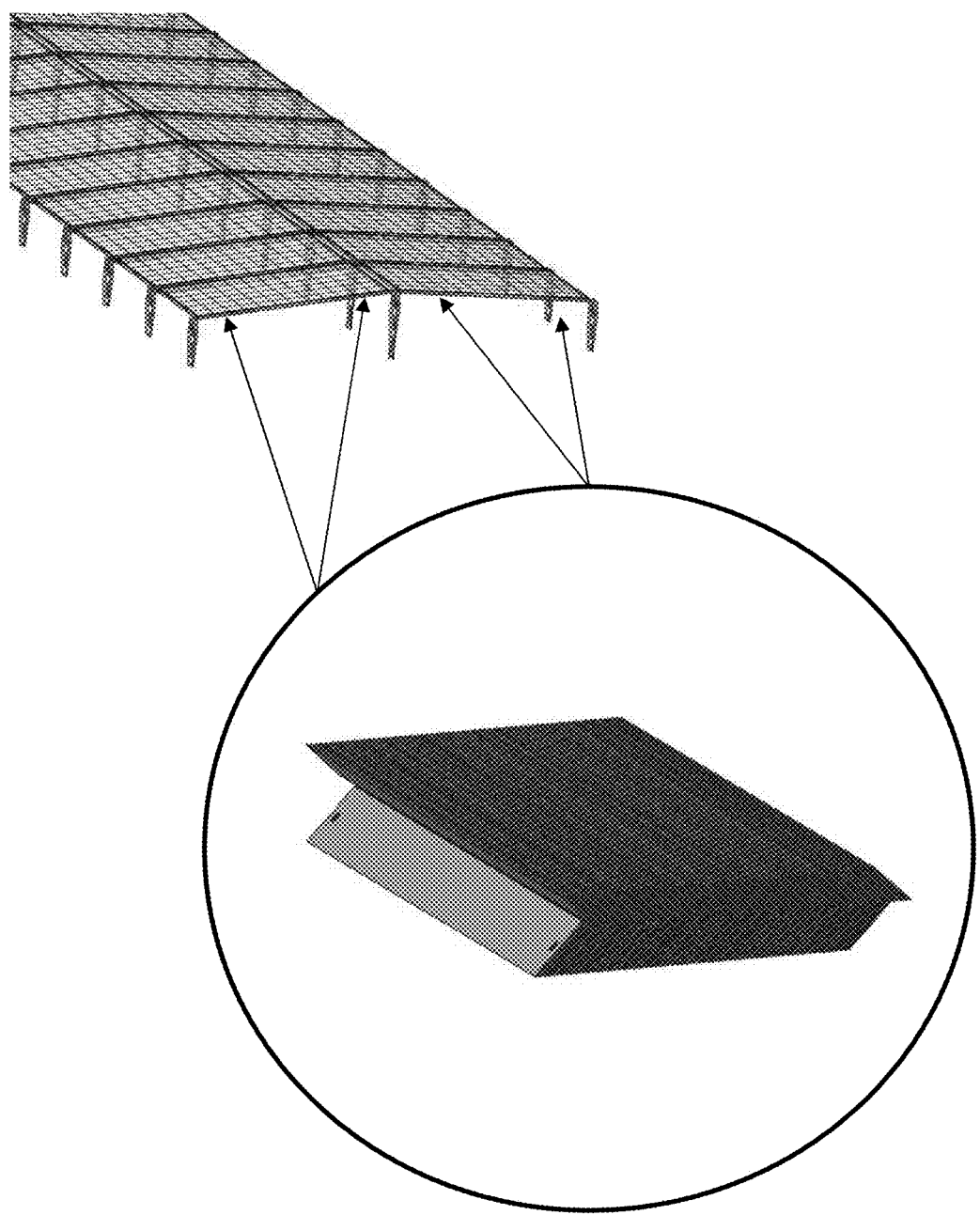
FIG. 53 illustrates a plurality of brackets that can be coupled to one or more posts, in accordance with some embodiments. In some cases, a solar module may comprise a bracket. The bracket may be attached or coupled to the solar module. In some cases, the bracket may comprise a deformable metal. In some cases, a connection may be formed between the bracket and a post. In some cases, the connection may be formed by clinching the bracket and the post together. In some cases, the bracket may comprise a flat or an angled piece of metal that is configured to rivet onto a module, for example, through mounting holes. In some cases, the bracket may be connected to a module by clinching the bracket to the frame of a module.

FIG. 53 illustrates a plurality of brackets that can be coupled to a post, in accordance with some embodiments. In some cases, a solar module may comprise a bracket. The bracket may be attached or coupled to the solar module. In some cases, the bracket may comprise a deformable metal. The deformable metal may comprise, for example, aluminum, copper, iron, steel, brass, or any metallic alloys. In some cases, a connection may be formed between the bracket and a post. In some cases, the connection may be formed by clinching the bracket and the post together. In some cases, the bracket may comprise a flat or an angled piece of metal that is configured to rivet onto a module, for example, through mounting holes. In some cases, the bracket may be connected to a module by clinching the bracket to the frame of a module. In one alternative embodiment, the module clip can be clinched or dimpled to the solar module frame directly instead of being riveted or bolted through mounting holes.

Figure 51:
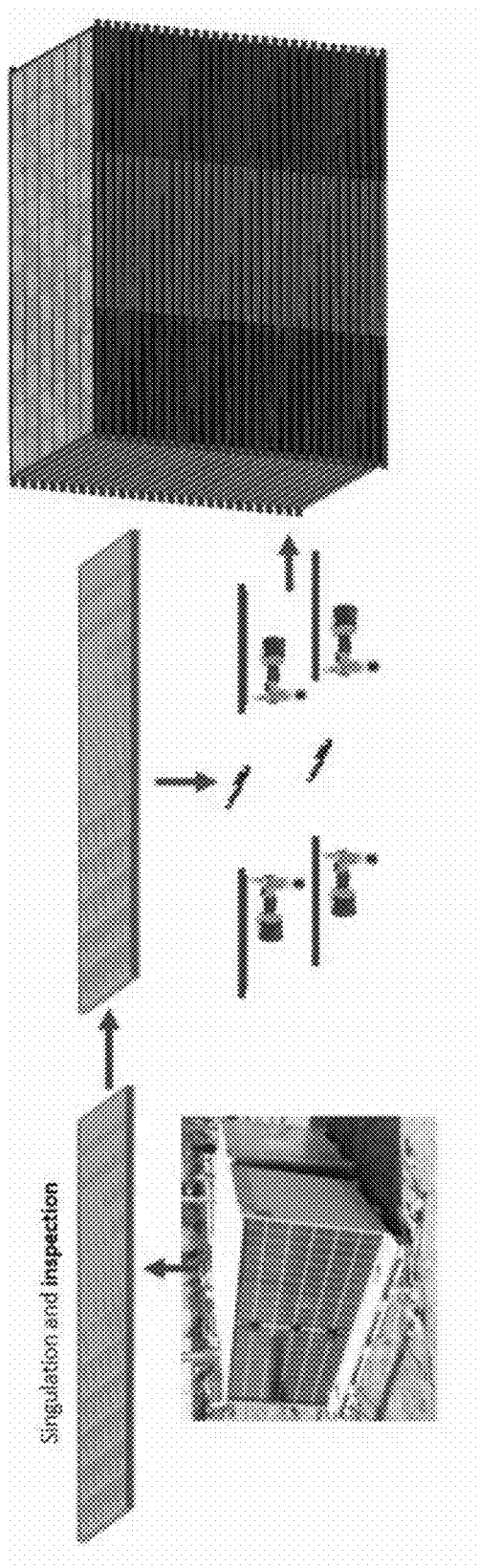
FIG. 51 illustrates a method for coupling a solar module and brackets, in accordance with some embodiments. In some cases, a bracket may be installed by a process in a station where modules are unboxed, inspected, and/or then placed on a tooling jig. In some cases, 1, 2, 3, 4, or more rivet guns may install rivets to join a bracket to a solar module from below, side, top, or any sufficient direction. In some cases, a clinching tool or an impact driver (e.g., for torquing nuts) may be used instead of a rivet gun.

FIG. 51 illustrates a method for coupling a solar module and brackets, in accordance with some embodiments. In some cases, a bracket may be installed by a process in a station where modules are unboxed, inspected, and/or then placed on a tooling jig. In some cases, 1, 2, 3, 4, or more rivet guns may install rivets to join a bracket to a solar module from below, side, top, or any sufficient direction. The use of rivets may obviate the need for preformed holes with accurate tolerances. In some cases, a clinching tool or an impact driver (e.g., for torquing nuts) may be used instead of a rivet gun.

In some embodiments, the method may further comprise assessing a structural integrity of the post-clip interfaces using at least one of a measured force or a deflection during and/or after installation of the solar modules onto the posts. In some cases, the structural integrity of the post-clip interfaces may be assessed by testing separation force, resistance to shear forces due to translational or rotational motions, and/or resistance to pull forces.

In some embodiments, the method may further comprise obtaining images of the plurality of post-clip interfaces during or after the interfaces have been formed. In some embodiments, the method may further comprise determining a structural integrity of each of the plurality of post-clip interfaces based at least on one or more of the images.

In some embodiments, the method may further comprise using a testing tool located on the one or more mobile platforms to perform pull strength and assembly tests on one or more of the plurality of installed posts. In some cases, the testing tool may be used to apply pushing, pulling, twisting, vibration, or any appropriate force to an installed post and/or an installed solar module to test the mechanical strength, stability, and/or rigidity of an installation.

In some cases, the method may further comprise using a testing tool located on the one or more mobile platforms to perform electrical testing on one or more solar modules. In some cases, the electrical testing may comprise testing a voltage, current, connectivity, and any appropriate electrical measurements to ensure proper installation of the solar modules.

In another aspect, the present disclosure provides a method for constructing an array of solar modules. The method may comprise providing a plurality of posts and a plurality of solar modules. In some cases, the plurality of solar modules may comprise a plurality of clips pre-attached thereon. In some embodiments, the method may comprise using one or more mobile platforms to autonomously position and assemble the plurality of posts and the plurality of solar modules over the terrain to construct the array of solar modules.

In some embodiments, the method may comprise forming a plurality of post-clip interfaces between a plurality of clips and the plurality of posts to construct an array of solar modules over a terrain without requiring one or more premade holes/features for one or more fasteners. In some embodiments, the plurality of post-clip interfaces may have tolerances that enable the array to contour to the terrain, thereby eliminating a need for grading of the terrain. In some embodiments, the plurality of post-clip interfaces may comprise a plurality of clinched joints. In some embodiments, the plurality of clinched joints can be formed by a dimpling process. In some embodiments, each of the plurality of posts may comprise one or more tabs. In some cases, the dimpling process may comprise joining the one or more tabs to a corresponding clip to form the plurality of clinched joints. In some embodiments, the method may further comprise adding the one or more fasteners to the post-clip interfaces after or during the dimpling process.

In some cases, the plurality of post-clip interfaces can be formed at one or more corners of the plurality of solar modules. In some cases, the plurality of post-clip interfaces can be formed at all corners of the plurality of solar modules.

In some cases, the plurality of post-clip interfaces can be formed at opposite corners of the plurality of solar modules. In some cases, the plurality of post-clip interfaces can be formed at one or more lateral sides of the plurality of solar modules. In some cases, the plurality of post-clip interfaces can be formed at all lateral sides of the plurality of solar modules. In some cases, the plurality of post-clip interfaces can be formed at opposite lateral sides of the plurality of solar modules.

In some cases, the plurality of post-clip interfaces can be formed by using a clinching tool that is located on a post installer load head. In some cases, the post installer load head may be located on one or more mobile platforms that are configured to carry the plurality of posts and the plurality of solar modules.

In some embodiments, the plurality of post-clip interfaces can be formed without requiring the one or more fasteners. In some embodiments, the plurality of post-clip interfaces can be formed by locating the one or more fasteners in position relative to each clip and a corresponding tab on each post, and piercing the one or more fasteners through the tab to fasten the tab onto the clip, or piercing the one or more fasteners through the clip to fasten the clip onto the tab.

In some embodiments, the presently disclosed methods may comprise using a movable tool to form a plurality of holes in-situ on at least the clips on the solar modules and/or tabs on the posts. In some embodiments, the presently disclosed method may comprise using the movable tool or another tool to install the one or more fasteners through the plurality of holes formed in-situ on the clips and/or tabs.

In another aspect, the present disclosure provides an algorithm for facilitating the deployment of a solar module. In some embodiments, the method may comprise using an algorithm to identify a location suitable for autonomous positioning and assembly of at least one solar module, without requiring aid or involvement from a user in the autonomous positioning and assembly of the at least one solar module.

In some embodiments, the algorithm comprises a machine learning (ML) algorithm. In some cases, the machine learning algorithm may comprise a neural network. Examples of neural networks can include, for instance, a deep neural network (DNN), a convolutional neural network (CNN), a recurrent neural network (RNN), and/or a generative adversarial network (GAN).

In some embodiments, the machine learning algorithm may comprise a deep neural network (DNN). In other embodiments, the deep neural network may comprise a convolutional neural network (CNN). The CNN may be, for example, U-Net, ImageNet, LeNet-5, AlexNet, ZFNet, GoogleNet, VGGNet, ResNet18, or ResNet, etc. In some cases, the neural network may comprise or utilize, for example, a deep feed forward neural network, a recurrent neural network (RNN), LSTM (Long Short Term Memory), GRUs (Gated Recurrent Units), autoencoders (e.g., variational autoencoders, adversarial autoencoders, denoising autoencoders, or sparse autoencoders), a Boltzmann machine (BM), a RBM (Restricted BM), a deep belief network, a generative adversarial network (GAN), a deep residual network, a capsule network, or one or more attention/transformer networks. In some embodiments, the neural network may comprise a plurality of neural network layers. In some cases, the neural network may have at least about 2 to 1000 or more neural network layers.

In some cases, the machine learning algorithm may comprise a support vector machine (SVM), a classification algorithm, a regression analysis algorithm, or any other type of supervised, semi-supervised, or unsupervised machine learning algorithm. In some embodiments, the supervised learning algorithm may comprise or utilize, for example, support vector machine algorithms, linear regression algorithms, logistic regression algorithms, linear discriminant analysis algorithms, k-nearest neighbor algorithms, similarity learning, or any combination thereof. In some embodiments, the unsupervised learning algorithm may comprise, for example, clustering algorithms, hierarchical clustering algorithms, k-means clustering algorithms, mixture models, anomaly detection, local outlier factor algorithms, autoencoders, deep belief networks, Hebbian learning, self-organizing maps, expectation—maximization algorithms (EM), principal component analysis algorithms, independent component analysis algorithms, non-negative matrix factorization, singular value decomposition, or any combination thereof. In some cases, the machine learning algorithm may comprise or utilize a random forest, a decision tree (e.g., a boosted decision tree), a classification tree, a regression tree, a bagging tree, or a rotation forest.

In some embodiments, the algorithm may be configured to identify the location for deploying one or more solar modules and/or posts based at least on an analysis of terrain data. In some embodiments, the terrain data is obtained using at least one of aerial imaging or Global navigation satellite systems (GNSS).

In some embodiments, the method may further comprise creating a set of executable instructions in a digital medium for an autonomous system to autonomously position, deploy, install, and/or assemble the at least one solar module to construct a solar module array. In some embodiments, the autonomous system comprises a plurality of field machines that are in operative communication via a network. In some embodiments, the plurality of field machines comprise one or more robots. In some embodiments, the method may further comprise creating a set of executable instructions in a digital medium for an autonomous system to autonomously position, deploy, install, and/or assemble one or more posts or other supporting structures for one or more modules of a solar module array.

In another aspect, the present disclosure provides an apparatus that is configured to: carry a plurality of posts over a terrain; autonomously position a select post from the plurality of posts at a predetermined location on the terrain; and autonomously install the select post at the predetermined location. In some cases, the select post and the plurality of posts can be useable to support a plurality of solar modules.

FIGS. 45A-45D show perspective views of a machine for installing posts, in accordance with some embodiments. In some cases, the machine may comprise 3, 4, 5, or 6 degrees of freedom or more. In some cases, the machine may autonomously position a post, install the post in the ground, and/or force-test the post by pulling on it laterally, vertically, or any other direction and record the force-test data. In some cases, the machine may be configured to carry one or more bundles of posts on a rack. In some cases, the machine may be configured to locate one or more posts in a bundle of posts and collect a new post on a driving bit.

Figure 46B:
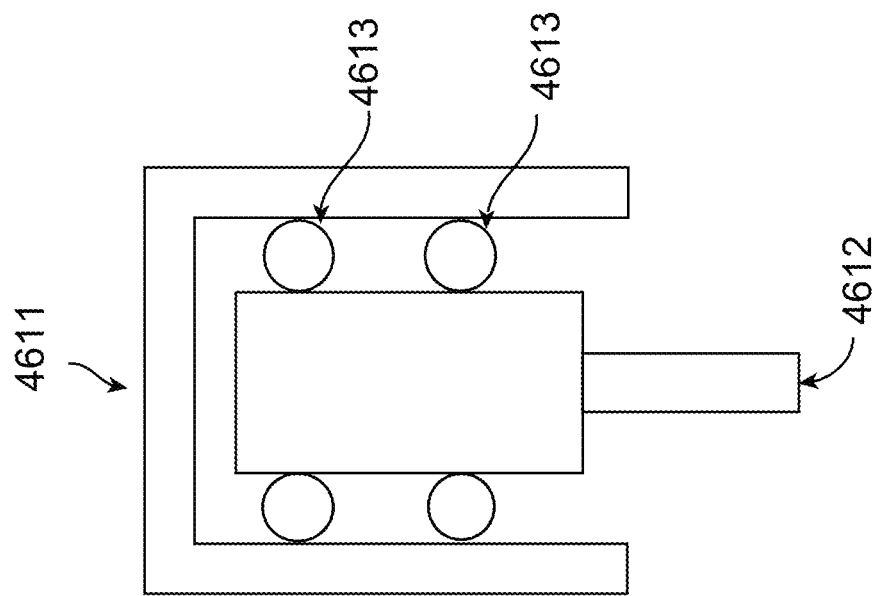
FIGS. 46A-46B show a machine for installing posts, in accordance with some embodiments. In some cases, the machine may have 3 or more mounting interfaces to mount a tractor to, for example, using a 3 point hitch (4601). In some cases, the machine may carry a hammer (4611) for pounding a post (4612) into the ground. In some cases, a hammer may be mounted on vertical rails (4613) and may be free to slide vertically or in any other sufficient direction such that sufficiently small or no vibration is transferred from the hammer to the remainder of the machine.
Figure 46A:
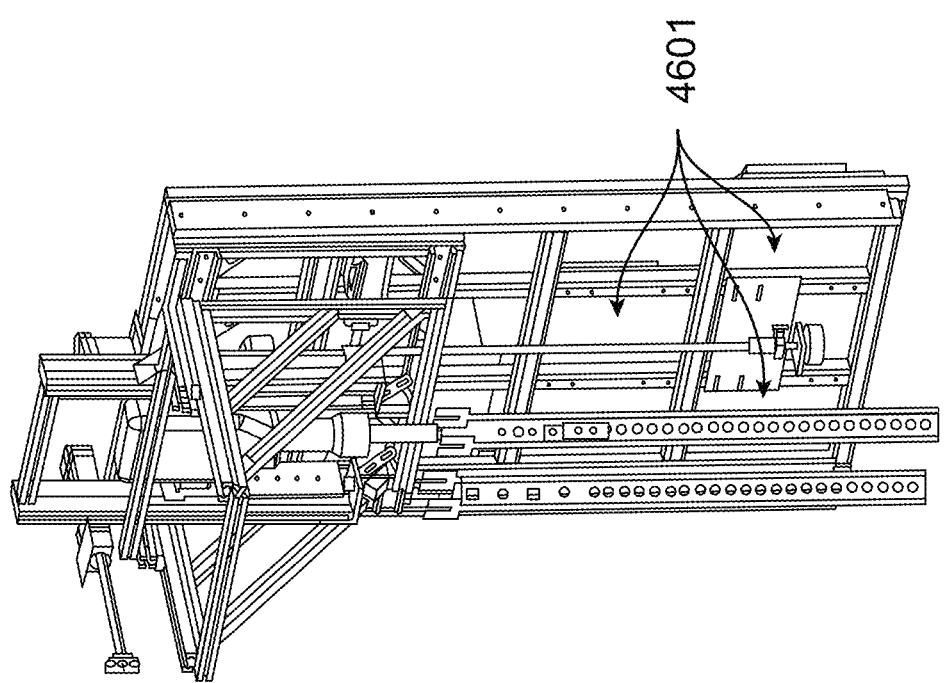
Figures 47A, 47B:
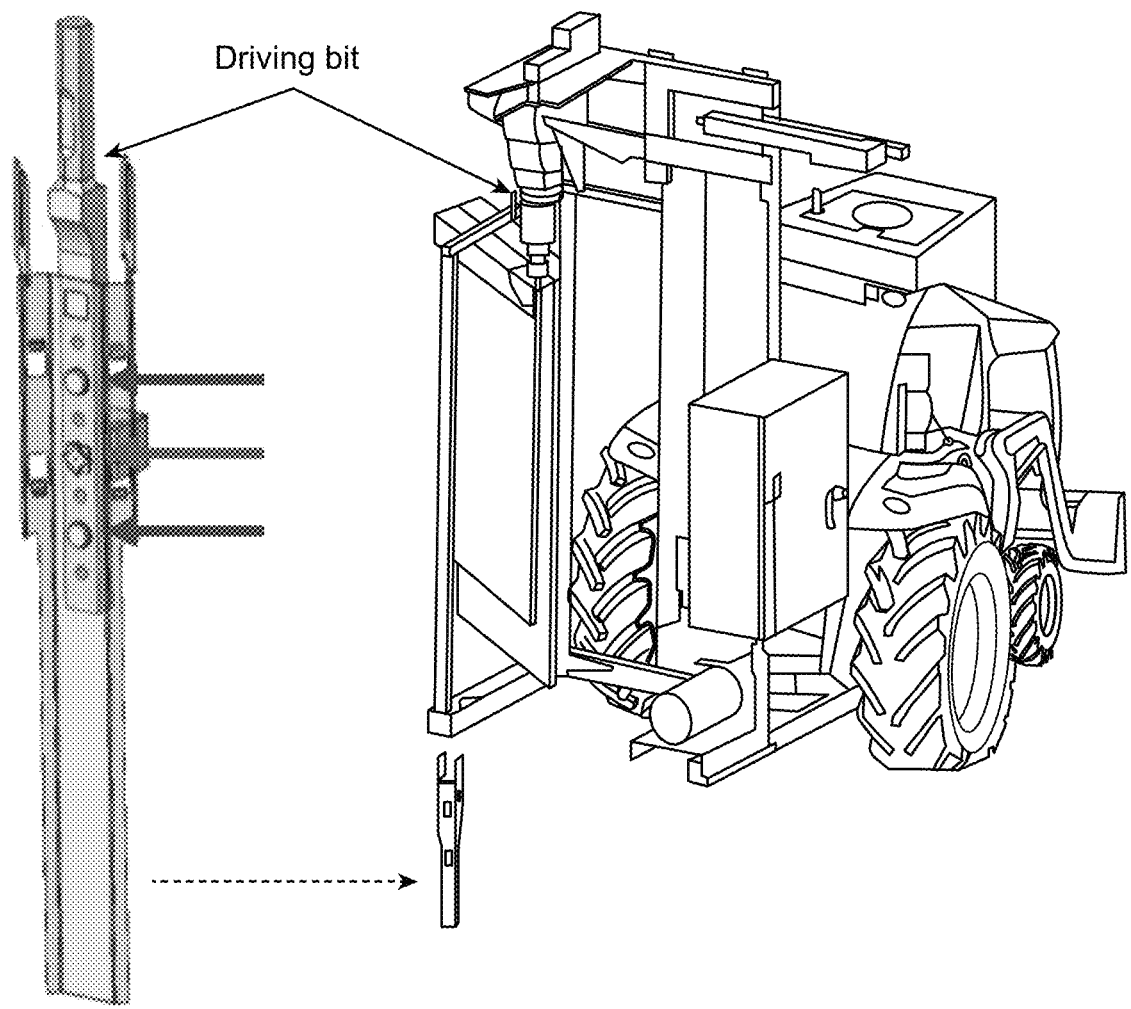
FIGS. 47A-47I show coupling mechanisms between a driving bit and a post, in accordance with some embodiments. In some cases, a driving bit may be connected to a hammer. In some cases, a driving bit may comprise a shear interface for engaging a post during the pounding. In some cases, a driving bit may comprise a retention feature which prevents a post from falling off of the bit while it is being positioned and driven. In some cases, a driving bit may be configured to allow a post to be pounded from the post's web, which may be disposed lower on the body of the post. In some cases, pounding from the web may allow the hammer to impact the post with greater force, as compared to impacting from the head, because pounding from the web may effectively lower the buckling length of the post during pounding. In some cases, a driving bit may enter a larger portion of a hole in a post. In some cases, a driving bit may slide down in a configuration and retain against a chisel bit. In some cases, a head of a chisel feature on a driving bit may overlap with at least a portion of a post when the driving bit is engaged with the post. In some cases, there may be 1, 2, 3, 4, or more shear features on a chisel bit. In some cases, a chisel bit may also be used as a retention feature. In some cases, a feature on a chisel bit may retain a post. In some cases, a feature on a chisel bit may be separate from a feature that is pounding the post. In some cases, a retention feature may be a clocking element that rotates to engage with a post. In some cases, a retention feature may be a clocking square that turns about 45 degrees such that the corners retain a post once engage. In some cases, a retention feature may overhang a hole in the post. In some cases, a shaft may not engage a bottom of a hole in the post. In some cases, a ping may engage with a post without overhanging.
Figures 47C, 47D:
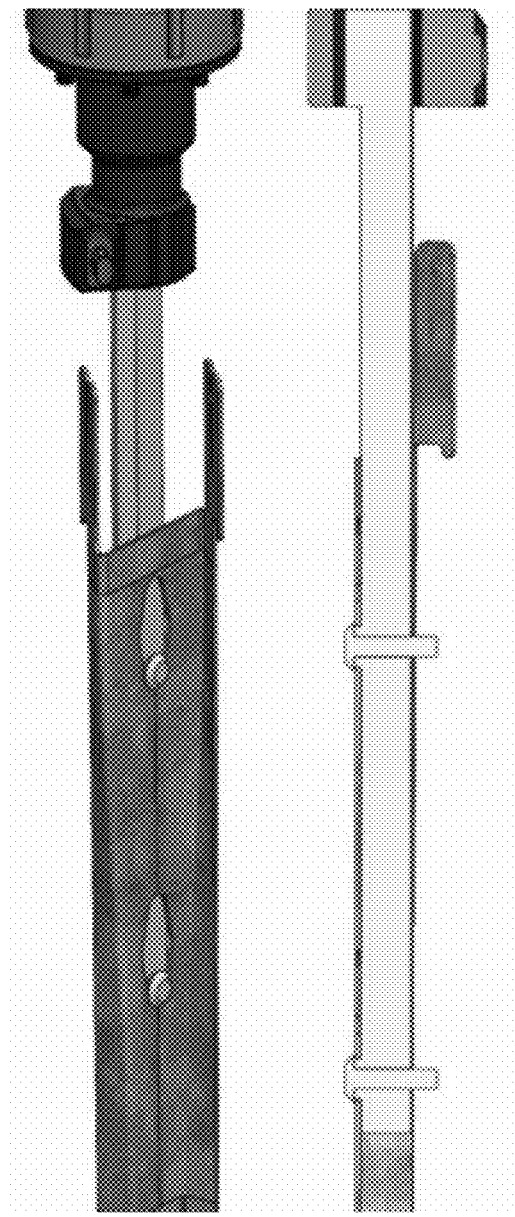
Figure 47G:
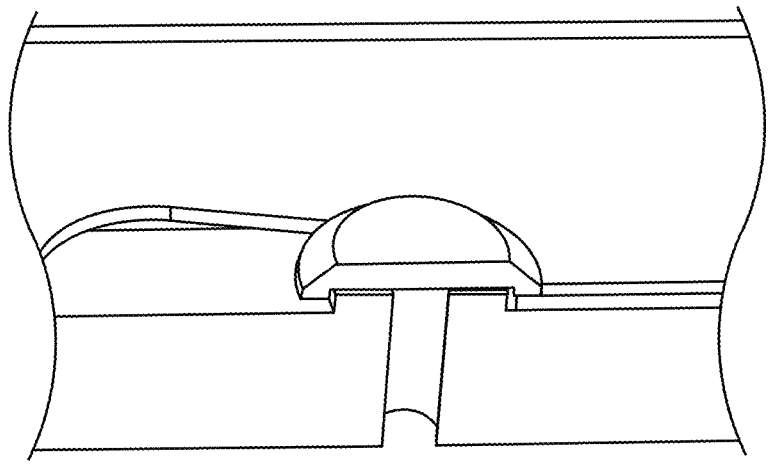
Figure 47F:
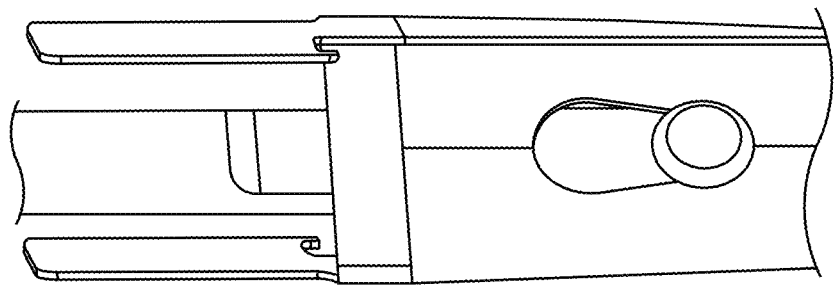
Figure 47E:
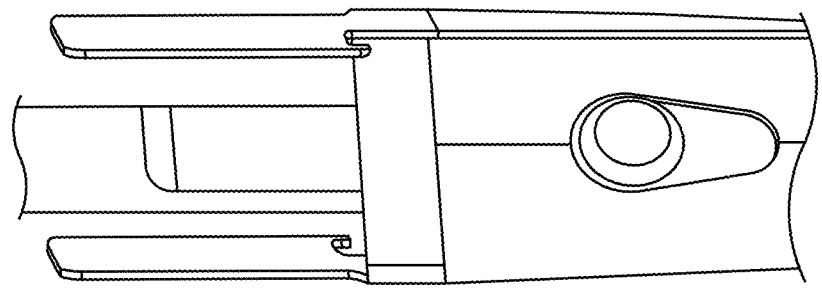
Figure 47H:
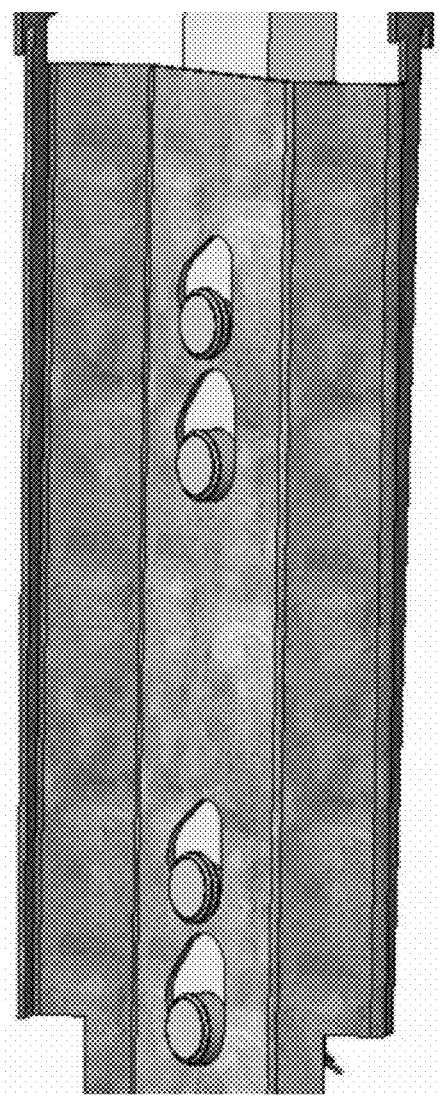
Figure 47I:
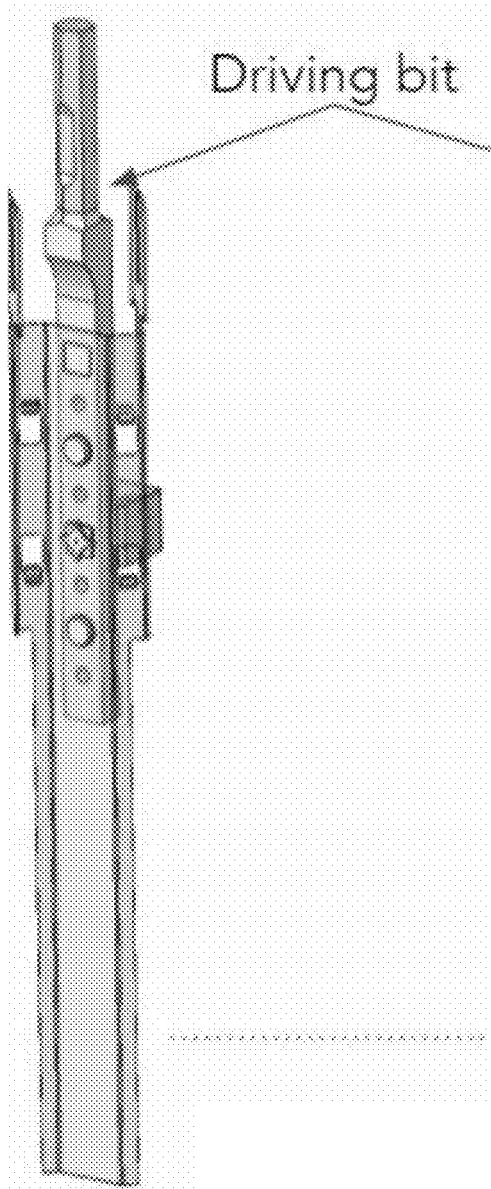
Figures 49A, 49B, 49C:
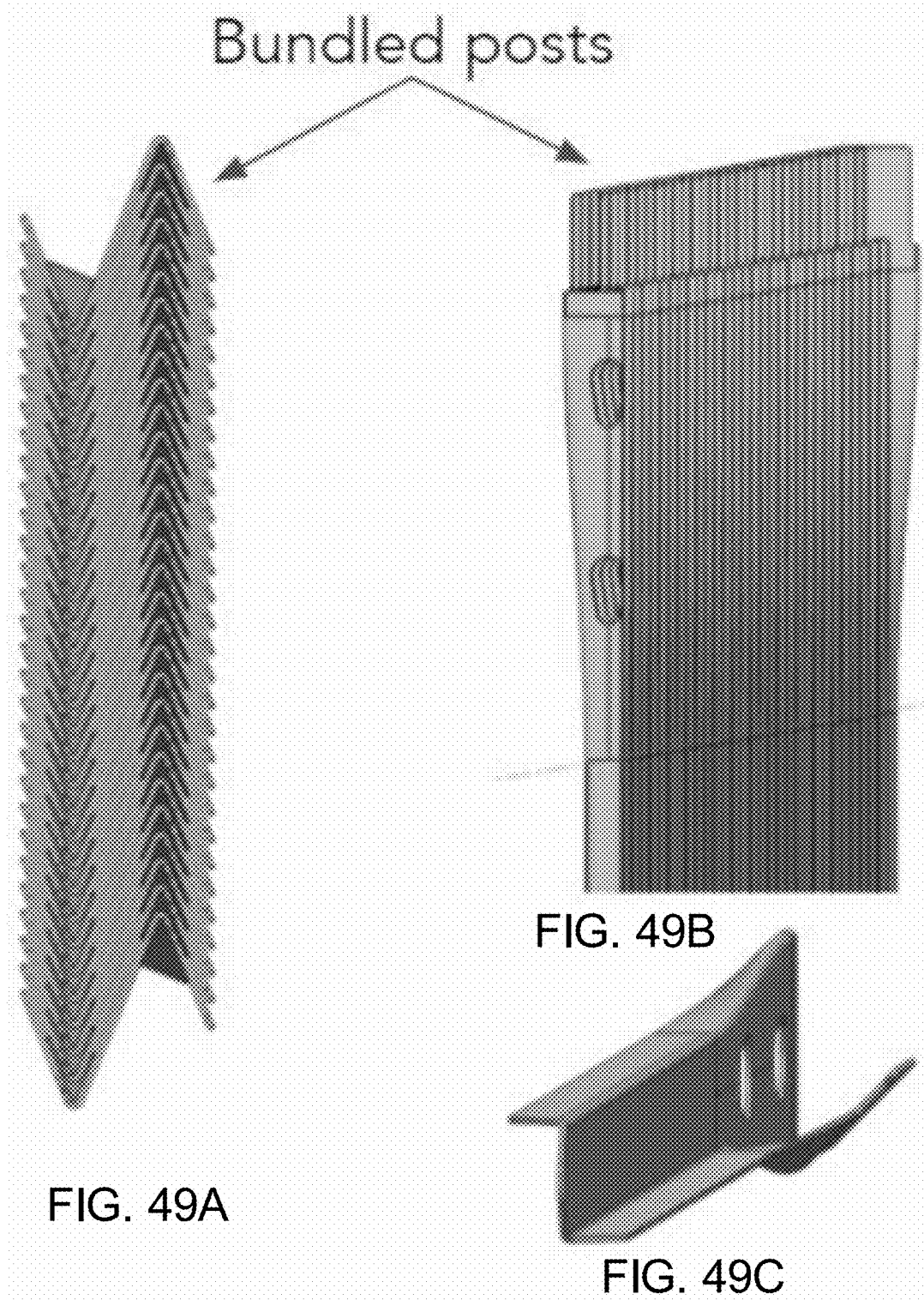
FIGS. 49A-49C show posts, in accordance with some embodiments.

FIGS. 46A-46B show a machine for installing posts, such as those illustrated in FIGS. 49A-49C. In some cases, the machine may have 3 or more mounting interfaces to mount a tractor to, for example, using a 3 point hitch. In some cases, the machine may carry a hammer for pounding a post into the ground. In some cases, the hammer may be mounted on vertical rails and may be free to slide vertically or in any other sufficient direction such that sufficiently small or no vibration is transferred from the hammer to the remainder of the machine.

FIGS. 50A-50C show coupling mechanisms between posts and a rack, in accordance with some embodiments. In some cases, a post may comprise a Z shaped section or a Z shape. In some cases, a post may comprise a shape that is substantially stackable. In some cases, a post may comprise one or more oblique set of tabs at the top. In some cases, a tab may comprise a cutout feature. In some cases, a cutout feature may be configured to allow a post to be hung from a hanger or a rack. In some cases, one or more posts may be bundled and shipped in a container or provided to a machine.

In some embodiments, the apparatus may be further configured to perform a force test after the select post has been installed at the predetermined location. In some embodiments, the force test may comprise applying a pull force on the select post in at least one of a lateral direction or a vertical direction.

In some embodiments, the select post may be installed at a predetermined location using a load driving mechanism configured to drive the select post into the ground at the predetermined location. In some cases, the load driving mechanism comprises or is coupled to a hammer. In some cases, the load driving mechanism is mounted to and movable along a plurality of rails in a vertical direction. In some cases, the load driving mechanism is configured to slide along the plurality of rails via bearings.

In some cases, the load driving mechanism comprises a retention mechanism that prevents the select post from displacing or decoupling from the load driving mechanism as the select post is being installed into the ground. In some cases, the retention mechanism comprises one or more shear features.

In some cases, the load driving mechanism comprises a driving bit having one or more shear features. In some cases, the one or more shear features may be configured to dually function as retention features. In some cases, the load driving mechanism is configured to have a driving force length that is less than a full longitudinal length of the select post.

FIGS. 47A-47I show coupling mechanisms between a driving bit and a post, in accordance with some embodiments. In some cases, a driving bit may be connected to a hammer. In some cases, a driving bit may comprise a shear interface for engaging a post during the pounding. In some cases, a driving bit may comprise a retention feature which prevents a post from falling off of the bit while it is being positioned and driven. In some cases, a driving bit may be configured to allow a post to be pounded from the post's web, which may be disposed lower on the body of the post. In some cases, pounding from the web may allow the hammer to impact the post with greater force, as compared to impacting from the head, because pounding from the web may effectively lower the buckling length of the post during pounding. In some cases, a driving bit may enter a larger portion of a hole in a post. In some cases, a driving bit may slide down in a configuration and retain against a chisel bit. In some cases, a head of a chisel feature on a driving bit may overlap with at least a portion of a post when the driving bit is engaged with the post. In some cases, there may be 1, 2, 3, 4, or more shear features on a chisel bit. In some cases, a chisel bit may also be used as a retention feature. In some cases, a feature on a chisel bit may retain a post. In some cases, a feature on a chisel bit may be separate from a feature that is pounding the post. In some cases, a retention feature may be a clocking element that rotates to engage with a post.

Figures 48A, 48B:
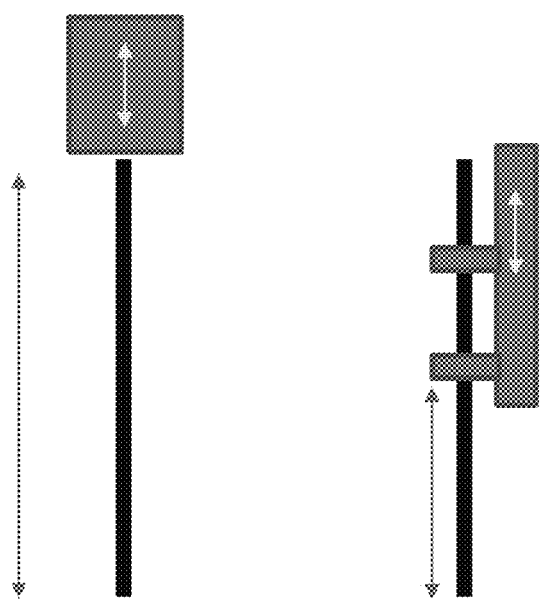
FIGS. 48A-48B show a comparison of driving a post using different coupling mechanisms, in accordance with some embodiments.

In some cases, a retention feature may be a clocking square that turns about 45 degrees such that the corners retain a post once engage. In some cases, a retention feature may overhang a hole in the post. In some cases, a shaft may not engage a bottom of a hole in the post. In some cases, a pin may engage with a post without overhanging. FIGS. 48A-48B show a comparison of driving a post using different coupling mechanisms, in accordance with some embodiments.

In some embodiments, the post may be driven into a terrain using a component that is positioned, oriented, and/or moved to impact a feature that is positioned along a length of the post. The component may comprise a hammer, a pin, or any other rigid structural member. In some cases, the movement of the component may be guided using a sleeve or a rail. The impact between the component and the feature may provide a driving force to push a post into a desired location. The point of impact may be closer to a center of gravity or a center of mass of the post, which can help to minimize buckling forces and to ensure that the post is installed in a desired orientation (e.g., perpendicular to the terrain or at any other desired angle relative to the terrain).

In another aspect, the present disclosure provides an apparatus that is configured to carry a plurality of solar modules over a terrain; autonomously position a select solar module from the plurality of solar modules over a set of posts installed on the terrain; and autonomously assemble the select solar module to the set of posts without requiring or using fasteners.

In some cases, the apparatus may be configured to autonomously assemble the select solar module to the set of posts by forming a plurality of post-clip interfaces. In some cases, the plurality of post-clip interfaces comprise a plurality of clinched joints.

In some cases, the select solar module can be pre-attached with a clip at one or more corners or sides of the select solar module, and each post in the set of posts may comprise a plurality of tabs. In some cases, the apparatus may be configured to autonomously position the select solar module over the set of posts by aligning the clip to a corresponding tab at each post. In some cases, the apparatus may be configured to autonomously assemble the select solar module to the set of posts by clinching the corresponding tab to the clip at each post.

Figure 59:
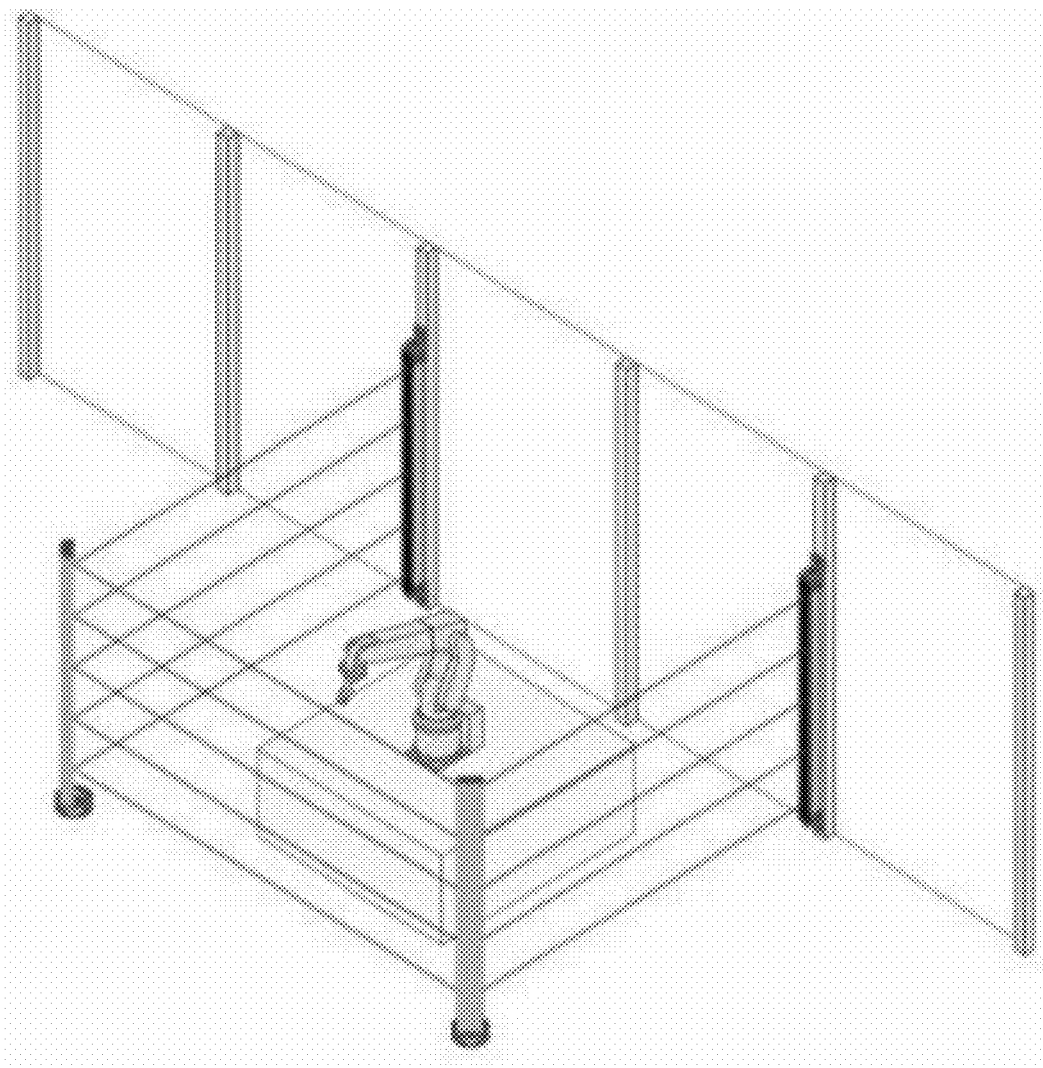
FIG. 59 illustrates a light curtain, in accordance with some embodiments. In some cases, a machine may comprise one or more optical sensors configured to detect when a foreign object (e.g., a human or another agent) enters a workspace defined by a light curtain.

FIG. 59 illustrates a light curtain, in accordance with some embodiments. In some cases, a machine may comprise one or more optical sensors configured to detect when a foreign object (e.g., a human or another agent) enters a workspace defined by a light curtain. When a foreign object enters the workspace, at least a portion of the light curtain may be interrupted or disrupted, which can trigger one or more safety procedures or protocols (e.g., shutting down a machine or limiting an operation of the machine until the foreign object exits the workspace).

The following examples are provided to further illustrate some embodiments of the present disclosure, but are not intended to limit the scope of the disclosure; it will be understood by their exemplary nature that other procedures, methodologies, or techniques known to those skilled in the art may alternatively be used.

Figure 21:
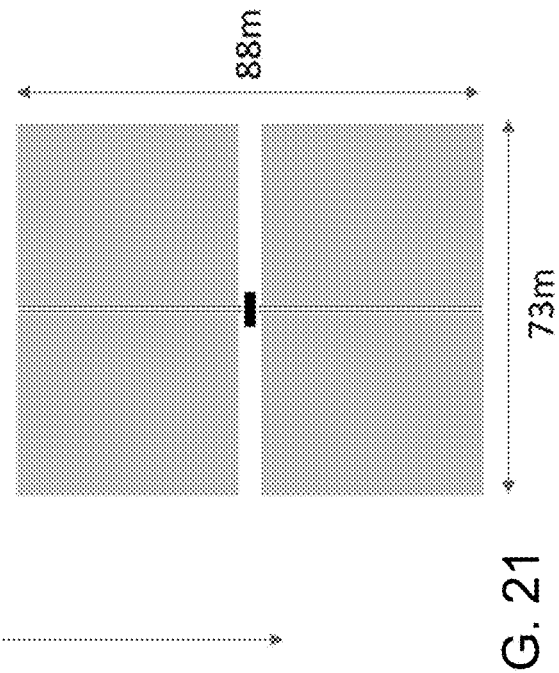
FIG. 21 shows how four of the blocks of FIG. 20 connect to one central inverter.
Figure 20:
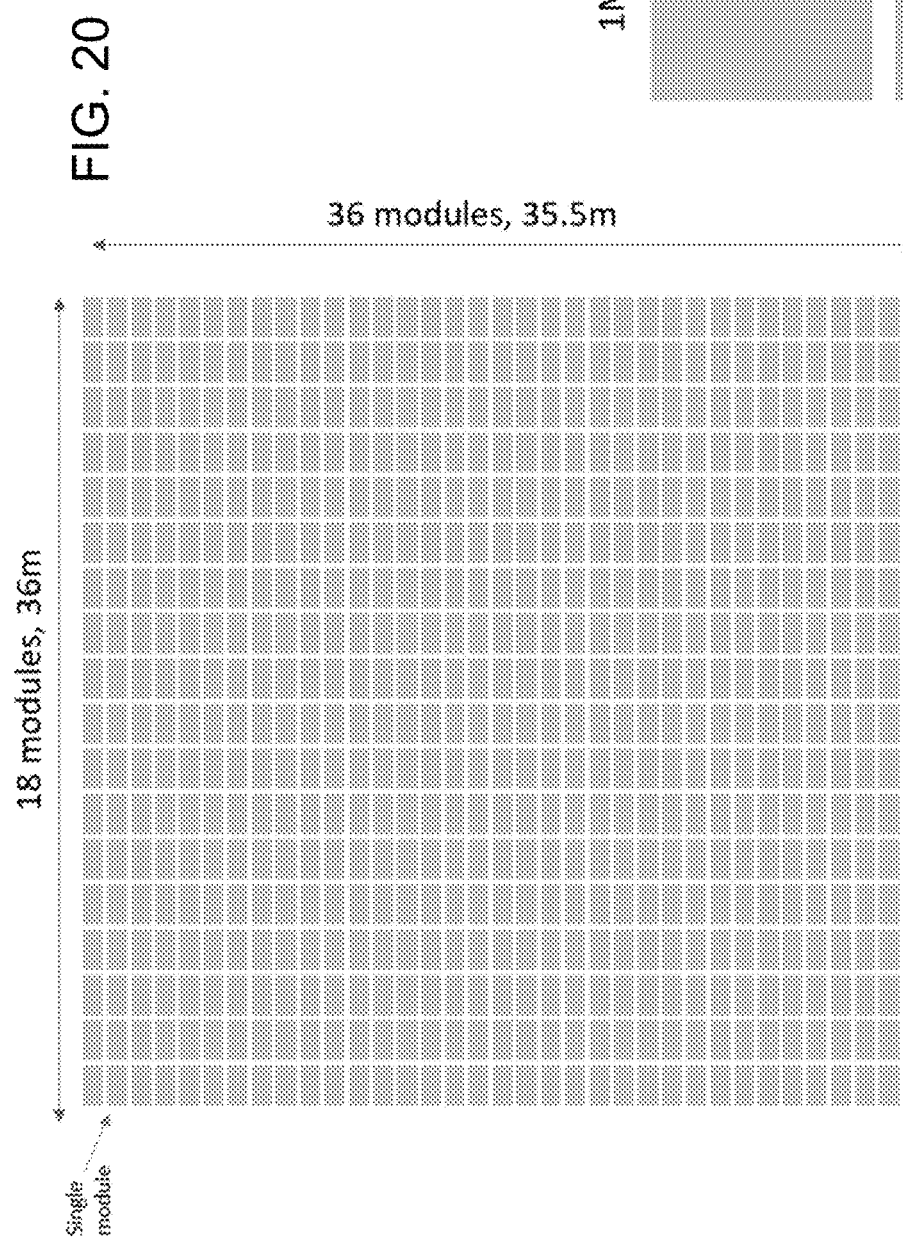
FIG. 20 shows a typical layout of standard blocks of solar modules in this connected orientation.

FIG. 20 shows a layout of blocks of solar modules in a connected orientation. FIG. 21 shows a plurality of blocks connected to a central inverter.

Figure 22:
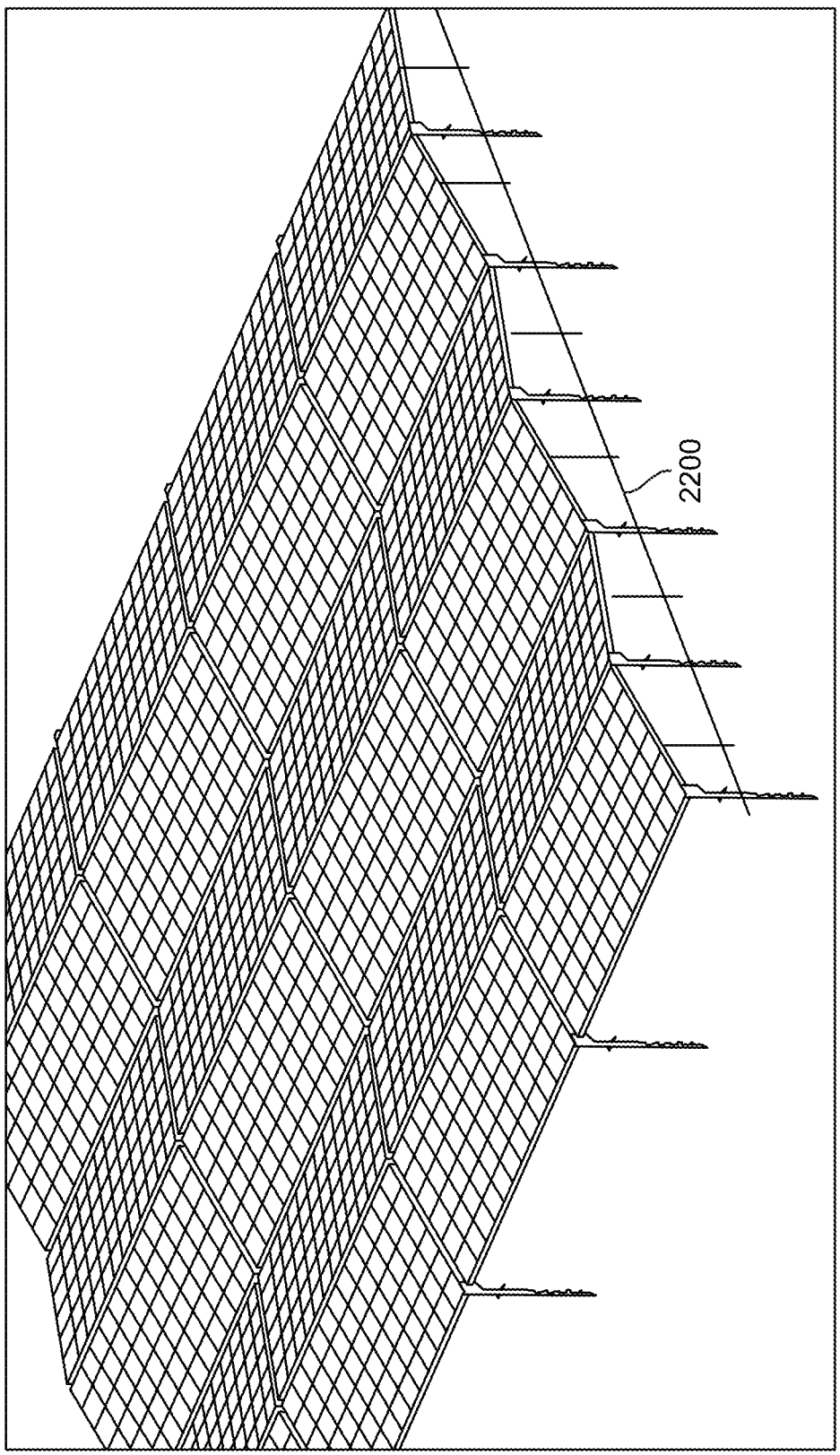
FIG. 22 is a perspective view of a portion of a block.

FIG. 22 is a perspective view of a portion of a block. The lines 2200 here show how the wires going from the module strings to the inverter (the 'home runs'), can be mounted on the side of an array and clipped to the posts.

Figure 23:
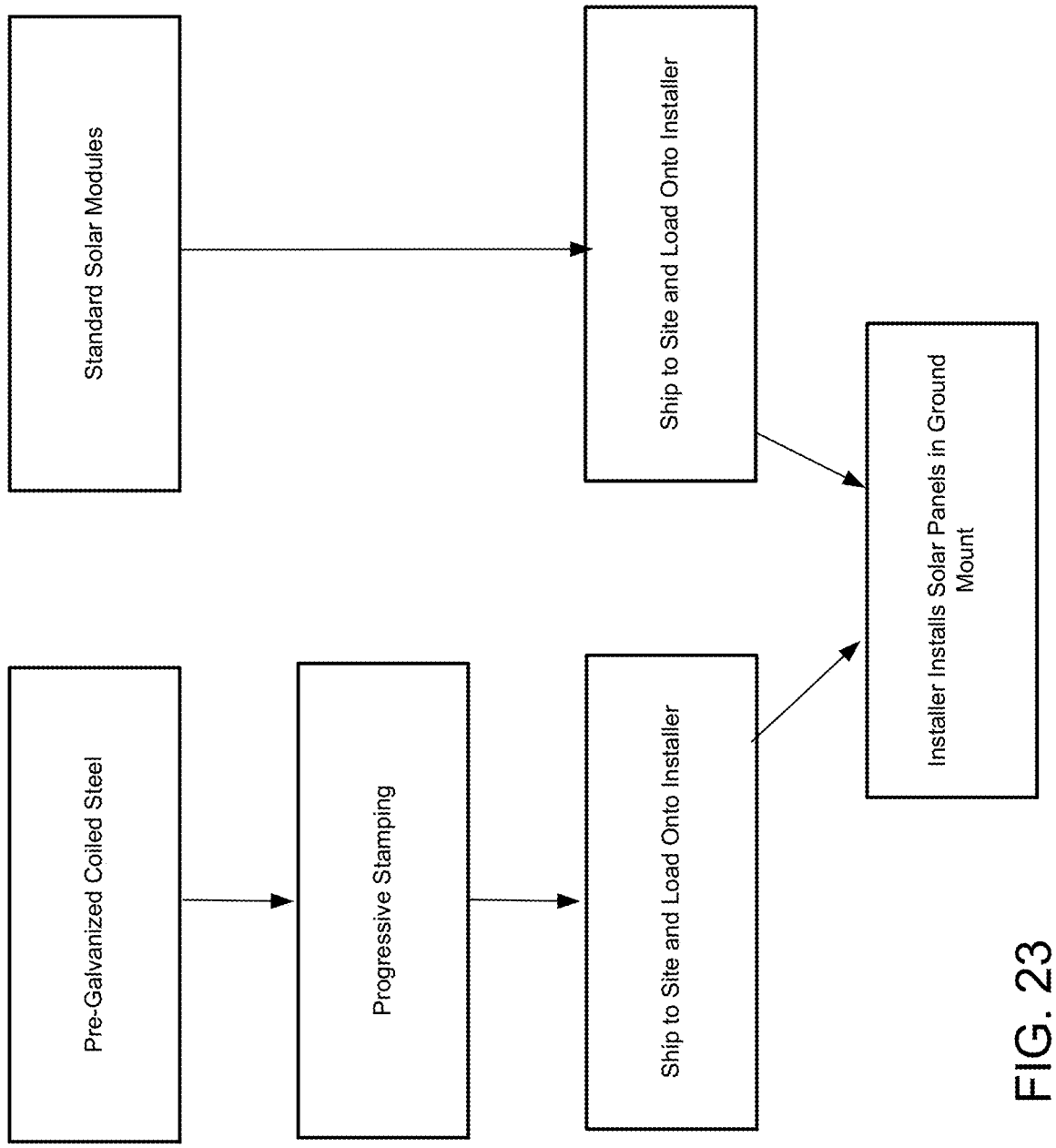
FIG. 23 is a simplified flow diagram illustrating a supply chain that is made available according to embodiments.

FIG. 23 is a simplified flow diagram illustrating a supply chain that is made available according to embodiments. The simplicity of this supply chain allows the posts, joints, and prefabricated solar modules to be shipped from the factories to a location for deployment. There, these components can be installed onto a machine that is configured for rapid and automatic installation of the ground mount system.

Figure 24:
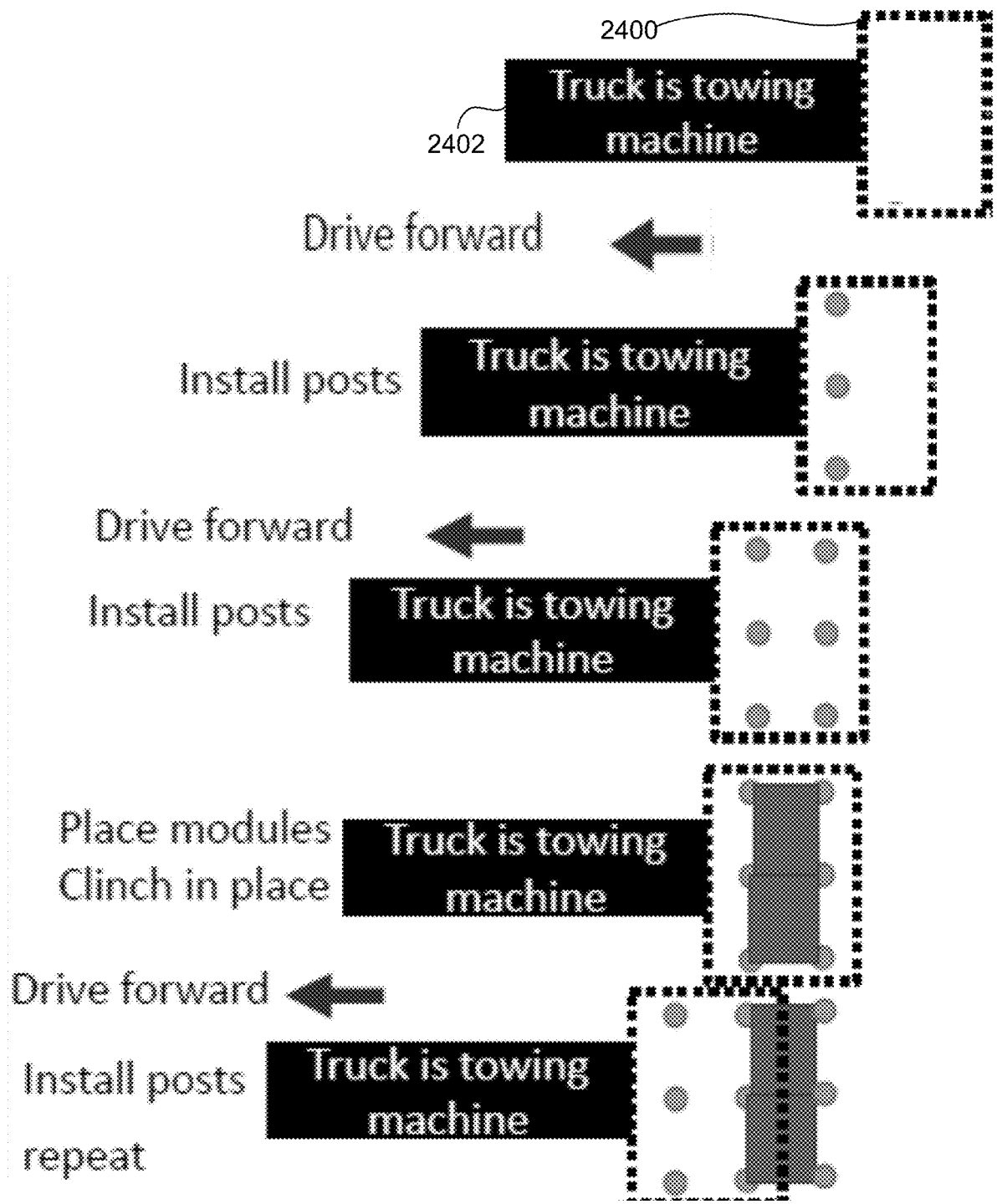
FIG. 24 is a simplified overhead view showing progress of one embodiment of an installation machine over a site.

FIG. 24 is a simplified overhead view showing progress of one embodiment of an installation machine 2400 over a site. Here, the machine is towed by a truck 2402, in a right-to-left direction. After the posts are pushed into the ground, the modules can be attached. In this particular embodiment, the modules may have clips pre-installed in them.

Figure 25:
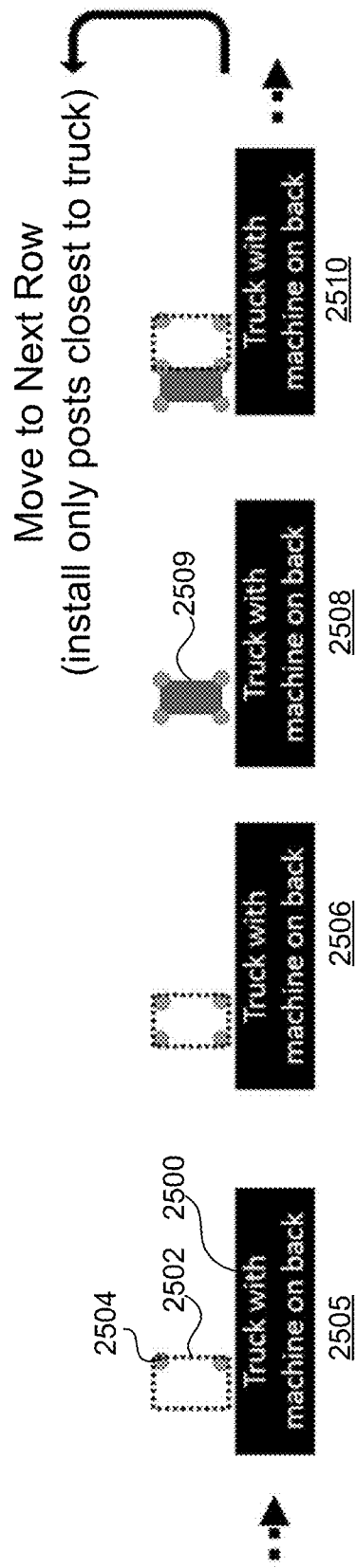
FIG. 25 is a simplified overhead view showing progress of an alternative embodiment of an installation machine 2500 over a site FIG. 26 provides a formal coordinate system for describing a moving vehicle.

FIG. 25 is a simplified overhead view showing progress of an alternative embodiment of an installation machine 2500 over a site, from left-to-right. This particular embodiment utilizes a post tool jig 2502 that comprises a rectangle of fixed dimensions, in order to always index the next pair of posts 2504 off of the previous pair. Specifically, in a first phase 2505 two posts are pushed into the ground, with the jig used to position the posts relative to one another. In a second phase 2506, two more posts are pushed into the ground, again with the jig used to position the posts. In a third phase 2508, the module 2509 is placed directly after next pair of posts. The jig can grab features on clips on posts to both index and to hold the clips while pressing modules into them. A fourth phase 2510 places the next posts (e.g., using the jig to index from previous posts). The process may then be repeated.

In some cases, the path of the installation machine may be serpentine over the site. When the vehicle turns around and does the other side of the row (from right-to-left), everything is the same except only posts closest to the truck are implanted. The two specific installation machines presented in FIG. 24 and FIG. 25 are examples only, and alternative embodiments may be used.

Figure 26:
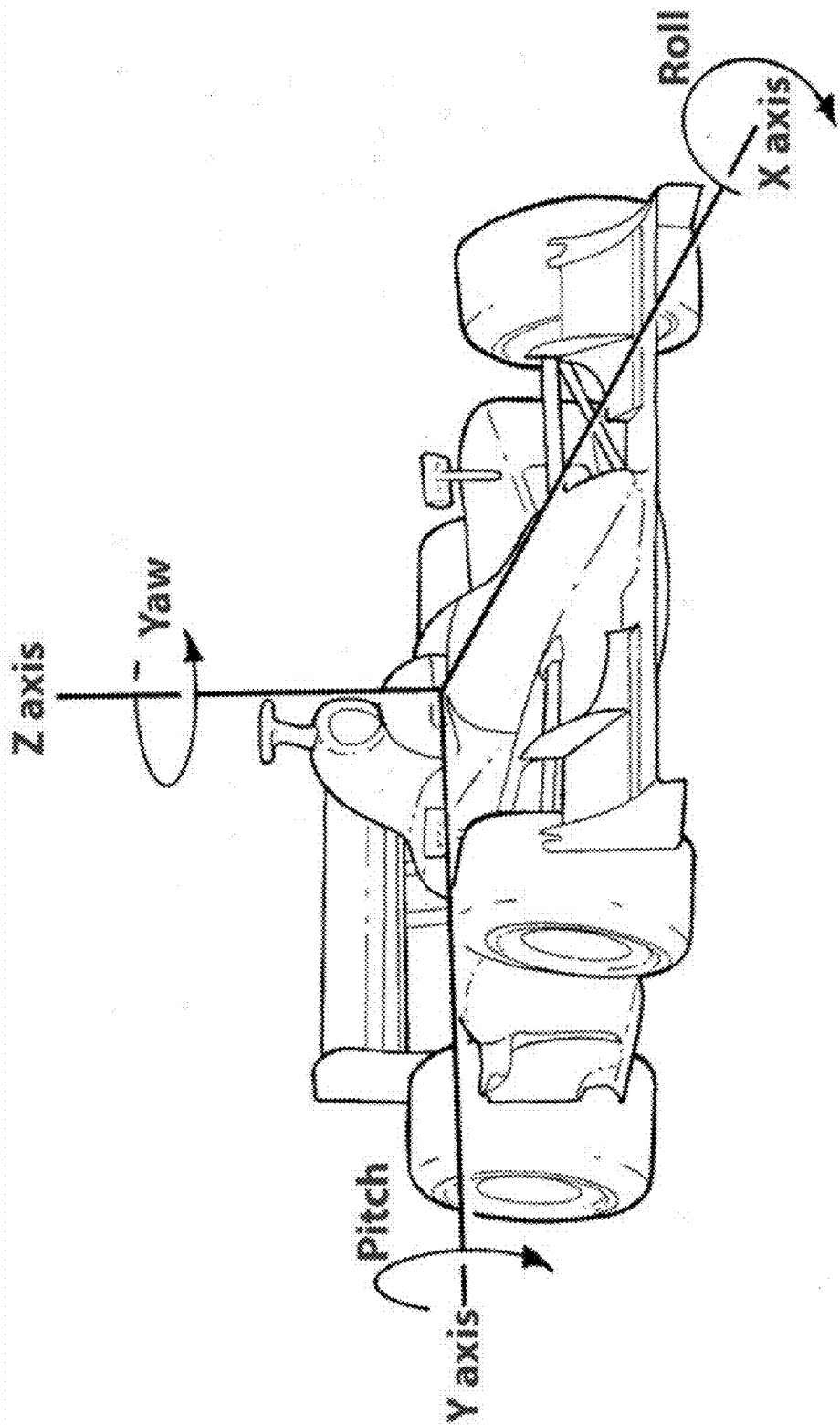

FIG. 26 provides a formal coordinate system for describing a moving vehicle. This coordinate system is now referenced to describe another exemplary embodiment of an apparatus configured to perform installation of ground mounted solar panels.

Figure 27:
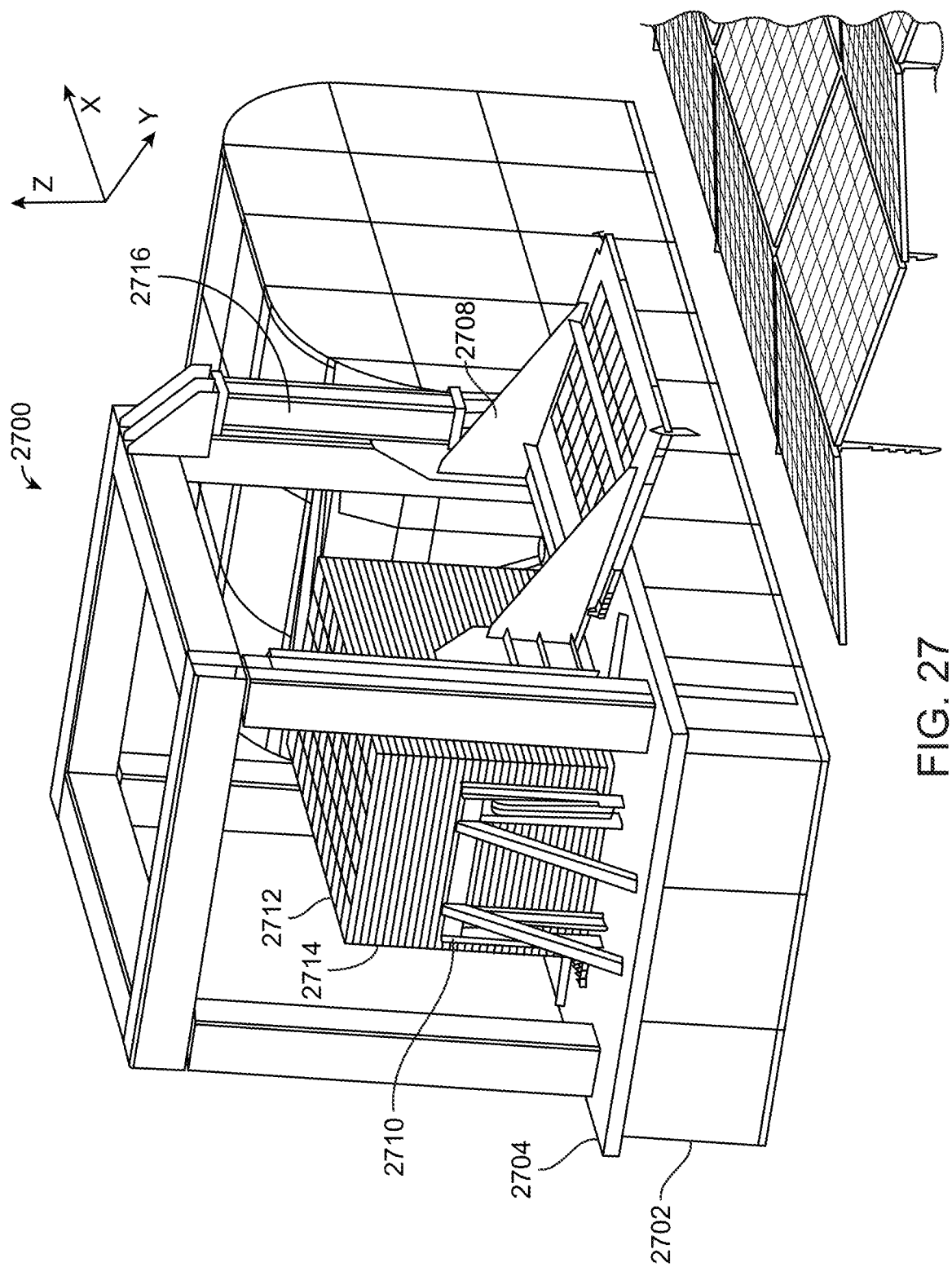
FIG. 27 shows a rear perspective view of one embodiment 2700 of the installation apparatus.

FIG. 27 shows a rear perspective view of one embodiment 2700 of the installation apparatus. The apparatus comprises various elements mounted to a moving vehicle 2702 (e.g., a pickup truck bed)—via a platform 2704. As described in detail below, this platform may be configured to move in one or more direction(s). Elements of the installation machinery may comprise a frame 2706 and a load head 2708. A vertical conveyor 2710 may be configured to receive a stack 2712 of individual pre-fabricated solar panels 2714. In some cases, the installation machinery may further comprise a hydraulic actuator 2716 for implanting posts into the ground by pushing (rather than hammering).

Figure 28:
FIG. 28 shows a detail of the vertical conveyor element which can be used to lower modules one at a time.
Figure 29:
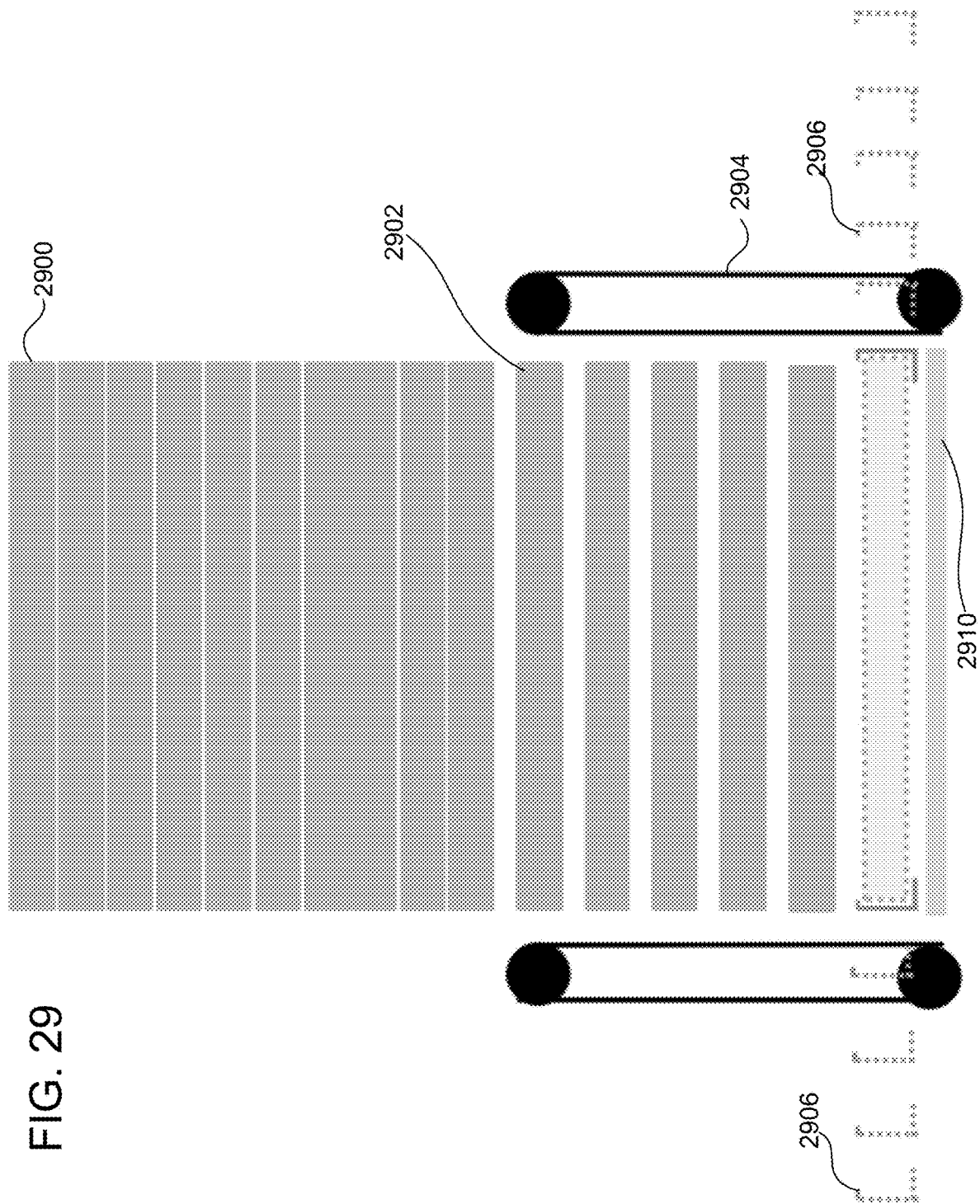
FIG. 29 is a schematic view showing how standard packaging of a stack of solar modules, can be loaded on to vertical conveyors and lowered module-by-module onto sheet metal joints.

FIG. 28 shows a detail of the vertical conveyor element which can be used to lower modules one at a time. FIG. 29 is a schematic view showing how standard packaging of a stack 2900 of solar modules, can be loaded on to vertical conveyors 2904 and individual modules 2904 then lowered onto the sheet metal clips 2906. The modules can be lowered onto the sheet metal clips 2906. The resultant combination of the module and clips can be lowered onto a tray 2910, which can slide out from the bottom of this stack.

Figure 30:
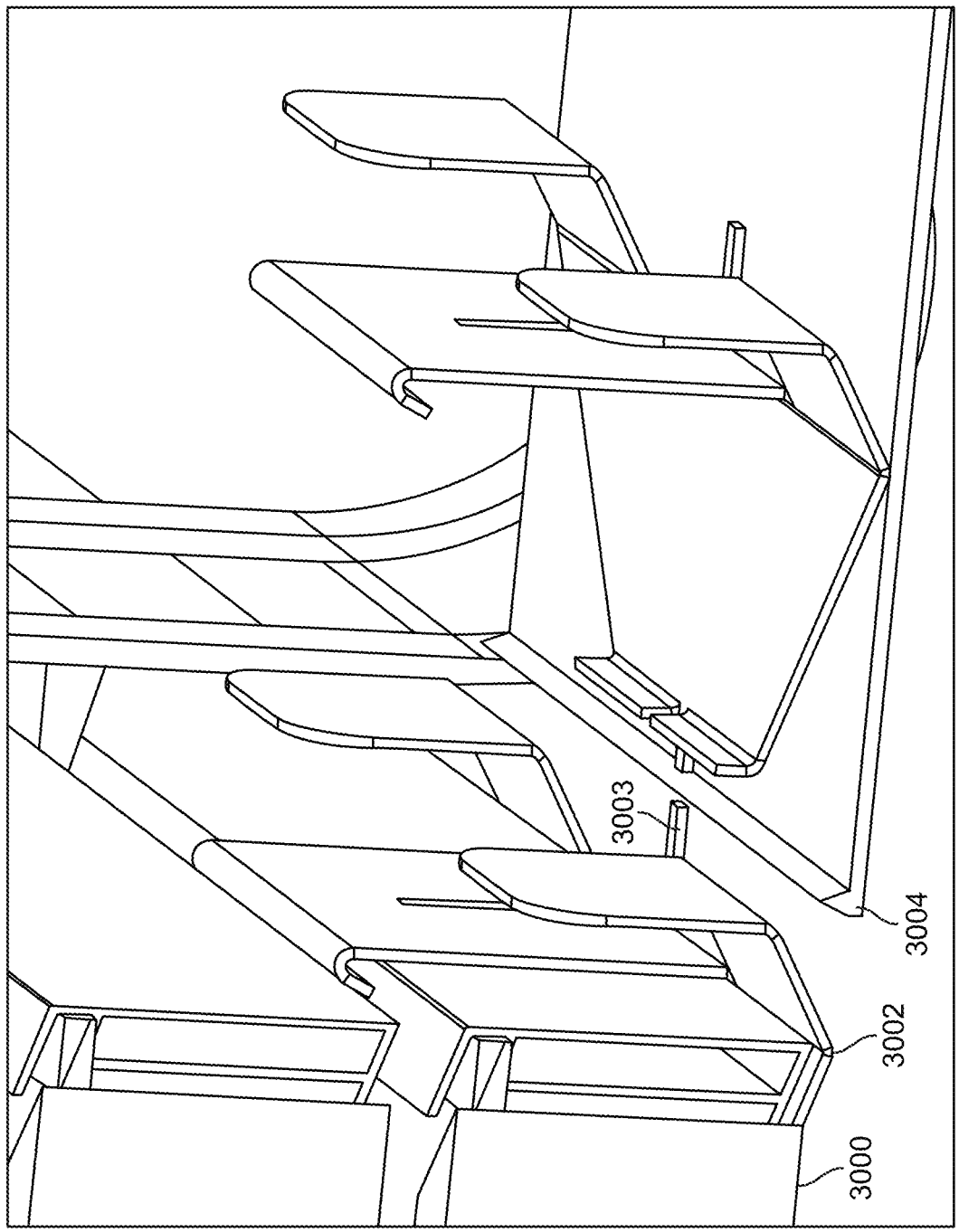
FIG. 30 shows a detail of a module lowered onto a joint.

FIG. 30 shows a detail of a module including a frame 3000 that is being lowered onto a clip 3002. The joint's connection 3003 to its adjacent joint can be severed by the piece 3004 during this process.

Figure 31:
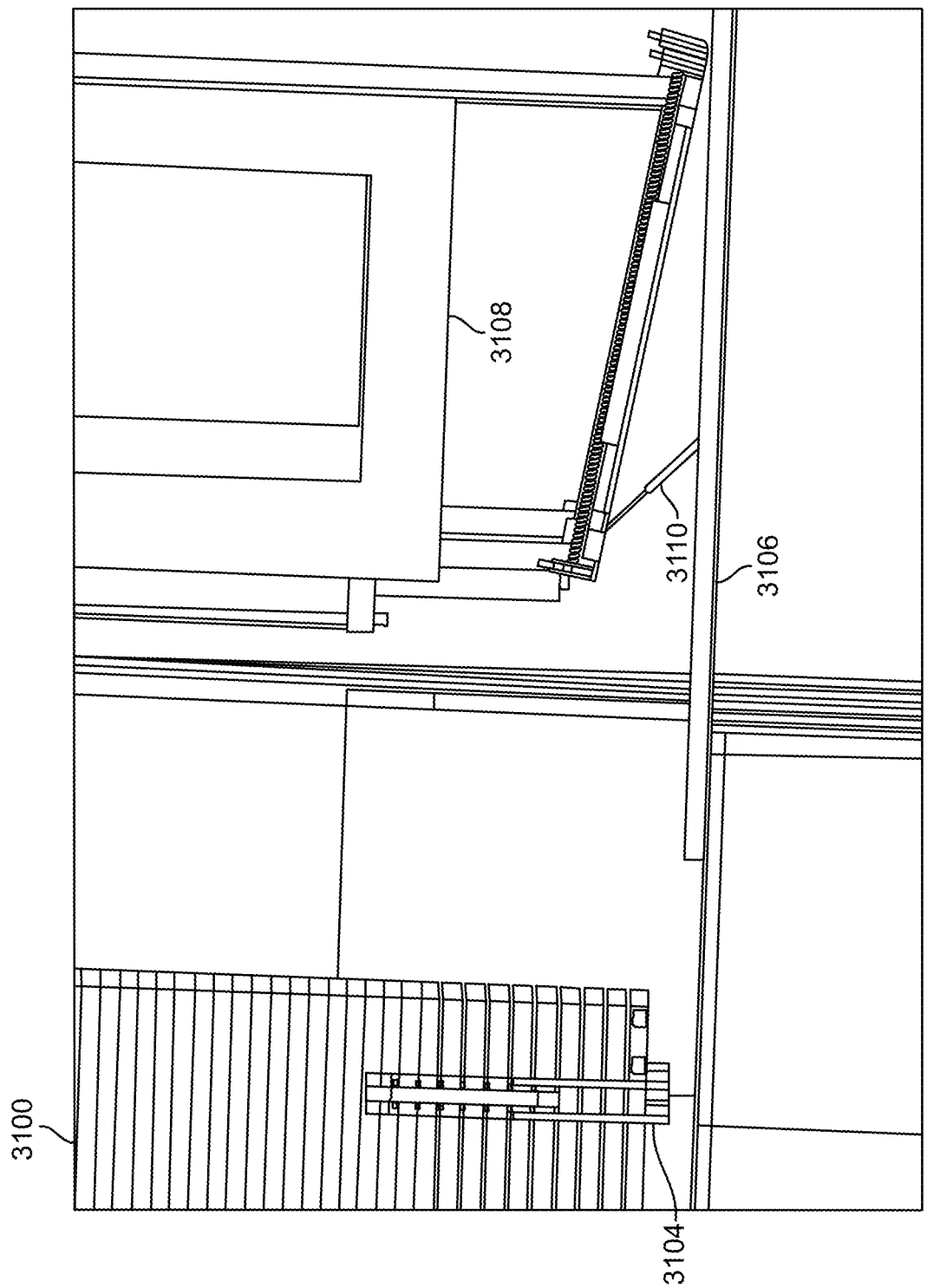
FIG. 31 shows a side view of a stack of solar modules on a vertical conveyor.

FIG. 31 shows a side view of a stack 3100 of solar modules on a vertical conveyor 3104. A horizontal rail 3106 can be used to slide the bottom module laterally onto the installation load head 3108. The module can be tilted by a small linear actuator 3110.

Figure 32:
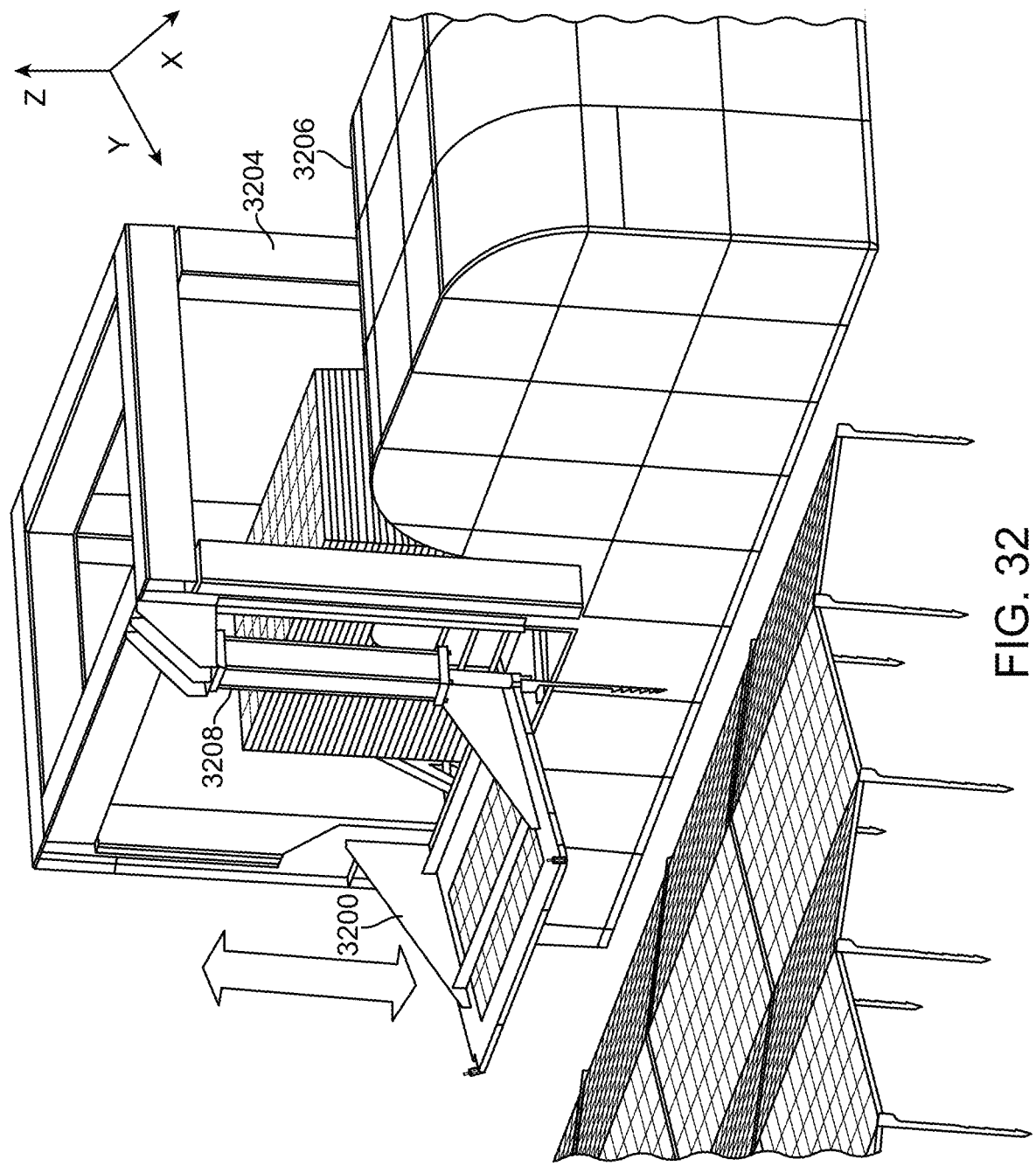
FIG. 32 shows a front perspective view of an installation apparatus.

FIG. 32 shows a front perspective view of the installation apparatus according to an embodiment. The load head 3200 is shown in vertical sliding motion relative to the frame 3204 which is connected to the truck 3206. This motion can be actuated by a hydraulic actuator 3208 which is mounted to the frame.

Figure 33:
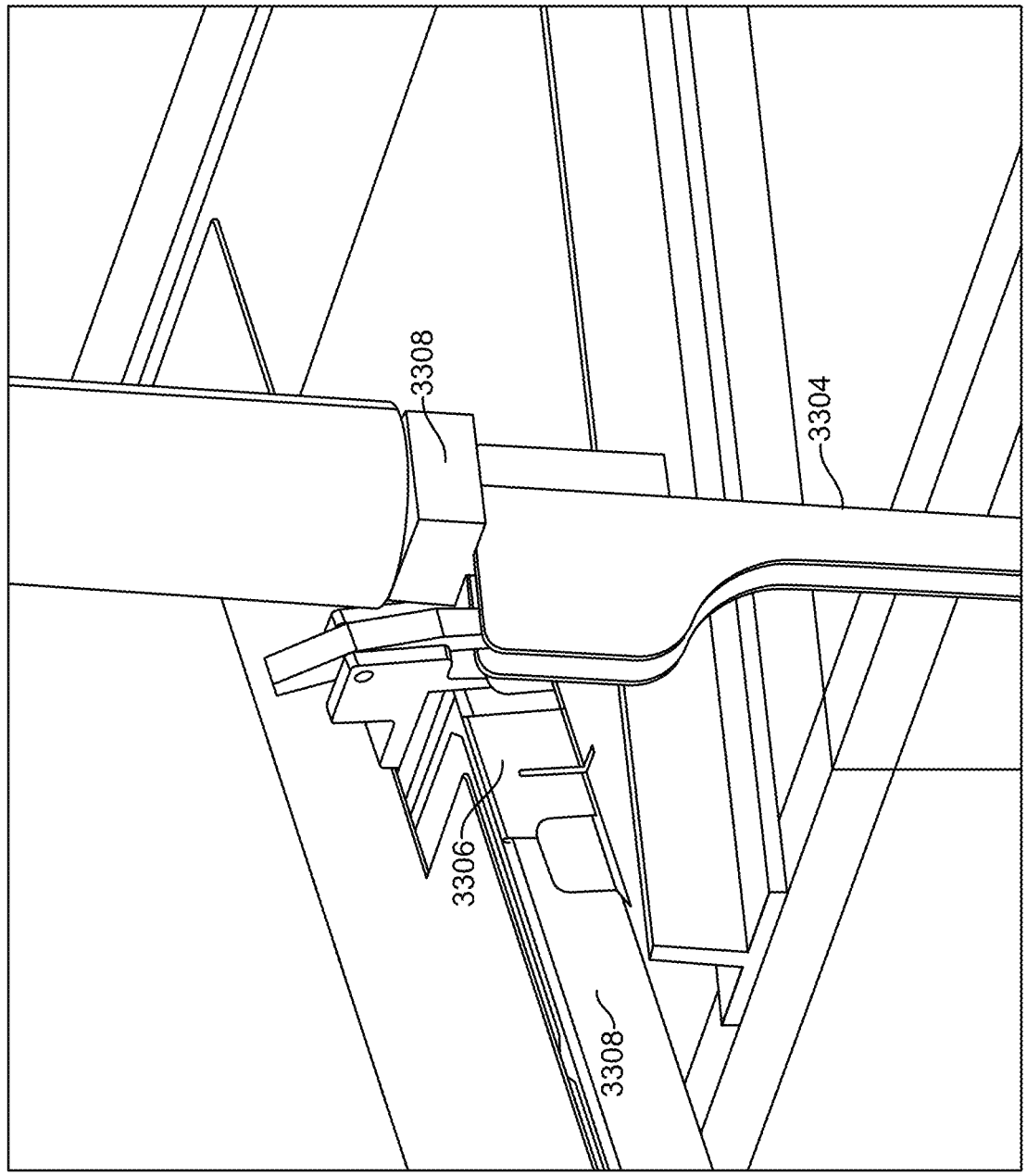
FIG. 33 shows a view of the load head frame connected to the actuator tip.

FIG. 33 shows a detailed view of the load head frame 3300 connected to the actuator tip 3302 that is used to (simultaneously) drive in the post 3304. A joint 3306 can be seen already attached to the solar module 3308 that is loaded into the load head. The tip 3308 of the actuator that is pushing directly on the post is also connected to the module load head. Thus, the module can be lowered into the correct place simultaneously as the post is driven into the ground. The connection between the actuator tip and the module load head can also have a flexure to reduce vibrations from being transferred to the module during installation.

In connection with the installation machine embodiment of FIGS. 27-33, one or more of the various elements (e.g., frame, load head, conveyor(s), others) can be mounted on the movable platform. That platform can be actuated in either: (i) x-axis, y axis, and yaw directions, or (ii) x-axis, y axis, yaw, pitch, and roll directions.

In some cases, a vertical actuator can control the Z axis motion. One method of controlling planar motion is via a two-way table. An additional drive can control the yaw direction.

Figure 34:
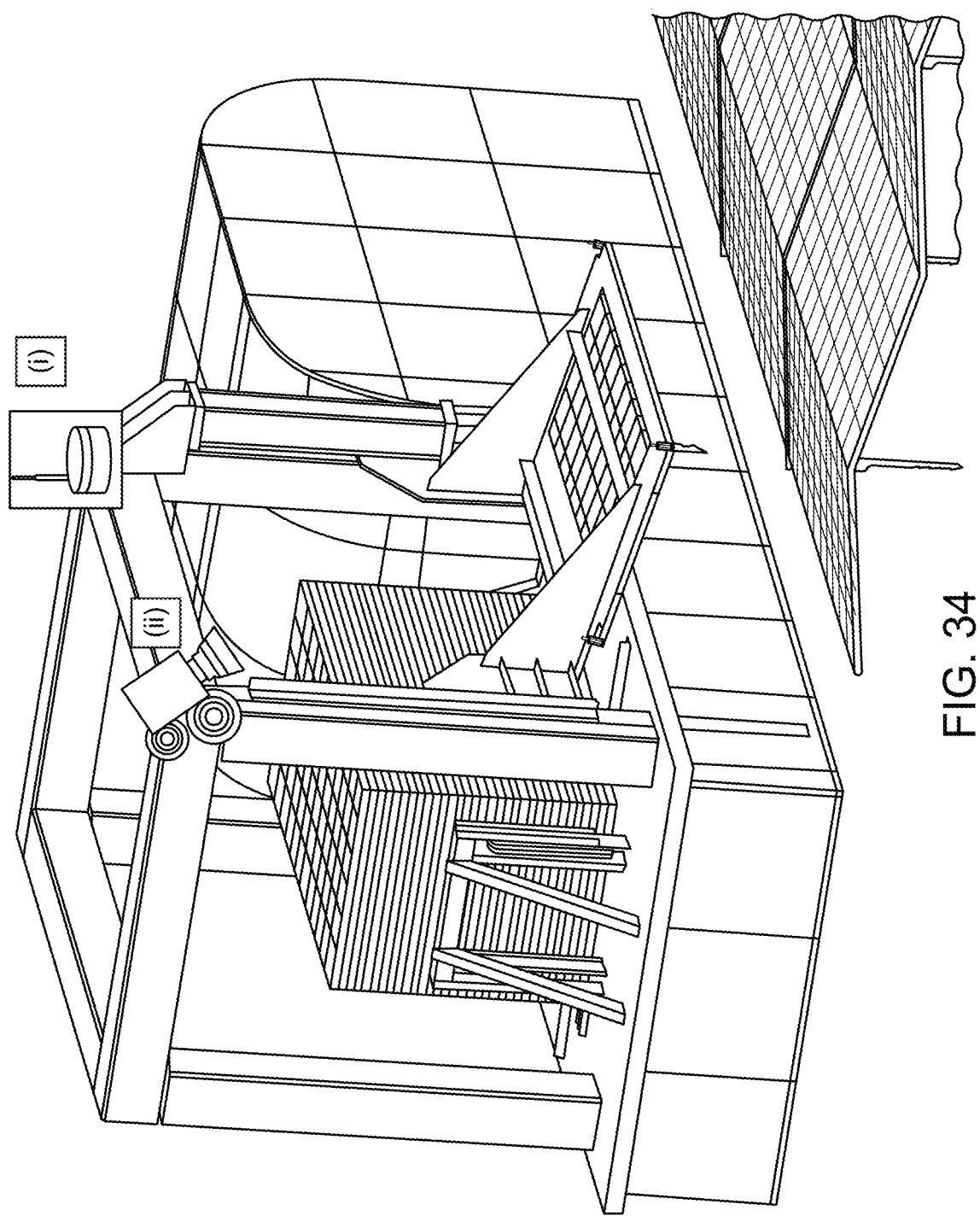
FIG. 34 shows approaches for controlling position of a moveable platform.

FIG. 34 further shows that the position of the moveable platform may be controlled (either separately or individually) by the use of: (i) a differential GPS system, (ii) cameras, (iii) lidar, and/or (iv) laser tracking. In some cases, a GPS and/or camera system may allow control over how to precisely place each module and post in the solar array. This functionality can provide control over the movable machinery on the red platform, and/or the position/driving of the entire installation apparatus (e.g., as disposed in a truck, within a trailer, or in the form of a specially-built vehicle).

Embodiments are not limited to the specific installation apparatuses described above, and alternatives are possible. For example, FIG. 35 shows a front perspective view of an alternative embodiment of an installation machine.

Figure 35:
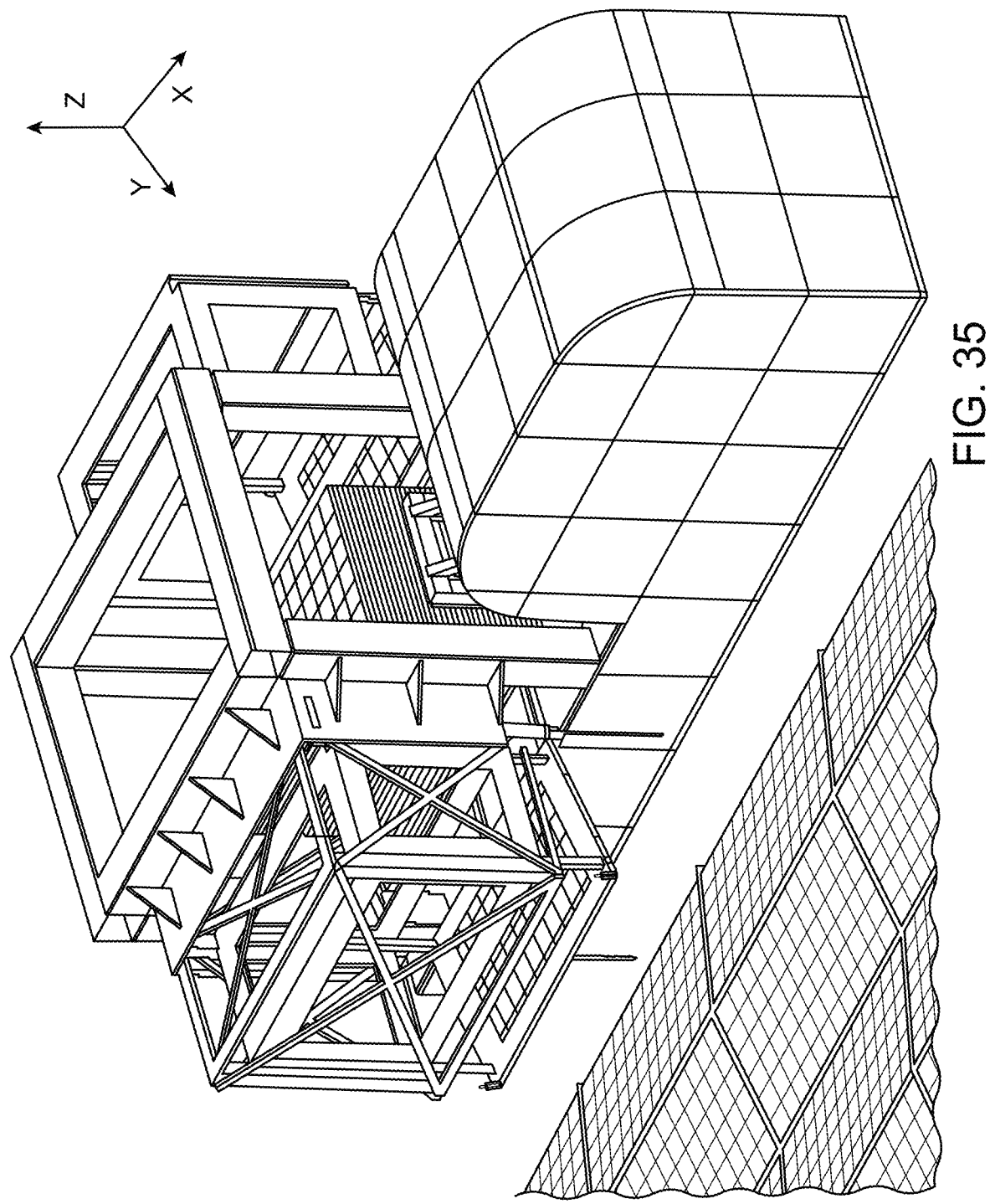
FIG. 35 shows a front perspective view of an installation apparatus according to an alternative embodiment.
Figure 36:
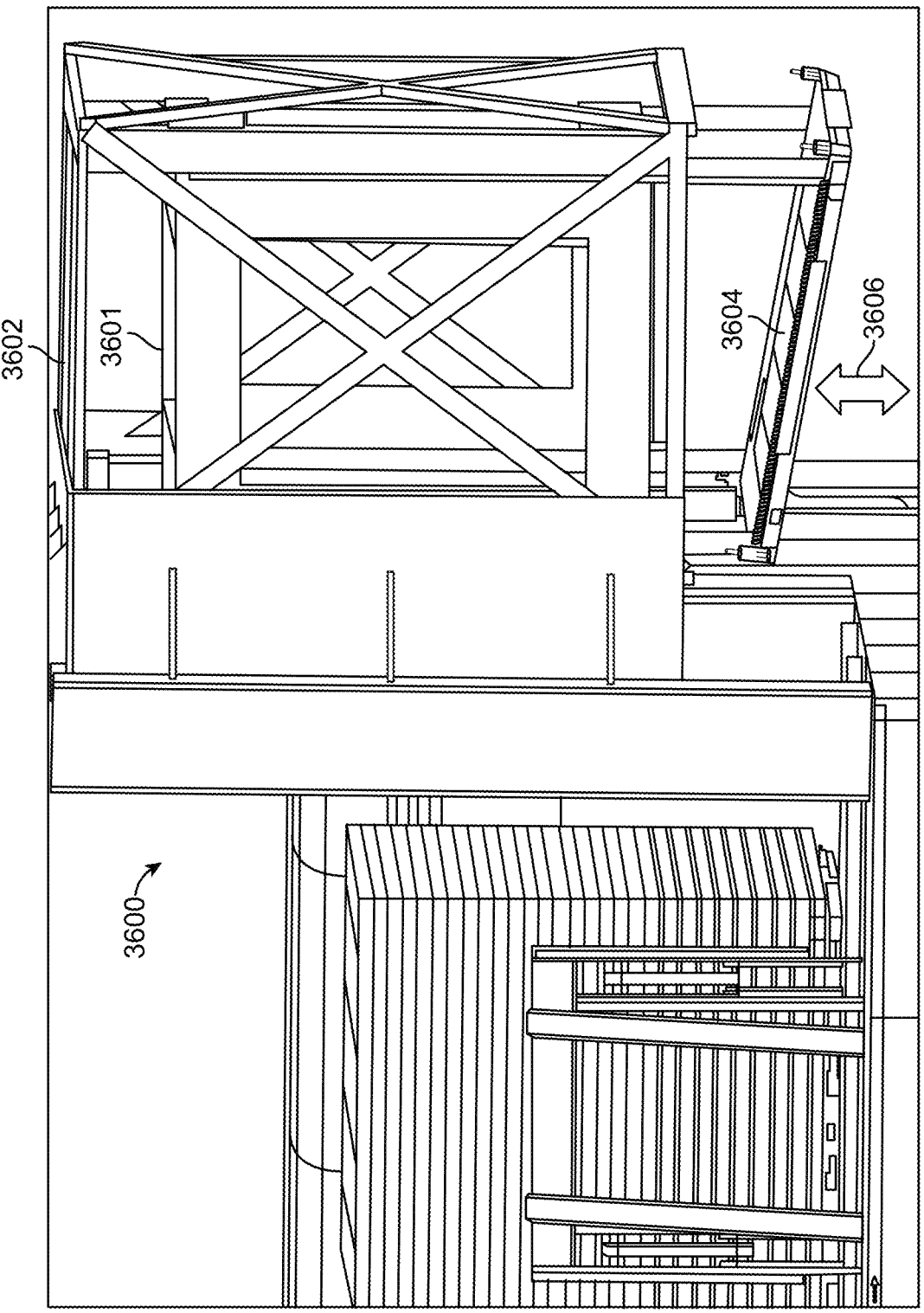
FIG. 36 shows an enlarged side view of the apparatus of FIG. 35.

FIG. 36 shows an enlarged side view of the installation apparatus 3600 illustrated in FIG. 35. Here, the load head 3601 can slide inside a retained fixture 3602 to install a single solar module 3604 in a vertical linear motion. The load head may be captured inside of the rigid frame to constrain motion to only vertical (shown by the arrow 3606).

Figure 37A:
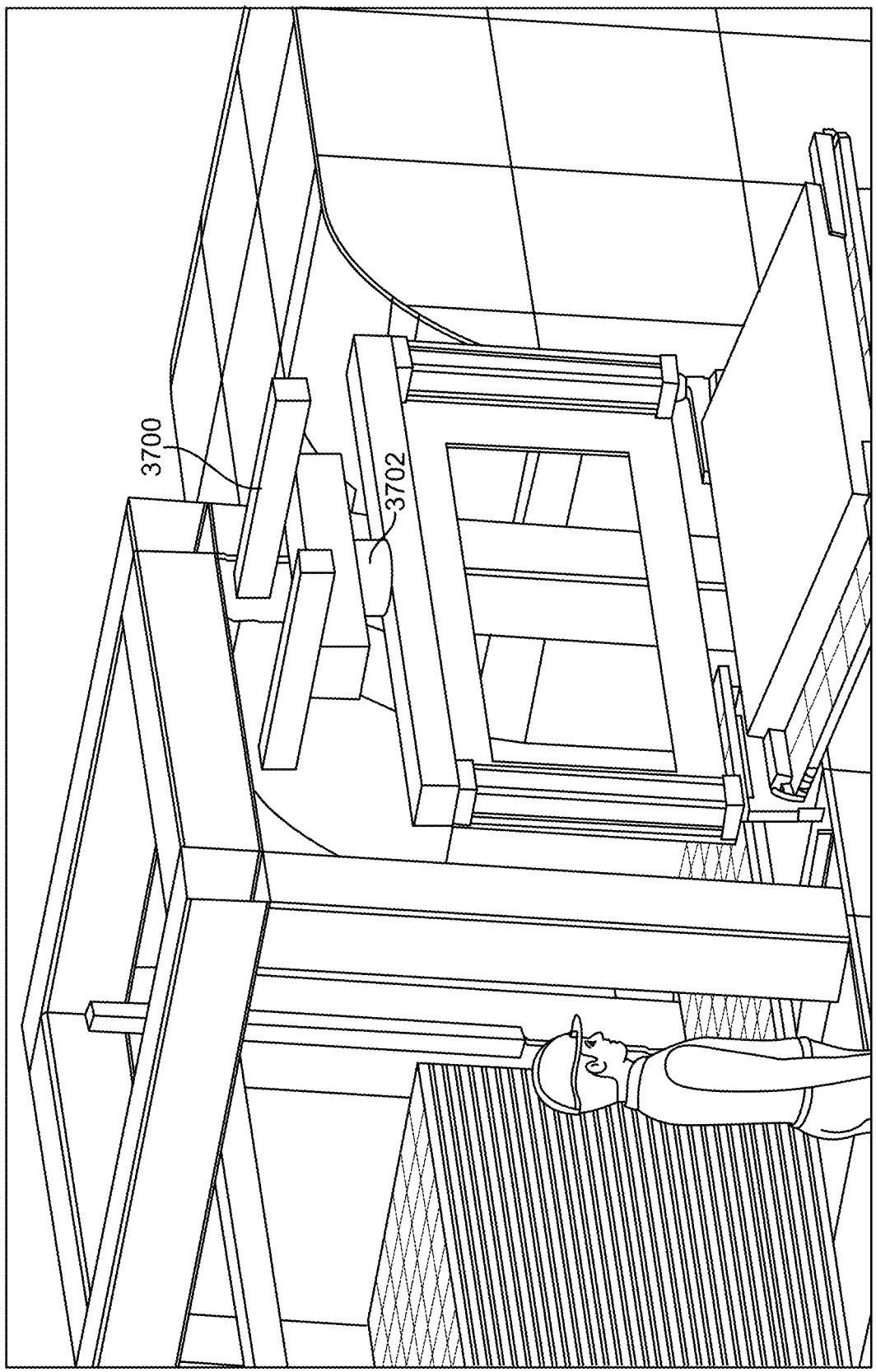
FIG. 37A shows a perspective view of an alternative embodiment.

FIG. 34 shows one non-limiting example of a platform that can be used to facilitate solar module deployment and installation. In some embodiments, the position of the module and load head can be controlled using a mechanism such as the overhead part 3700 shown in FIG. 37A, which can be attached to a frame of the platform.

Figure 37B:
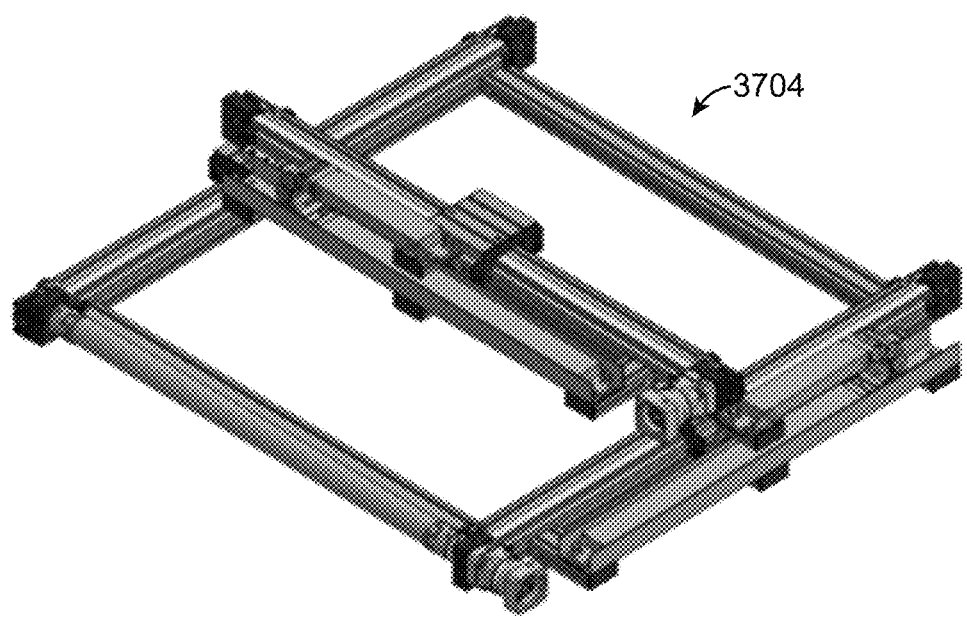
FIG. 37B shows an enlarged view of a gantry.
Figure 37C:
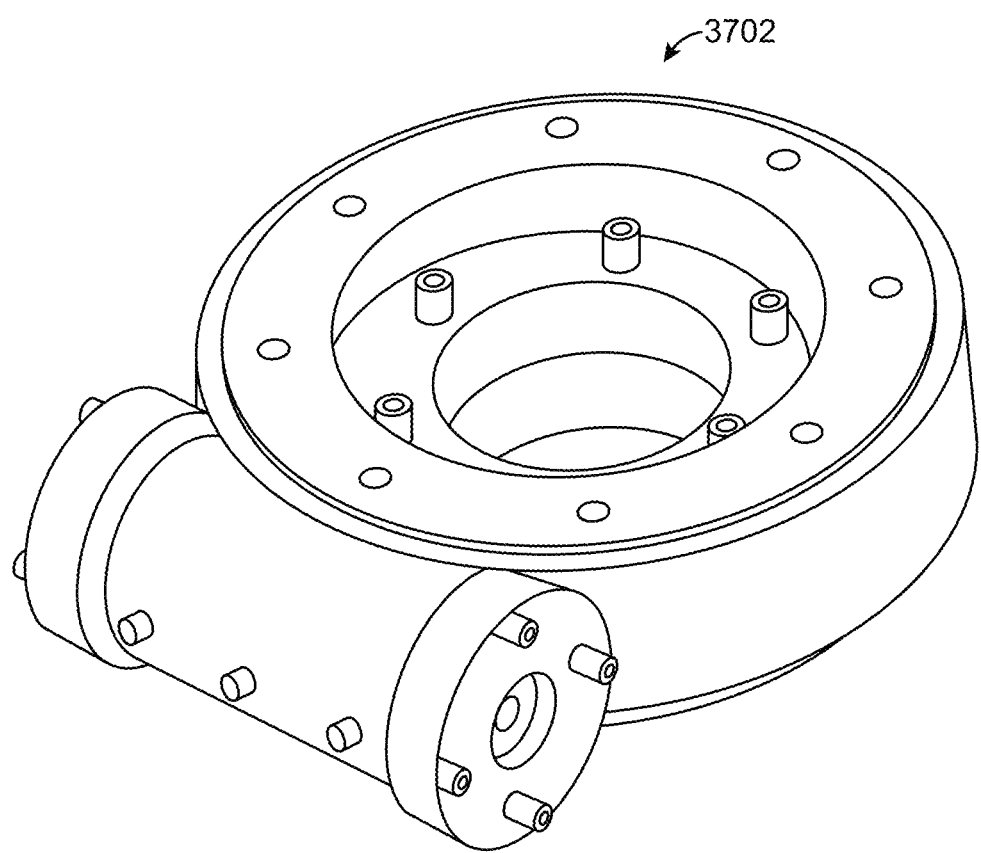
FIG. 37C shows an enlarged view of a rotational gear.

FIG. 37B shows the overhead part as taking the form of a gantry 3704 to control planar positioning. FIG. 37C shows an enlarged view of a rotational gear 3702 that may be mounted below. In some cases, other mechanisms such as a conveyor (e.g., a vertical conveyor or a horizontal conveyor) may be used to control positioning of the modules.

Figure 38A:
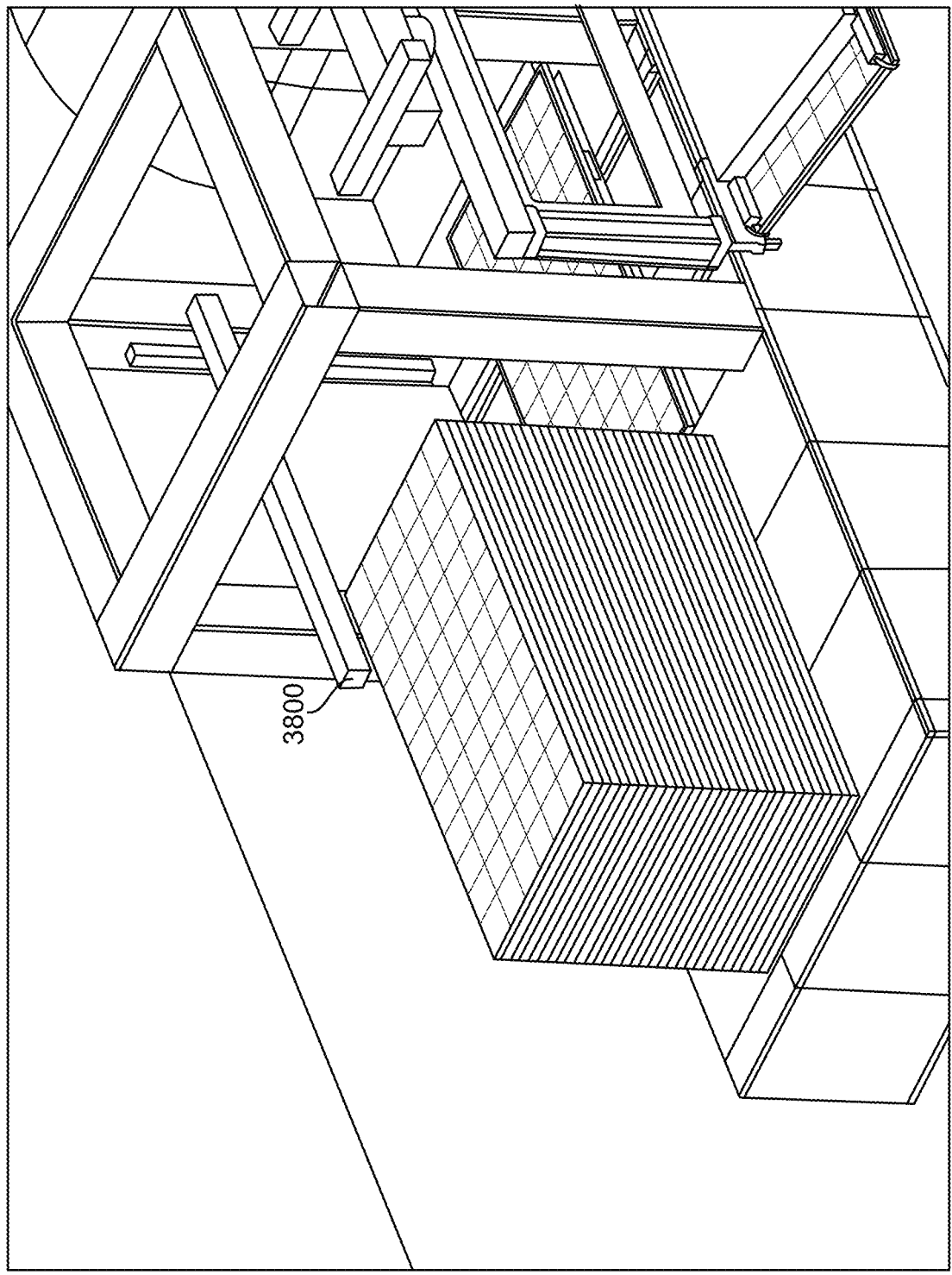
FIG. 38A shows a perspective view of another alternative embodiment.
Figure 38B:
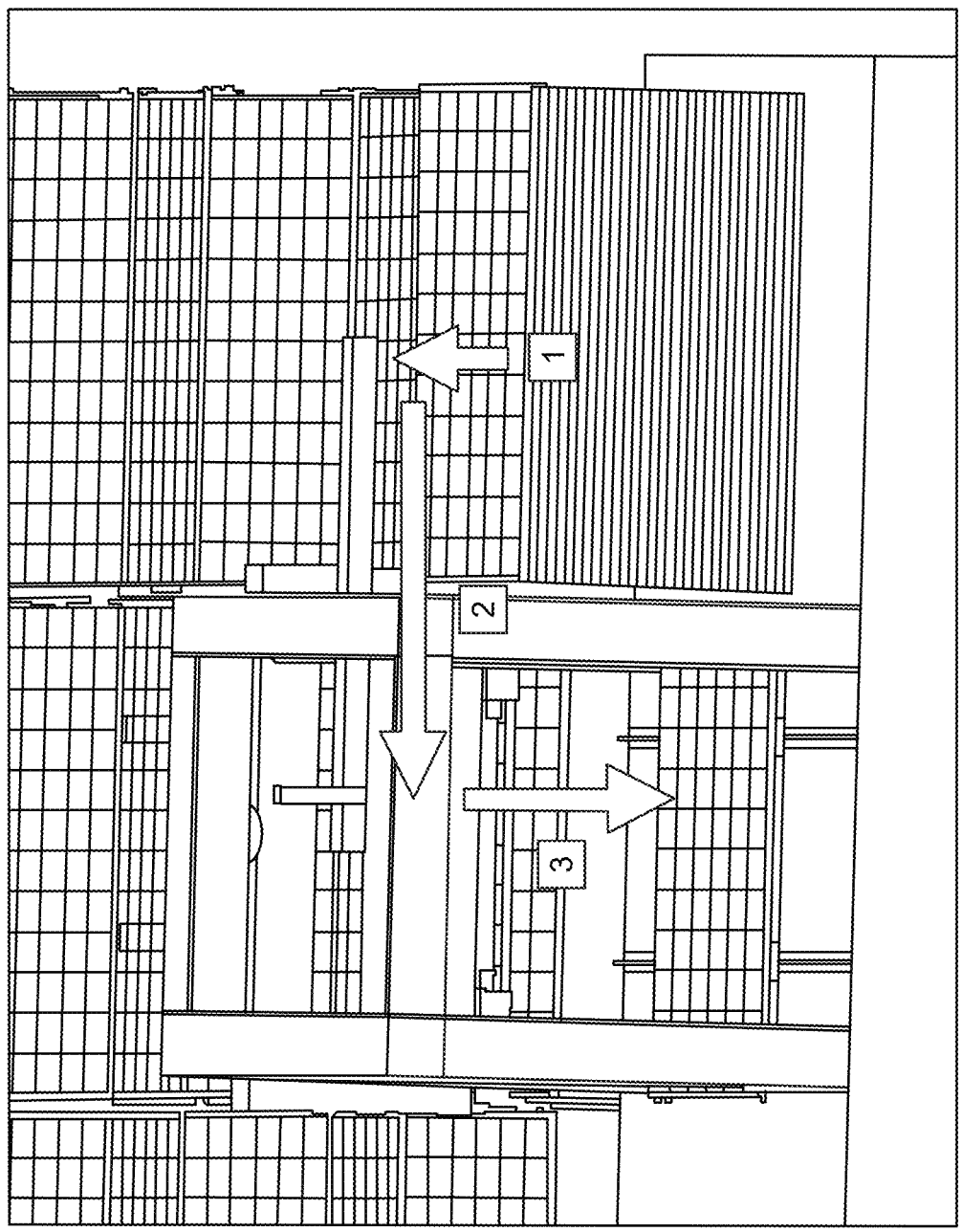
FIG. 38B shows movement in various directions of the embodiment of FIG. 38A.

FIG. 38A shows a perspective view of an embodiment where modules are lifted off of their stack on a pallet by a gantry with a suction cup load head and translated over and put down onto the module slider (shown extended in FIG. 31). This gantry can press the modules down onto the four clips during the motion #3 shown in FIG. 38B to install the clips onto the module.

Figure 39:
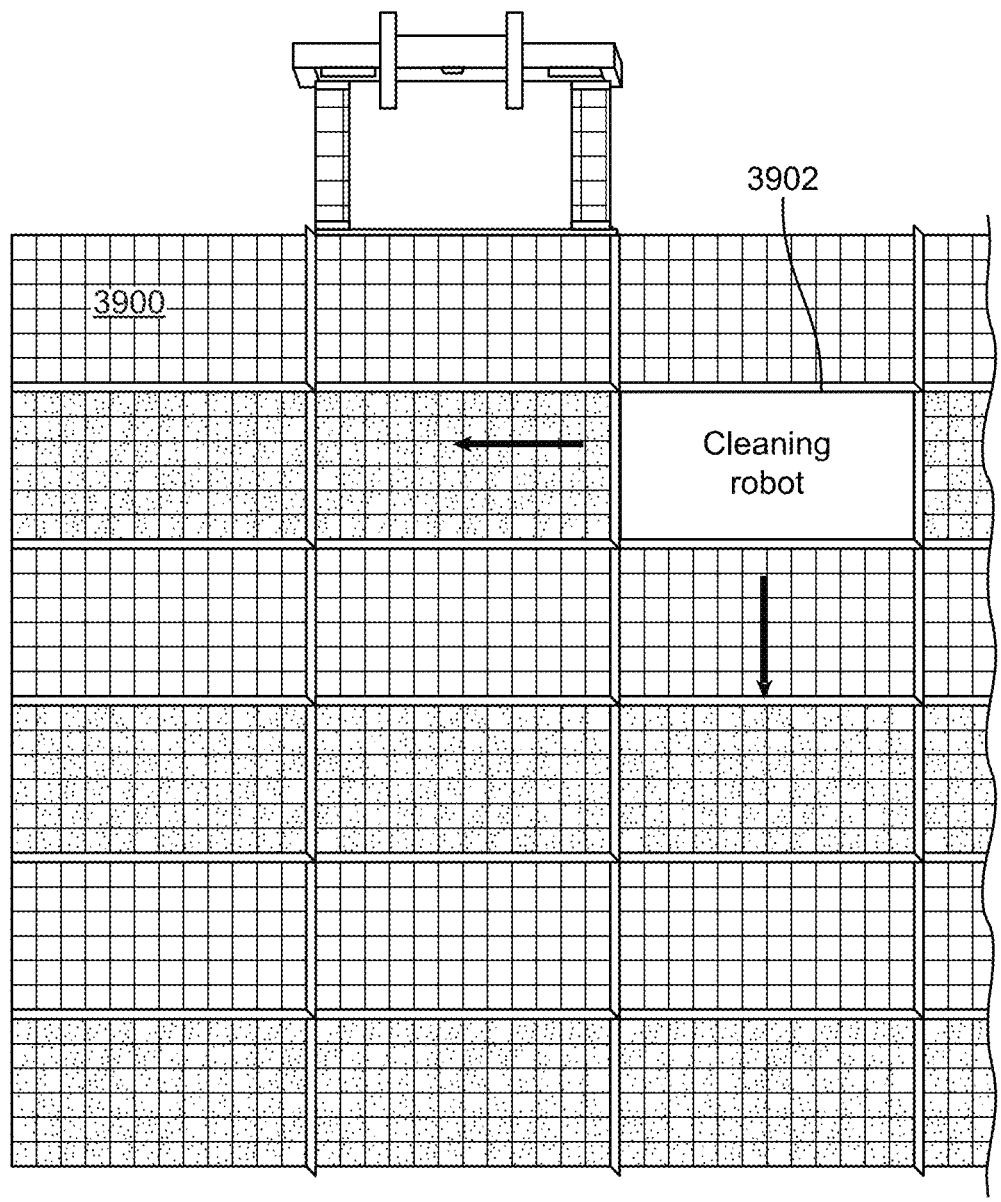
FIG. 39 shows an overhead view of an alternative embodiment featuring a cleaning robot.

FIG. 39 shows an overhead view of an embodiment comprising a dual tilt (between 0 and 20 degrees) array 3900 of ground mounted solar modules. This uninterrupted array of modules may provide a valuable opportunity to clean the array using a robot 3902. This cleaning robot can autonomously travel in any direction on the module plane.

Figure 40:
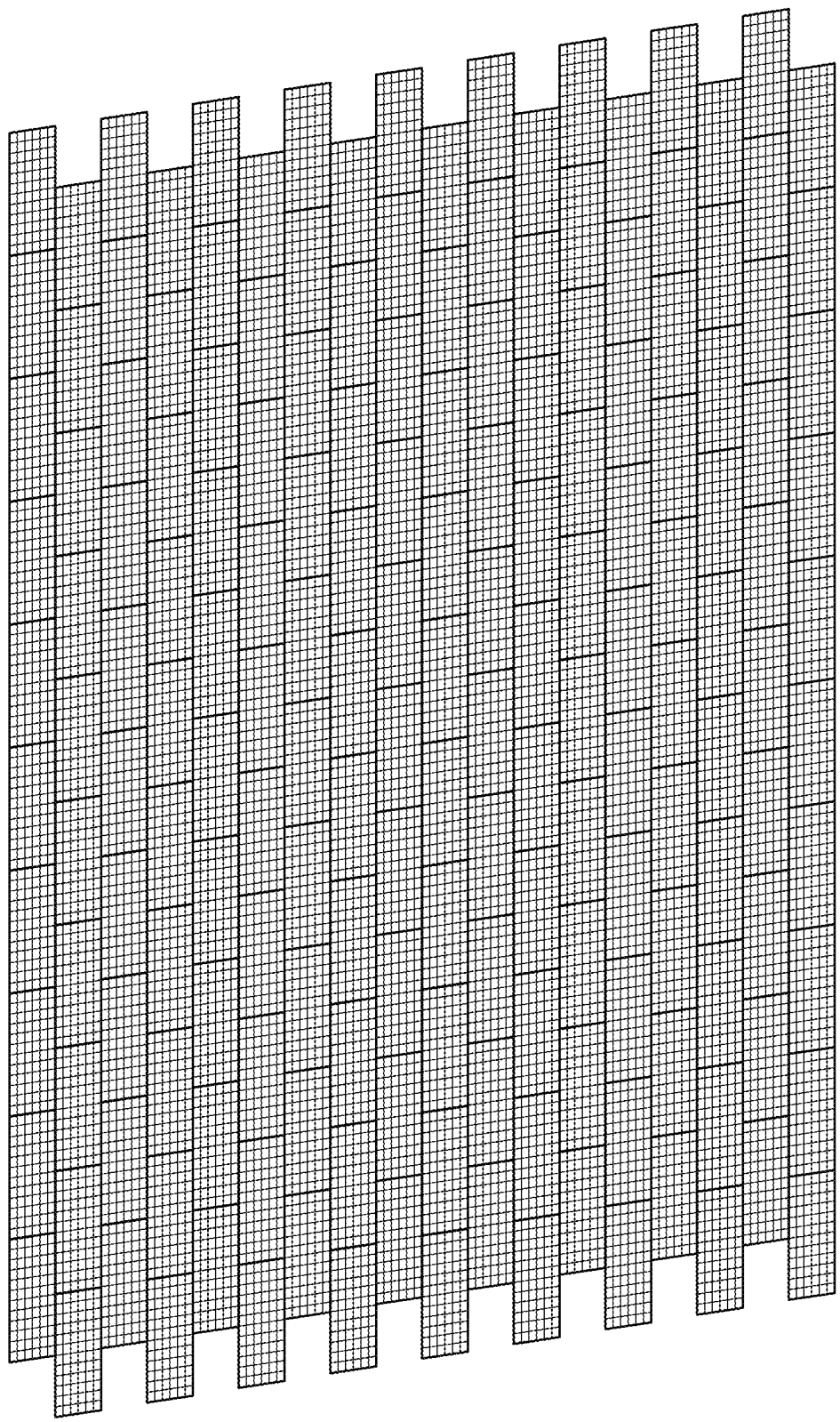
FIG. 40 shows an overhead view of an alternative embodiment featuring staggered module placement.

FIG. 40 shows an overhead view of another alternative embodiment. Here, the array of solar modules may be installed with a stagger between the rows of modules. Such an implementation may add significant stiffness in the stagger direction due to the overlapping frames. Apart from consuming 50% more posts, such an embodiment could function in a manner similar to those described previously.

Figure 41:
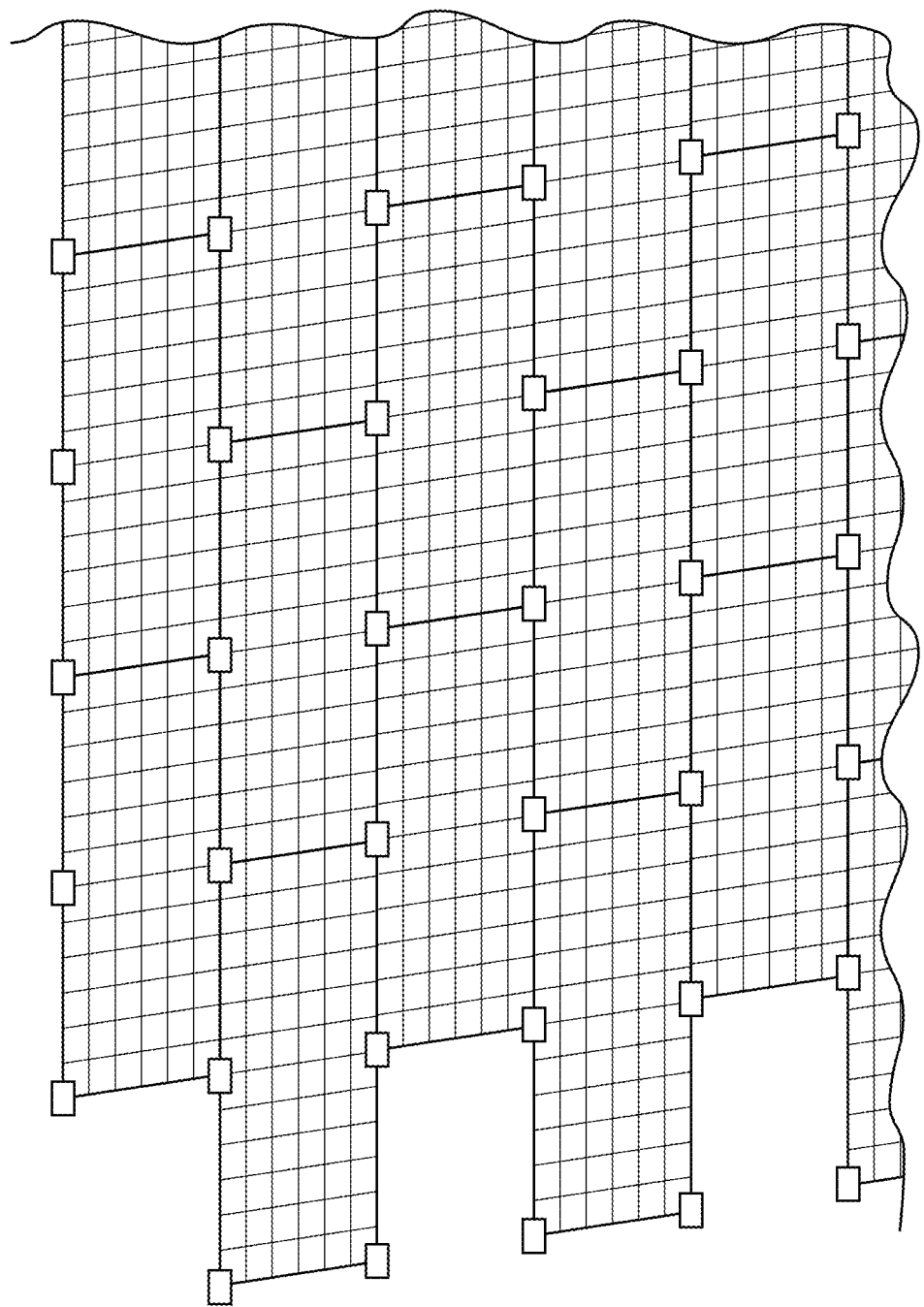
FIG. 41 shows an overhead view of an alternative embodiment featuring staggered module placement and post location.

In the configuration where the modules are staggered, there may be 6 posts per module, and the clip can be modified to clamp on the corner of two modules and the middle edge of a third module. In FIG. 41, post locations are shown as a white square at the intersection of a module edge and two corners of adjacent modules.

Figure 54A:
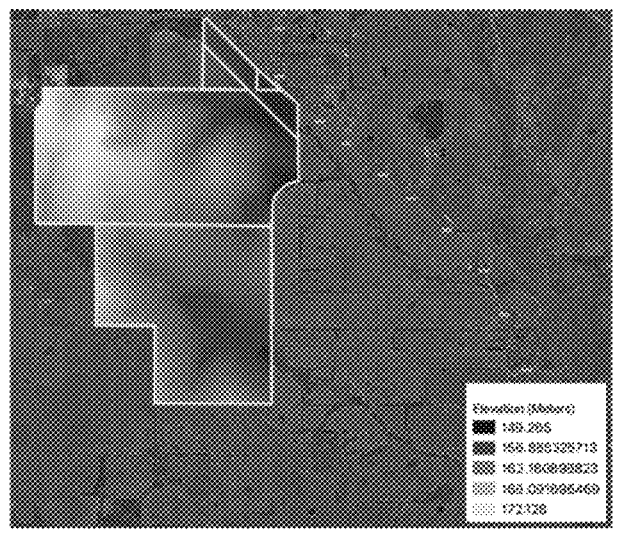
FIGS. 54A-54C illustrates a method for determining a landscape topology for positioning and assembling solar modules, in accordance with some embodiments. In some cases, the method may comprise analyzing a terrain topology and/or GIS data of a given terrain. In some cases, the method may comprise processing a curvature of the terrain topology or GIS data. In some cases, the method may comprise simulating posts and modules installed on the given terrain. In some cases, the method may comprise uploading the posts and the modules geolocation position and construction data for one or more machines for installing the posts and the modules.
Figure 54B:
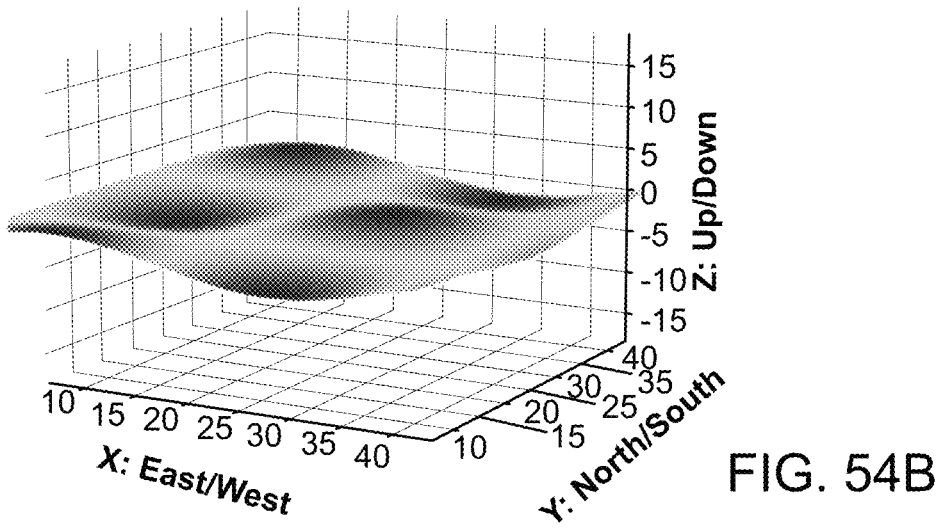
Figure 54C:
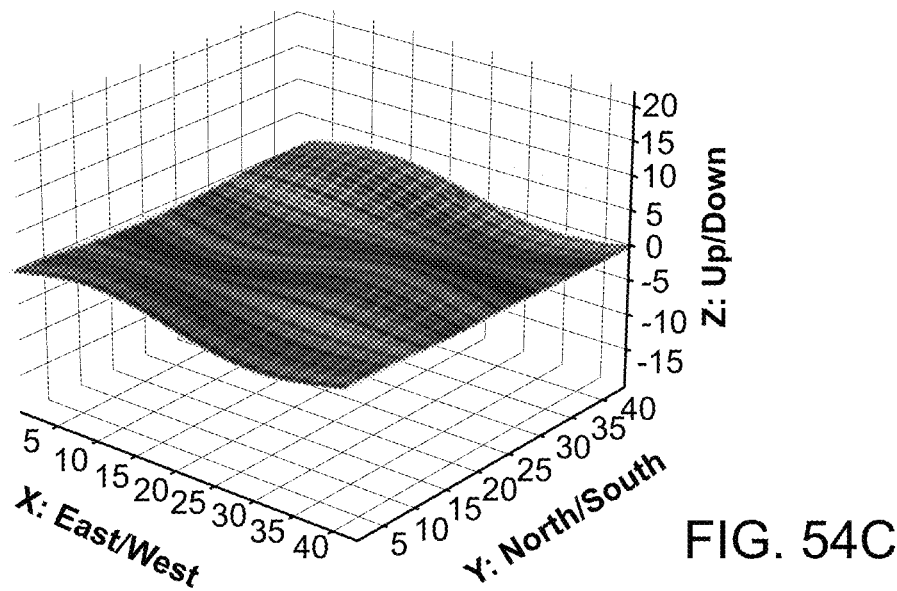
Figure 55:
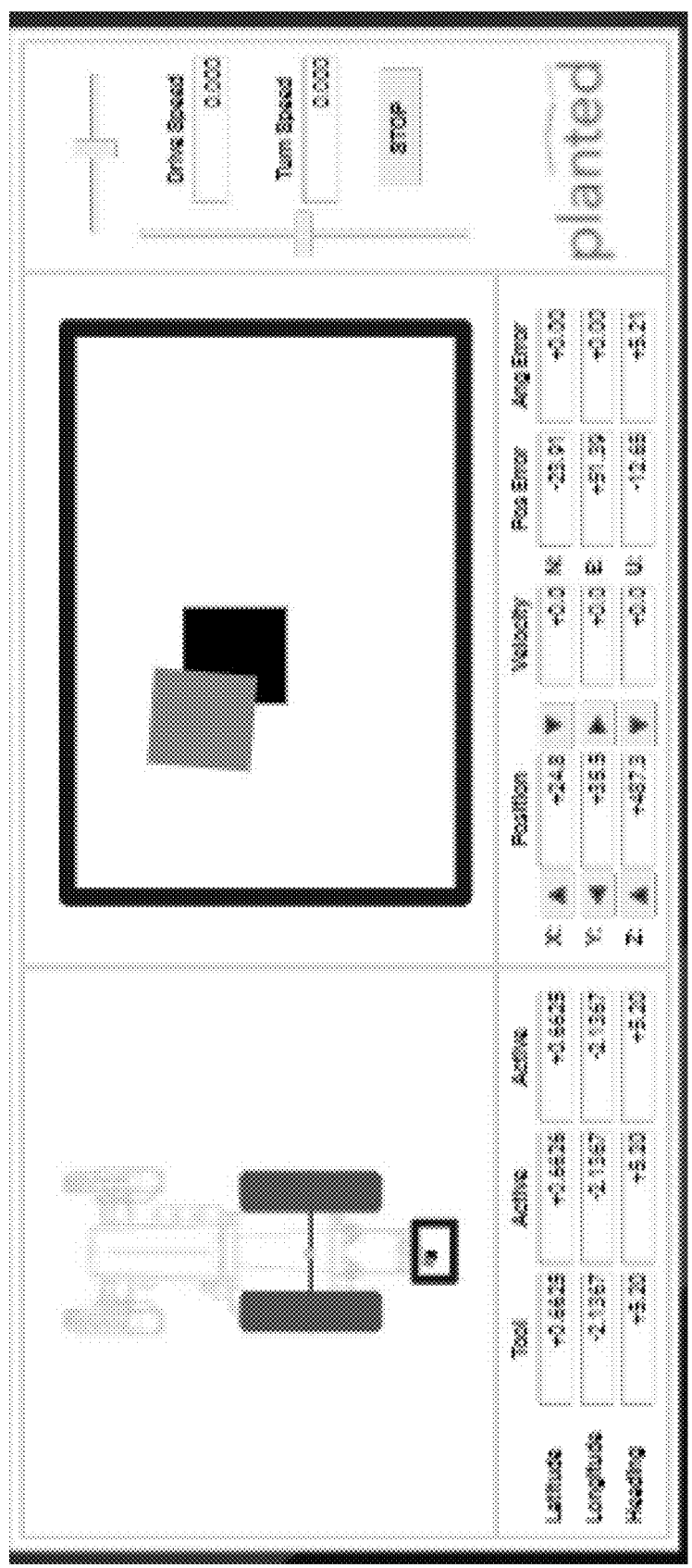
FIG. 55 illustrates a GUI for determining a landscape topology for positioning and assembling solar modules, in accordance with some embodiments.
Figure 56:
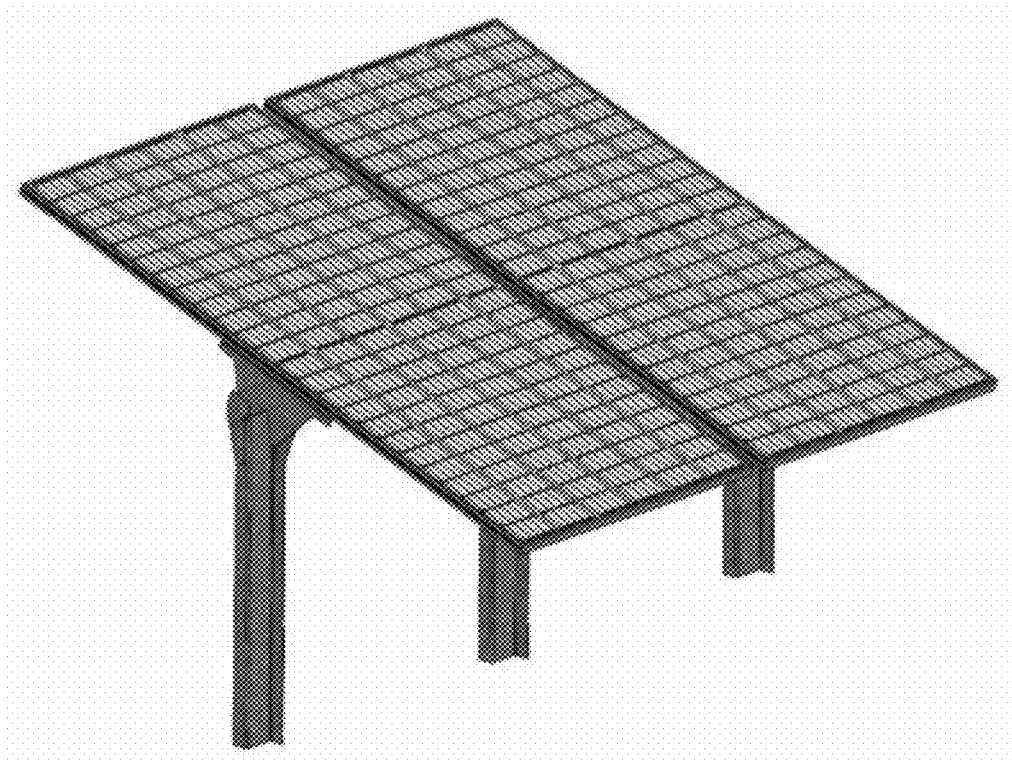
FIG. 56 illustrates a module comprising a fixed tilt array, in accordance with some embodiments. In some cases, the module may be rigidly connected to two posts. In some cases, the module may comprise a small support bracket that is mounted directly to a post without requiring a spanning intermediate structure. In some cases, a module may be driven by a 90 degree linkage where each module may be driven to a required angle, for example, without requiring an entire tracker 'table' being driven together. In some cases, a module may spans two or more posts without need for an intermediate structure between posts. In some cases, modules may be connected with a continuous wire or chain. In some cases, the continuous wire or chain may be driven by a mechanism to track the solar modules about one or more pivots on the posts. In some cases, the modules may each comprise an individual drive or drive unit such that each module may independently track the sun.

FIGS. 54A-54C illustrate a method for determining a landscape topology for positioning and assembling solar modules, in accordance with some embodiments. In some cases, the method may comprise analyzing a terrain topology and/or GIS data of a given terrain. In some cases, the method may comprise processing a curvature of the terrain topology or GIS data. In some cases, the method may comprise simulating posts and modules installed on the given terrain. In some cases, the method may comprise uploading the posts and the modules geolocation position and construction data for one or more machines for installing the posts and the modules. FIG. 55 illustrates an exemplary GUI for determining a landscape topology for positioning and assembling solar modules, in accordance with some embodiments.

In some cases, one or more algorithms, machine learning algorithms, or neural networks may be configured to process data of a terrain and determine an optimal layout, positioning, or installation location for one or more posts or solar modules. In some cases, the one or more algorithms, machine learning algorithms, or neural networks may be implemented to generate a virtual representation or simulation of a terrain and one or more candidate locations for installing posts or solar modules. In some cases, the one or more algorithms, machine learning algorithms, or neural networks may be configured to generate a blueprint or a set of instructions for controlling and moving a plurality of robots or mobile platforms to collectively deploy and install one or more posts or solar modules in a target environment. Such blueprint or set of instructions may be generated based on the virtual representation or simulation, or other data associated with the terrain or the landscape topology of the target environment. The virtual representation or simulation may comprise, for example, a 3D model or a point cloud representation of the terrain and the one or more candidate installation or deployment locations.

In some embodiments, when the robots or mobile platforms of the present disclosure run out of posts or solar modules for installation (or if the number of posts or solar modules immediately accessible to the robots or mobile platforms drops below a certain threshold), the robots or mobile platforms may undergo a restocking or replenishment operation. In some cases, the robots or mobile platforms may return to a facility or other central location for restocking or replenishing of posts and/or solar modules. In other cases, one or more other restocking vehicles or robots may carry or store an inventory of additional posts and/or solar modules, and can automatically travel to a robot or mobile platform that needs additional posts or solar modules. In some cases, the one or more other restocking vehicles or robots may travel or idle along a perimeter of the terrain, and travel to a particular robot or mobile platform when the robot or mobile platform requires additional posts or solar modules. This can avoid the need for the robot or mobile platforms to make an additional trip for restocking or replenishment purposes.

Figure 62:
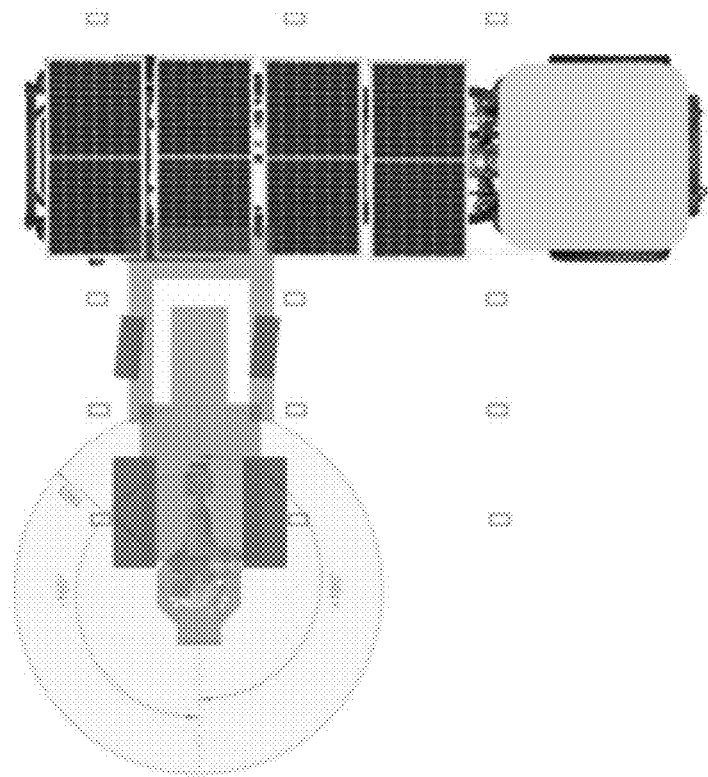
FIG. 62 illustrates an alternative embodiment of an exemplary vehicle that can be used or configured to handle, transport, install, or deploy one or more solar modules.

FIG. 62 illustrates an alternative embodiment of an exemplary vehicle that can be used or configured to handle, transport, install, or deploy one or more solar modules. The vehicle may acquire new stacks of modules autonomously, semi-autonomously, or with aid of human input or intervention. The vehicle may not or need not use or rely on a separate robot to acquire new stacks of modules. In some cases, the vehicle may comprise one or more front attachments that can be used to retrieve or obtain new solar modules from a stocking area or another vehicle.

Figure 63:
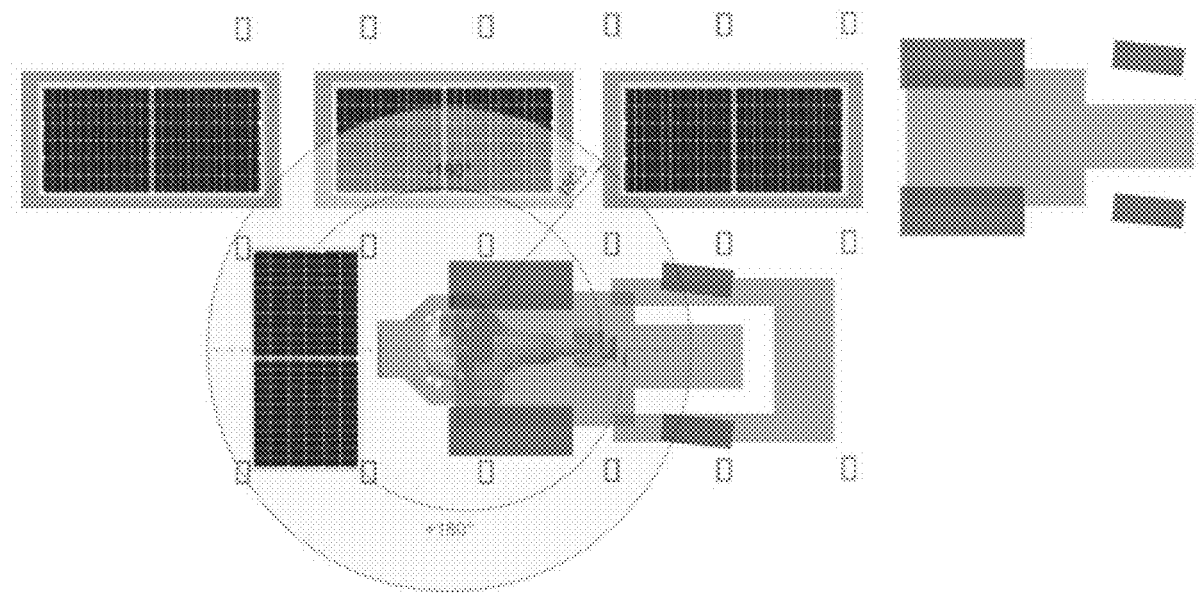
FIG. 63 illustrates another alternative embodiment of an exemplary vehicle that can be used or configured to handle, transport, install, or deploy one or more solar modules.

FIG. 63 illustrates another alternative embodiment of an exemplary vehicle that can be used or configured to handle, transport, install, or deploy one or more solar modules. In some embodiments, the vehicle may be configured to use a robot to move new solar modules off of a trailer of another vehicle.

Figure 64:
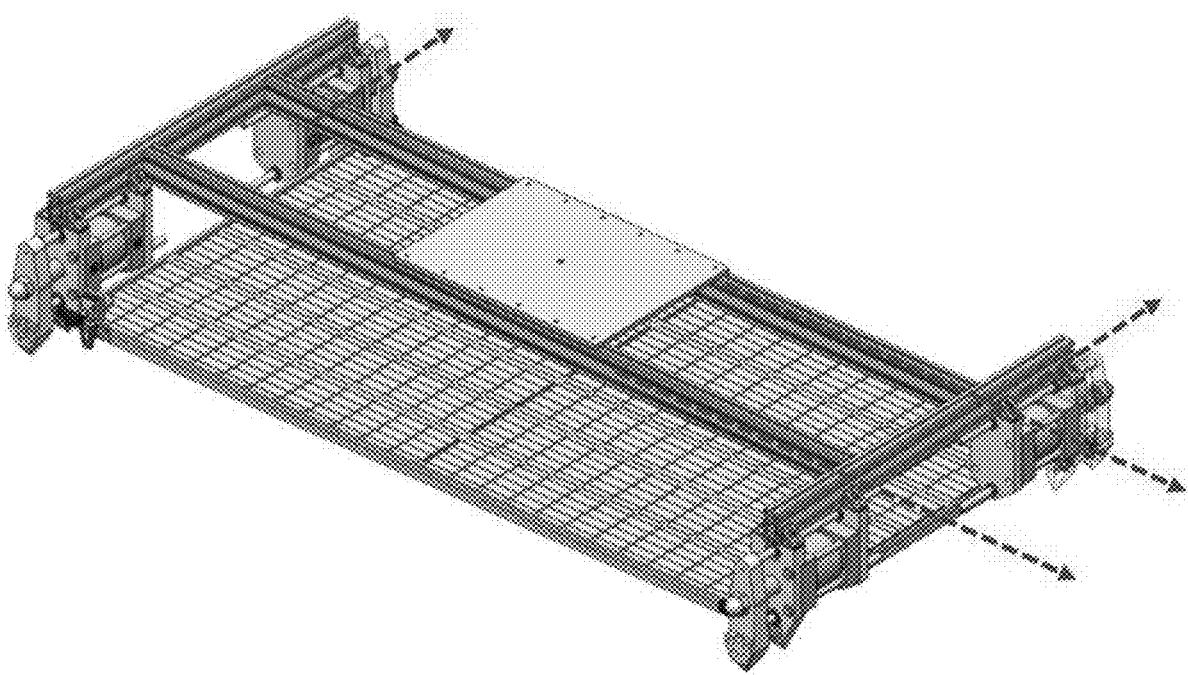
FIG. 64 illustrates an end-effector with clinch tools positioned at the corners of the end-effector, in accordance with some embodiments.
Figure 65:
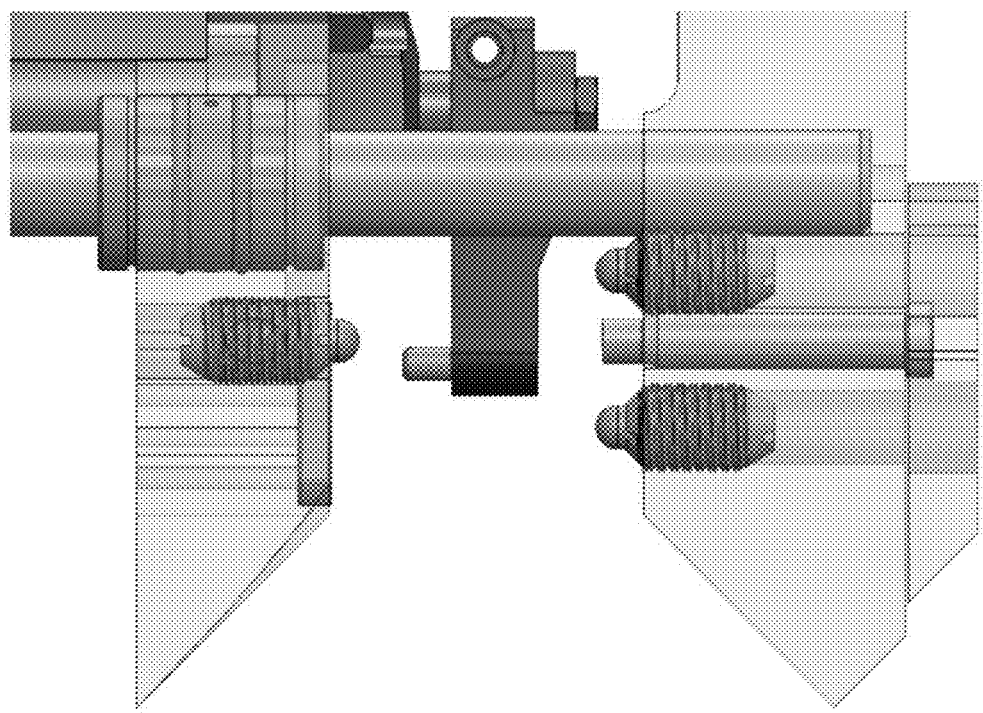
FIG. 65 illustrates a bottom portion of the clinch tools which can be tapered to help the clinch tools locate or engage with a module.

FIG. 64 illustrates an end-effector with clinch tools positioned at the corners of the end-effector. The end-effector in this case may not or need not use suction cups to pick up a solar module, and can instead grab the modules from the side by a squeezing or pinching action. The size of the frame of the end-effector may be adjustable such that the same end-effector can be configured to pick up modules of different shapes or sizes. As shown in FIG. 65, the bottom portion of the clinch tools can be tapered to help the clinch tools locate or engage with the module (e.g., a complementary feature disposed on the module).

Figure 66A:
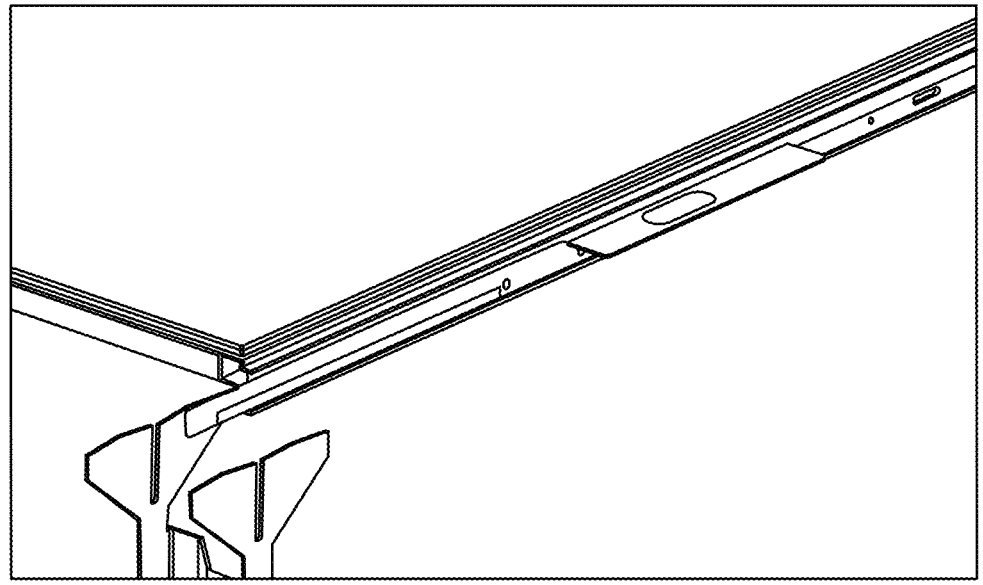
FIGS. 66A and 66B illustrate an alternate embodiment of a clip, in accordance with some embodiments.
Figure 66B:
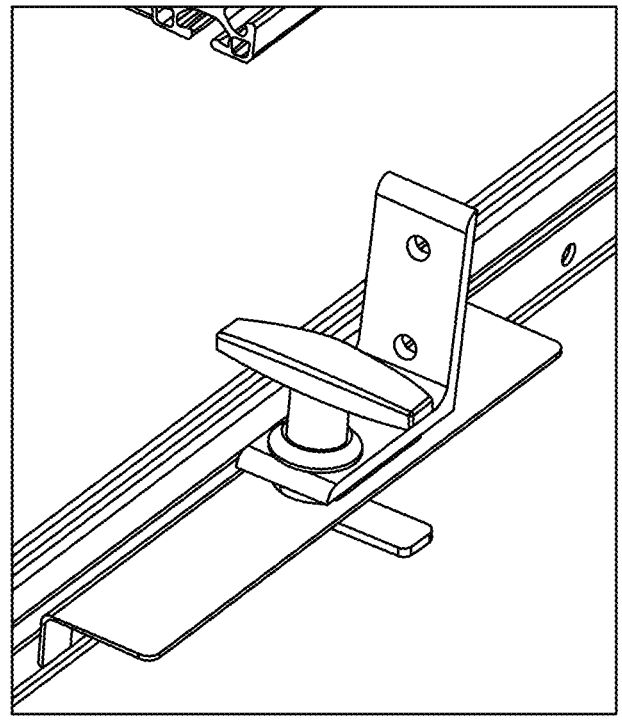

FIGS. 66A and 66B illustrate an alternate embodiment of a clip. The clip may comprise a hole or a slot that can interface with a latch that turns 90 degrees automatically which then engages the module and clip assembly with the load head on the module installer thus holding it in place. This is another embodiment of a way to pick up a solar module without using a suction cup.

Figure 67:
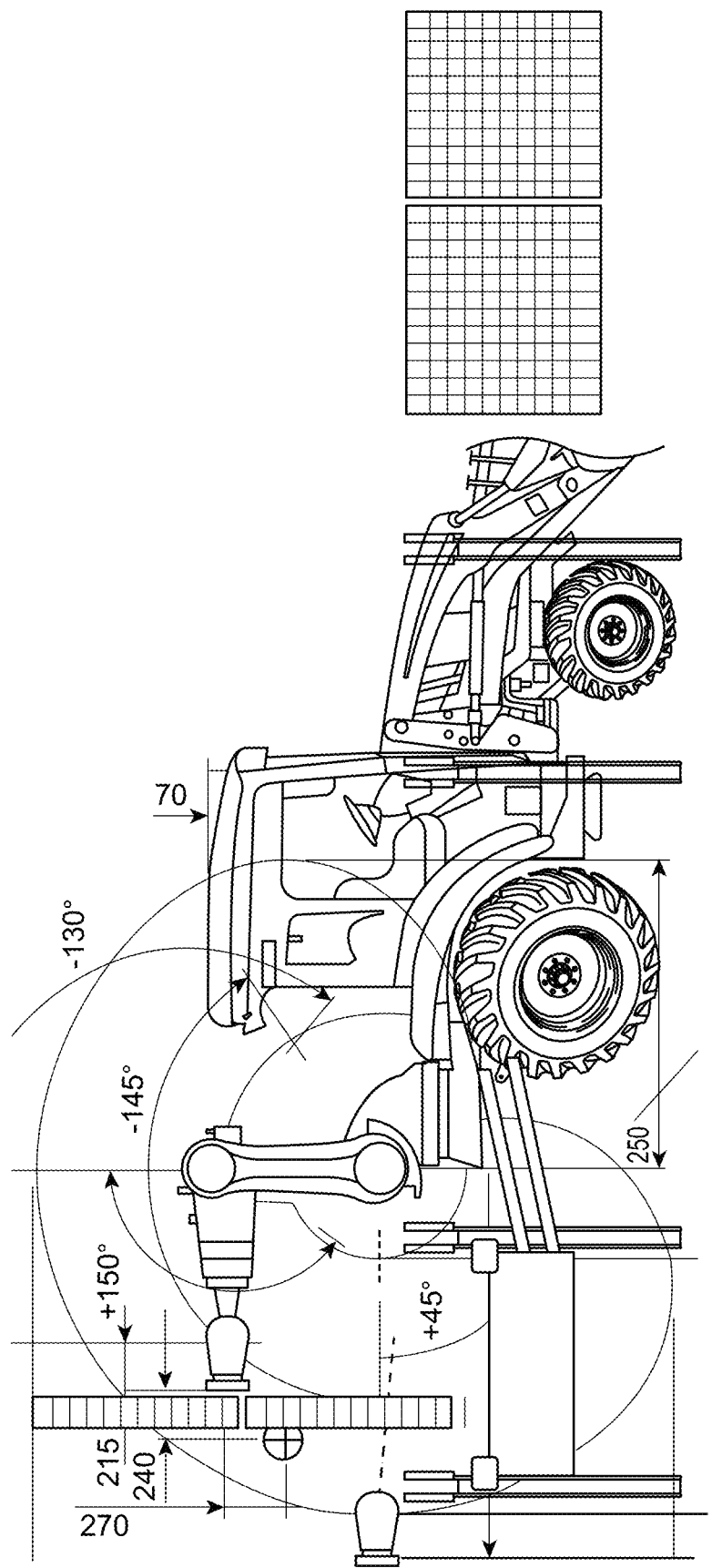
FIG. 67 illustrates an alternative embodiment of a module installer vehicle, in accordance with some embodiments.

FIG. 67 illustrates an alternative embodiment of a module installer vehicle as described elsewhere herein. Here, the clinch tools (yellow) may not or need not be located on the same piece of automation that is moving the module (orange) but can instead be located on a separate piece of automation (blue) which is attached to the same mobile vehicle platform as the automation that moves the modules. The separate piece of automation (blue) may autonomously and releasably mate to previously installed posts. The module-moving automation (orange) can then move a module to the location where the posts are installed.

Figure 68:
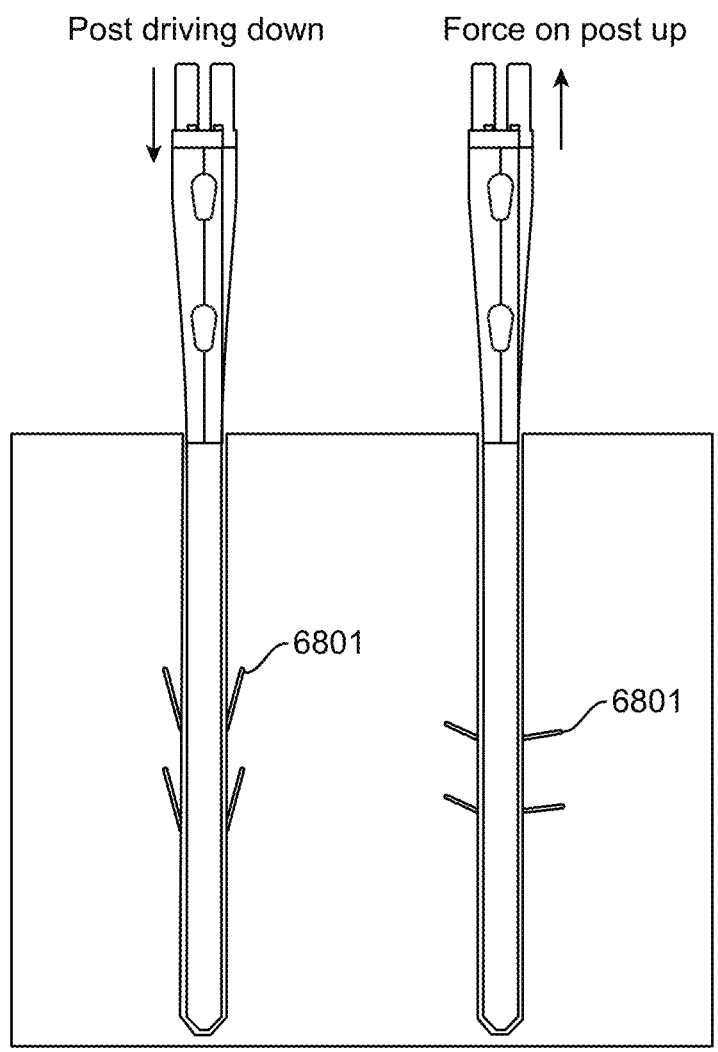
FIG. 68 illustrates an exemplary configuration for a post, in accordance with some embodiments.

FIG. 68 illustrates an exemplary configuration for a post as described elsewhere herein. This embodiment shows cutout flanges (6801) that are bent out in a flared way such that they allow the post to enter the soil with low resistance (left), but then when the post is pulled up, they are engaged with the soil and bend out more, providing increased uplift resistance (right).

Figure 69A:
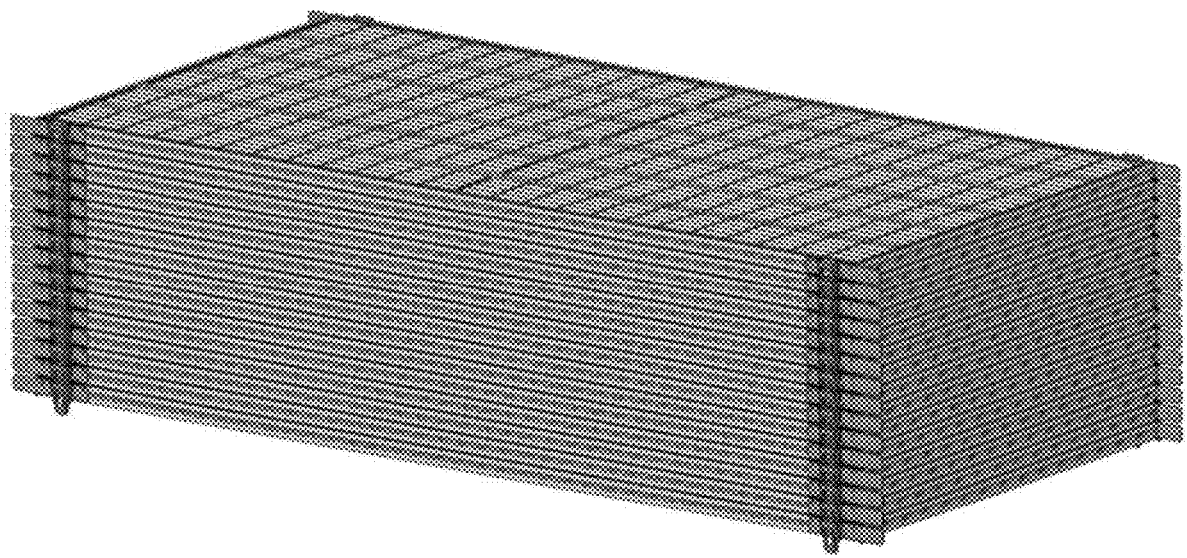
FIGS. 69A and 69B illustrate an alternative embodiment of the clips described herein, in accordance with some embodiments.
Figure 69B:
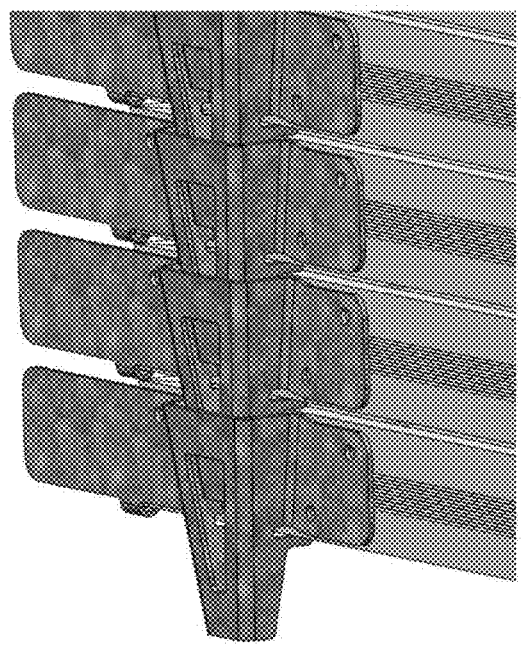

FIGS. 69A and 69B illustrate an alternative embodiment of the clips described elsewhere herein. In this embodiment, the clips may have bends and tabs such that they nest and stack so that the solar modules do not contact the other modules above or below them in the stack.

Figure 70A:
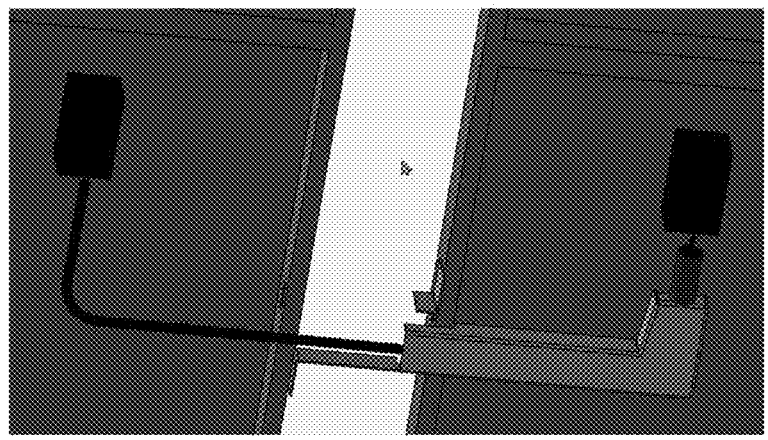
FIG. 70A illustrates an additional sheet metal feature that can be used to retain one or more lead wires or wire leads of a solar module and hold them fixed in a specific side of the module, for later handling or processing.
Figure 70B:
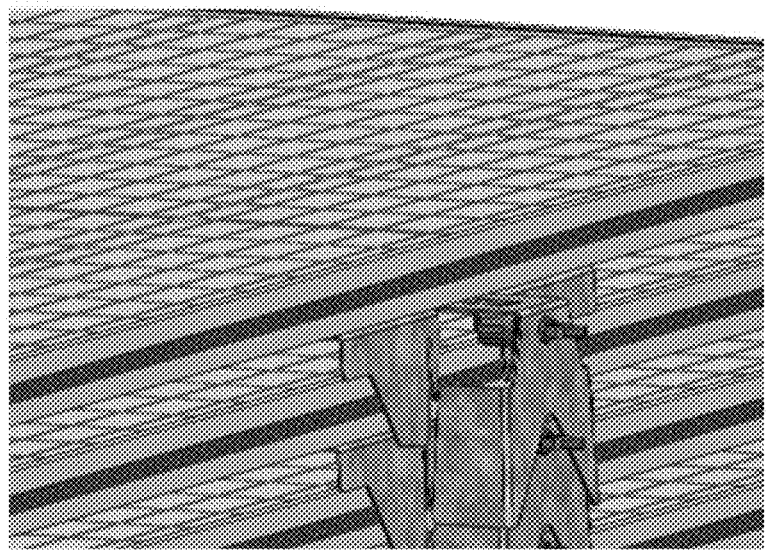
FIG. 70B illustrates an embodiment of a clip where the module wire lead is connected to the clip that is also connected to the module and that will be connected to the post.
Figure 70C:
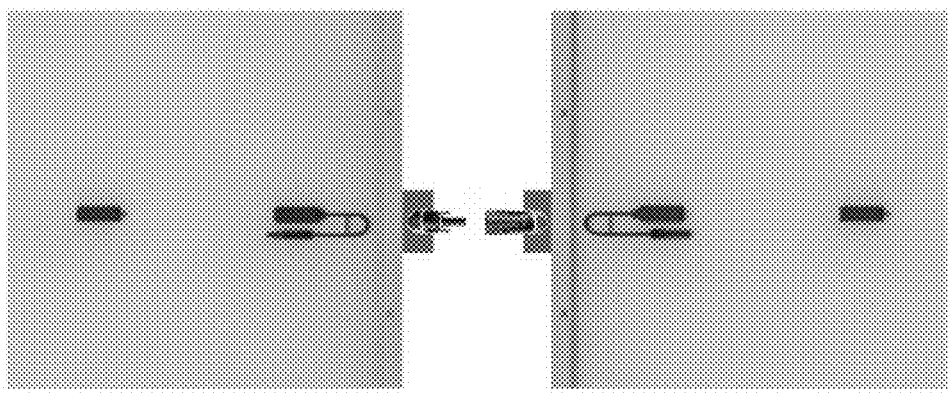
FIG. 70C illustrates using an additional tool to autonomously take the solar module wire leads that are held in place by the clip and connect them to each other to form an electrical connection between the modules.
Figure 71:
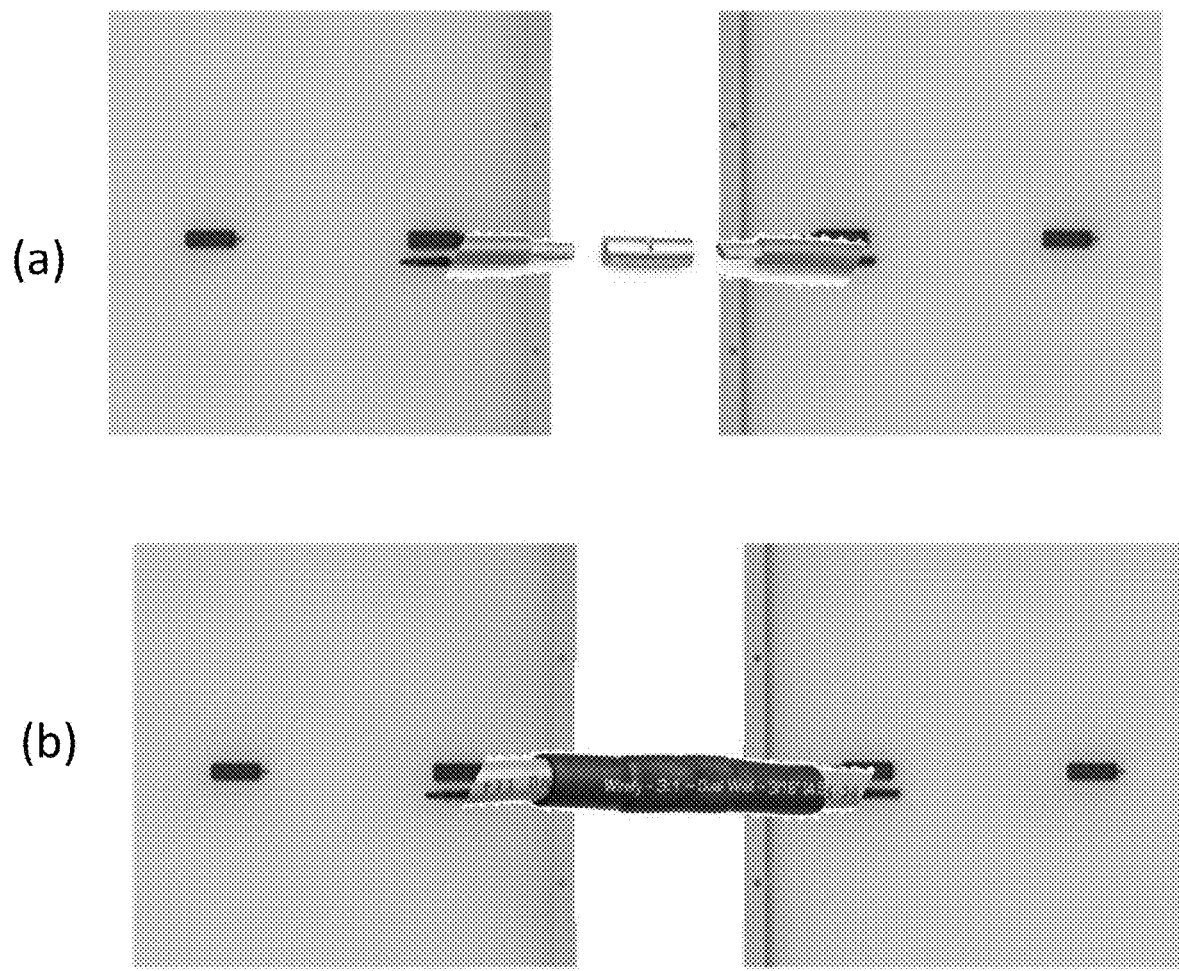
FIG. 71 illustrates an alternative embodiment of the tool and method in FIGS. 70A, 70B, and 70C, whereby the tool does not push two connectors together, and instead cuts, strips, and splices the wires together in place without the use of a connector.

FIG. 70A illustrates an additional sheet metal feature that can be used to retain one or more lead wires or wire leads of a solar module and hold them fixed in a specific side of the module, for later handling or processing. FIG. 70B illustrates an embodiment of a clip where the module wire lead is connected to the clip that is also connected to the module and that will be connected to the post. FIG. 70C illustrates using an additional tool (blue squares) to autonomously take the solar module wire leads that are held in place by the clip and connect them to each other to form an electrical connection between the modules. FIG. 71 illustrates an embodiment of the tool and method in FIGS. 70A, 70B, and 70C, except in this embodiment, the tool does not push two connectors together, and instead it cuts (a), strips (a), and splices (b) the wires together in place without the use of a connector.

Figure 75:
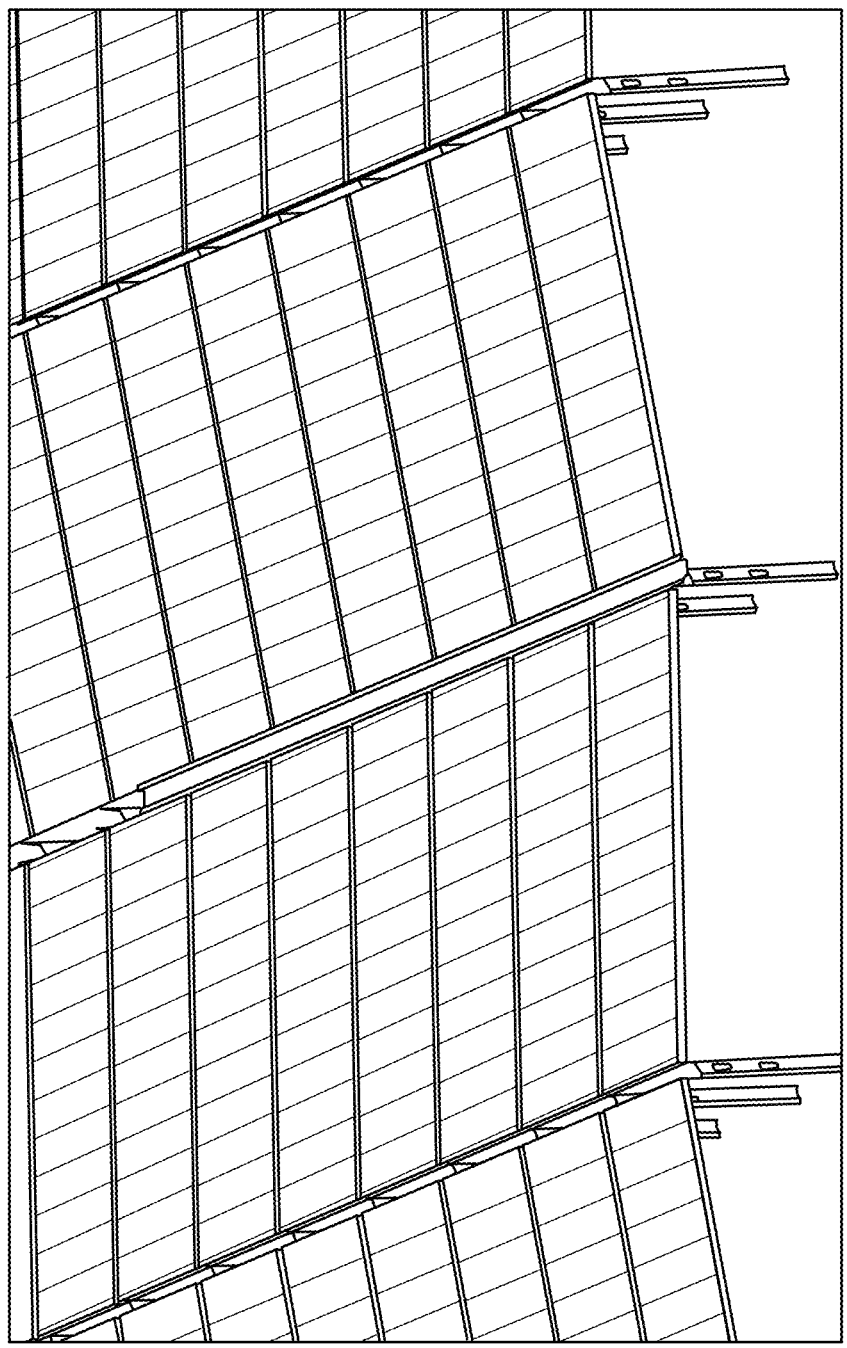
FIG. 75 illustrates a removable access trough that can be placed on top of posts in the valley or peaks of a solar module array.

FIG. 75 illustrates a removable access trough that can be placed on top of posts in the valley or peaks of the module array. This trough can transfer its weight and load to the posts below it and not to the modules, and can be walked on top of in order to access modules in the interior regions of the array. In some cases, this trough can also be a rail that a robot can ride on (e.g., to clean, water, spray, or inspect).

Figure 76:
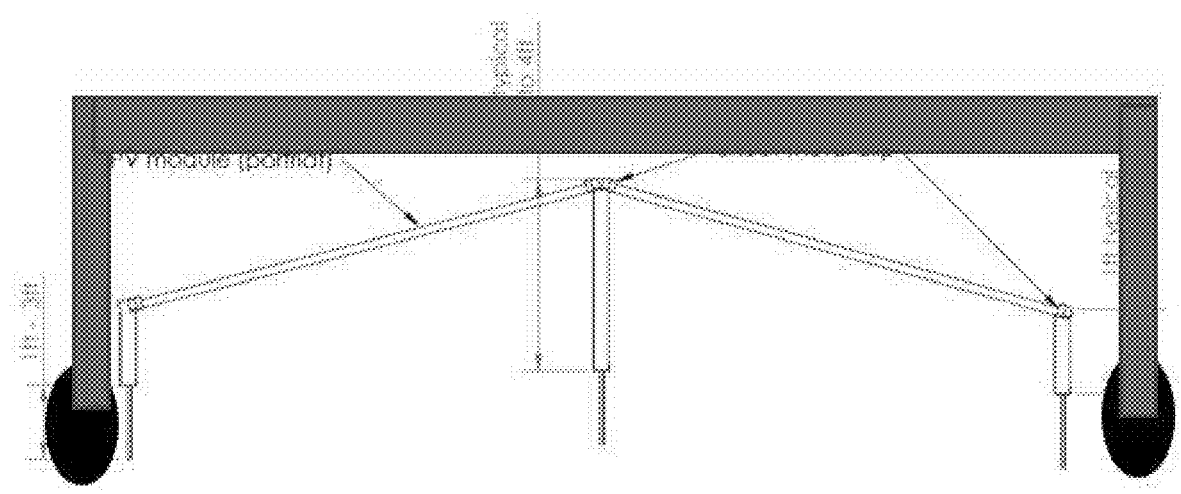

FIG. 76 and FIG. 77 illustrate a gantry (blue) on wheels (black) that can drive on the ground in the gaps between the array in certain configurations. This gantry can be outfitted with automation to clean the modules with water, or to mechanically wipe the solar modules in the array beneath the gantry. This gantry can also spray water or herbicide, or hydroseed, to manage vegetation underneath the array. The gantry can have a cord, a tube, or other hollow structure attached thereto to connect it to a source of water or other liquids at the end of a row of modules.

Computer Systems

In an aspect, the present disclosure provides computer systems that are programmed or otherwise configured to implement methods of the disclosure, e.g., any of the subject methods for using at least one robot to fully autonomously position and assemble at least one solar module and its supporting structure.

In another aspect, the present disclosure provides computer systems that are programmed or otherwise configured to provide one or more mobile platforms that are configured to carry a plurality of posts and a plurality of solar modules. In some cases, the one or more mobile platforms are equipped with one or more sensors comprising a geolocation sensor. In some cases, the computer systems are further programmed or otherwise configured to use at least in part the readings or measurements obtained using one or more sensors to (i) autonomously move the one or more mobile platforms and (ii) autonomously position and assemble the plurality of posts and the plurality of solar modules over a terrain to construct an array of solar modules. Such autonomous movement or positioning may be performed using one or more signals or commands generated by a computing unit of the computer system.

In another aspect, the present disclosure provides computer systems that are programmed or otherwise configured to provide a plurality of posts and a plurality of solar modules. In some cases, the plurality of solar modules comprises a plurality of clips pre-attached thereon. In some cases, the computer systems are further programmed or otherwise configured to form a plurality of post-clip interfaces between a plurality of clips and the plurality of posts to construct an array of solar modules over a terrain without requiring one or more premade holes/features for one or more fasteners.

In another aspect, the present disclosure provides computer systems that are programmed or otherwise configured to use an algorithm to identify a location suitable for autonomous positioning and assembly of at least one solar module. In some cases, using the algorithm may be performed without requiring aid or involvement from a user in the autonomous positioning and assembly of the at least one solar module.

Figure 61:
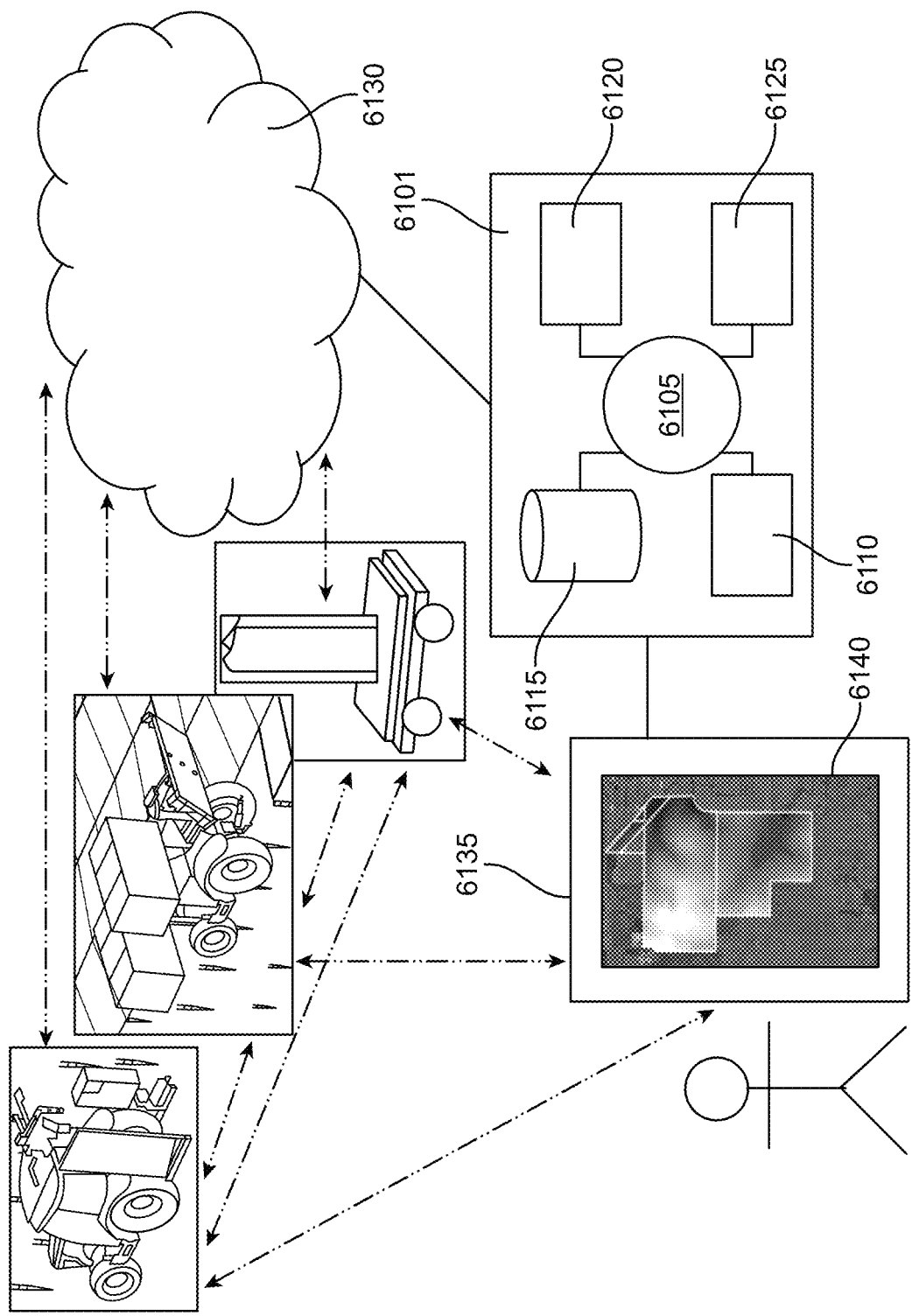
FIG. 61 shows a computer system, in accordance with some embodiments.

FIG. 61 shows a computer system 6101 that is programmed or otherwise configured to implement a method for fully autonomously positioning and assembling at least one solar module and its supporting structure. In some embodiments, the computer system 6101 may be configured to, for example, use an algorithm to identify a location suitable for autonomous positioning and assembly of at least one solar module, without requiring aid or involvement from a user in the autonomous positioning and assembly of the at least one solar module. The computer system 6101 can be an electronic device of a user or a computer system that is remotely located with respect to the electronic device. The electronic device can be a mobile electronic device.

The computer system 6101 may include a central processing unit (CPU, also "processor" and "computer processor" herein) 6105, which can be a single core or multi core processor, or a plurality of processors for parallel processing. The computer system 6101 also includes memory or memory location 6110 (e.g., random-access memory, read-only memory, flash memory), electronic storage unit 6115 (e.g., hard disk), communication interface 6120 (e.g., network adapter) for communicating with one or more other systems, and peripheral devices 6125, such as cache, other memory, data storage and/or electronic display adapters. The memory 6110, storage unit 6115, interface 6120 and peripheral devices 6125 are in communication with the CPU 6105 through a communication bus (solid lines), such as a motherboard. The storage unit 6115 can be a data storage unit (or data repository) for storing data. The computer system 6101 can be operatively coupled to a computer network ("network") 6130 with the aid of the communication interface 6120. The network 6130 can be the Internet, an internet and/or extranet, or an intranet and/or extranet that is in communication with the Internet. The network 6130 in some cases is a telecommunication and/or data network. The network 6130 can include one or more computer servers, which can enable distributed computing, such as cloud computing. The network 6130, in some cases with the aid of the computer system 6101, can implement a peer-to-peer network, which may enable devices coupled to the computer system 6101 to behave as a client or a server.

The CPU 6105 can execute a sequence of machine-readable instructions, which can be embodied in a program or software. The instructions may be stored in a memory location, such as the memory 6110. The instructions can be directed to the CPU 6105, which can subsequently program or otherwise configure the CPU 6105 to implement methods of the present disclosure. Examples of operations performed by the CPU 6105 can include fetch, decode, execute, and writeback.

The CPU 6105 can be part of a circuit, such as an integrated circuit. One or more other components of the system 6101 can be included in the circuit. In some cases, the circuit is an application specific integrated circuit (ASIC).

The storage unit 6115 can store files, such as drivers, libraries and saved programs. The storage unit 6115 can store user data, e.g., user preferences and user programs. The computer system 6101 in some cases can include one or more additional data storage units that are located external to the computer system 6101 (e.g., on a remote server that is in communication with the computer system 6101 through an intranet or the Internet).

The computer system 6101 can communicate with one or more remote computer systems through the network 6130. For instance, the computer system 6101 can communicate with a remote computer system of a user (e.g., an end user or entity overseeing, supervising, monitoring, or managing an operation of the robots). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 6101 via the network 6130.

Methods as described herein can be implemented by way of machine (e.g., computer processor) executable code stored on an electronic storage location of the computer system 6101, such as, for example, on the memory 6110 or electronic storage unit 6115. The machine executable or machine readable code can be provided in the form of software. During use, the code can be executed by the processor 6105. In some cases, the code can be retrieved from the storage unit 6115 and stored on the memory 6110 for ready access by the processor 6105. In some situations, the electronic storage unit 6115 can be precluded, and machine-executable instructions are stored on memory 6110.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 6101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 6101 can include or be in communication with an electronic display 6135 that comprises a user interface (UI) 6140 for providing, for example, a portal for monitoring the installation of posts or solar modules. In some cases, the UI may permit inputs such as commands to "begin installation" or "halt all robots." In some cases, the UI may provide a visualization or a blueprint for installing multiple solar modules of a solar module array. In some cases, the UI may provide a visualization tracking one or more robots in real-time. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 6105. For example, the algorithm may be configured to determine one or more locations for installing one or more solar modules. In some cases, the algorithm may be configured to coordinate one or more robots during installation of one or more solar modules. In some cases, the algorithm may be configured to process force-testing data of one or more solar modules to determine if the one or more solar modules are installed securely. In some cases, the algorithm may be configured to provide instructions to the one or more robots to adjust the one or more solar modules or supporting structures thereof based at least in part on the force-testing data.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for constructing an array of solar modules, comprising:
   (a) providing one or more mobile platforms that carry a plurality of posts and a plurality of solar modules, wherein the one or more mobile platforms are equipped with one or more sensors comprising a geolocation sensor; and
   (b) using at least the one or more sensors to (i) autonomously move the one or more mobile platforms, (ii) autonomously position and assemble at least one post of the plurality of posts and at least one solar module of the plurality of solar modules over a terrain, thereby constructing the array of solar modules, and (iii) locate and move an installer load head on the one or more mobile platforms as the array of solar modulus is being constructed.

2. The method of claim 1, wherein the array of solar modules is constructed on a substantially non-flat terrain.

3. The method of claim 1, wherein the array of solar modules is constructed on a substantially flat terrain.

4. The method of claim 1, wherein the array of solar modules comprises a complete wired array or a dual-tilt array.

5. The method of claim 1, further comprising: using an algorithm to identify a location suitable for autonomous positioning and assembly of the at least one solar module of the plurality of solar modules; and creating a set of executable software instructions for controlling the one or more mobile platforms to autonomously position and assemble the at least one post of the plurality of posts and the at least one solar module of the plurality of solar modules over the terrain to construct the array of solar modules without requiring aid or involvement from a user.

6. The method of claim 1, wherein the one or more sensors further comprise an image sensor.

7. The method of claim 1, wherein the one or more mobile platforms comprise (i) a first platform for positioning and installing the at least one post of the plurality of posts onto the terrain and (ii) a second platform for positioning and assembling the at least one solar module of the plurality of solar modules onto the at least one post.

8. The method of claim 7, wherein the plurality of solar modules are provided on the second platform in a stack, and wherein the second platform comprises a mechanism for extracting the at least one solar module from the stack and assembling the at least one solar module onto one or more posts that have been installed on the terrain.

9. The method of claim 1, further comprising: creating a plurality of post-clip interfaces between a plurality of clips and the plurality of posts using at least an integrated clinching tool on the installer load head, wherein the plurality of clips are pre-attached on the plurality of solar modules.

10. The method of claim 9, wherein the plurality of post-clip interfaces have tolerances that enable the array of solar modules to contour to the terrain without use of a grading of the terrain.

11. The method of claim 9, wherein the plurality of post-clip interfaces comprise a plurality of clinched joints.

12. The method of claim 11, wherein the plurality of clinched joints are formed by a dimpling process.

13. The method of claim 12, wherein a post of the plurality of posts comprises one or more tabs, and wherein the dimpling process comprises joining the one or more tabs to a corresponding clip to form the plurality of clinched joints.

14. The method of claim 12, further comprising adding one or more fasteners to the post-clip interfaces during or after the dimpling process.

15. The method of claim 9, wherein the plurality of post-clip interfaces are formed by:
   a. locating one or more fasteners in position relative to a clip of the plurality of clips and a tab on a post of the plurality of posts, and
   b. piercing (i) the one or more fasteners through the tab to fasten the tab onto the clip, or (ii) the one or more fasteners through the clip to fasten the clip onto the tab.

16. The method of claim 9, further comprising: using a movable tool to form a plurality of holes in-situ on the plurality of clips on the solar modules or one or more tabs on the posts.

17. The method of claim 16, further comprising: using the movable tool or another tool to install the one or more fasteners through the plurality of holes formed in-situ on the plurality of clips or the one or more tabs.

18. The method of claim 9, further comprising: assessing a structural integrity of the plurality of post-clip interfaces based at least in part on (i) a measured force or a deflection during or after installation of the solar modules onto the posts or (ii) one or more of images of the plurality of post-clip interfaces during or after the plurality of post-clip interfaces have been formed.

19. A method for constructing an array of solar modules, comprising:
   (a) providing one or more mobile platforms that carry a plurality of posts and a plurality of solar modules, wherein the one or more mobile platforms are equipped with one or more sensors comprising a geolocation sensor;
   (b) using at least the one or more sensors to (i) autonomously move the one or more mobile platforms and (ii) autonomously position and assemble at least one post of the plurality of posts and at least one solar module of the plurality of solar modules over a terrain, thereby constructing the array of solar modules; and
   (c) using a testing tool located on the one or more mobile platforms to perform pull strength and assembly tests on the at least one post assembled in (b).

20. The method of claim 19, wherein the array of solar modules is constructed on a substantially non-flat terrain.

21. The method of claim 19, wherein the array of solar modules is constructed on a substantially flat terrain.

22. The method of claim 19, wherein the array of solar modules comprises a complete wired array or a dual-tilt array.

23. The method of claim 19, further comprising: using an algorithm to identify a location suitable for autonomous positioning and assembly of the at least one solar module of the plurality of solar modules; and creating a set of executable software instructions for controlling the one or more mobile platforms to autonomously position and assemble the at least one post of the plurality of posts and the at least one solar module of the plurality of solar modules over the terrain to construct the array of solar modules without requiring aid or involvement from a user.

24. The method of claim 19, wherein the one or more sensors further comprise an image sensor.

25. The method of claim 19, wherein the one or more mobile platforms comprise (i) a first platform for positioning and installing the at least one post of the plurality of posts onto the terrain and (ii) a second platform for positioning and assembling the at least one solar module of the plurality of solar modules onto the at least one post.

26. The method of claim 25, wherein the plurality of solar modules are provided on the second platform in a stack, and wherein the second platform comprises a mechanism for extracting the at least one solar module from the stack and assembling the at least one solar module onto one or more posts that have been installed on the terrain.

27. The method of claim 19, further comprising: creating a plurality of post-clip interfaces between a plurality of clips and the plurality of posts using at least an integrated clinching tool on an installer load head located on the one or more mobile platforms, wherein the plurality of clips are pre-attached on the plurality of solar modules.

28. The method of claim 27, wherein the plurality of post-clip interfaces have tolerances that enable the array of solar modules to contour to the terrain without use of a grading of the terrain.

29. The method of claim 27, wherein the plurality of post-clip interfaces comprise a plurality of clinched joints.

30. The method of claim 29, wherein the plurality of clinched joints are formed by a dimpling process.

31. The method of claim 30, wherein a post of the plurality of posts comprises one or more tabs, and wherein the dimpling process comprises joining the one or more tabs to a corresponding clip to form the plurality of clinched joints.

32. The method of claim 30, further comprising adding one or more fasteners to the post-clip interfaces during or after the dimpling process.

33. The method of claim 27, wherein the plurality of post-clip interfaces are formed by:
   a. locating one or more fasteners in position relative to a clip of the plurality of clips and a tab on a post of the plurality of posts, and
   b. piercing (i) the one or more fasteners through the tab to fasten the tab onto the clip, or (ii) the one or more fasteners through the clip to fasten the clip onto the tab.

34. The method of claim 27, further comprising: using a movable tool to form a plurality of holes in-situ on the plurality of clips on the solar modules or one or more tabs on the posts.

35. The method of claim 34, further comprising: using the movable tool or another tool to install the one or more fasteners through the plurality of holes formed in-situ on the plurality of clips or the one or more tabs.

36. The method of claim 27, further comprising: assessing a structural integrity of the plurality of post-clip interfaces based at least in part on (i) a measured force or a deflection during or after installation of the solar modules onto the posts or (ii) one or more of images of the plurality of post-clip interfaces during or after the plurality of post-clip interfaces have been formed.

* * * * *